(12) United States Patent
Uchimura et al.

(10) Patent No.: US 11,259,073 B2
(45) Date of Patent: Feb. 22, 2022

(54) INFORMATION PROCESSING APPARATUS, INFORMATION RECORDING MEDIUM, INFORMATION PROCESSING METHOD, AND PROGRAM

(71) Applicant: SONY CORPORATION, Tokyo (JP)

(72) Inventors: Kouichi Uchimura, Kanagawa (JP); Kenjiro Ueda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/616,240

(22) PCT Filed: May 21, 2018

(86) PCT No.: PCT/JP2018/019484
§ 371 (c)(1),
(2) Date: Nov. 22, 2019

(87) PCT Pub. No.: WO2018/221292
PCT Pub. Date: Dec. 6, 2018

(65) Prior Publication Data
US 2020/0107067 A1  Apr. 2, 2020

(30) Foreign Application Priority Data

May 31, 2017 (JP) .............................. JP2017-107975

(51) Int. Cl.
*H04N 21/433* (2011.01)
*G11B 20/00* (2006.01)
(Continued)

(52) U.S. Cl.
CPC ... *H04N 21/4334* (2013.01); *G11B 20/00137* (2013.01); *H04N 5/76* (2013.01);
(Continued)

(58) Field of Classification Search
CPC ........ H04N 21/4334; H04N 5/76; H04N 5/92; H04N 21/434; H04N 21/854; G11B 20/00137
See application file for complete search history.

(56) References Cited

U.S. PATENT DOCUMENTS

2004/0101286 A1* 5/2004 Seo ..................... G11B 27/3027
386/240
2006/0140219 A1* 6/2006 Kawasaki .............. H04H 60/27
370/487

(Continued)

FOREIGN PATENT DOCUMENTS

CN      1692427 A    11/2005
CN      1920981 A     2/2007
(Continued)

OTHER PUBLICATIONS

Apr. 6, 2020, European Search Report issued for related EP Application No. 18810753.6.
(Continued)

*Primary Examiner* — Mishawn N. Hunter
(74) *Attorney, Agent, or Firm* — Paratus Law Group, PLLC

(57) ABSTRACT

A configuration is realized that allows reproduction control on the basis of age at the time of reproduction by recording information regarding age permitted for reproduction corresponding to media recorded content. A clip AV stream file storing content to be reproduced acquired from input data including MPEG-2 TS format data or MMT format data and information regarding age permitted for reproduction corresponding to content acquired from the input data are placed into a playlist file, a clip information file, a usage control information file, or other file and recorded in media. A reproduction apparatus reads the information regarding age permitted for reproduction corresponding to the content (Continued)

to be reproduced from the playlist file or other file and compares the information regarding age permitted for reproduction with user's age information, thus allowing for content reproduction to be controlled.

18 Claims, 47 Drawing Sheets

(51) Int. Cl.
| | |
|---|---|
| *H04N 5/92* | (2006.01) |
| *H04N 21/434* | (2011.01) |
| *H04N 21/854* | (2011.01) |
| *H04N 5/76* | (2006.01) |
| *H04L 9/08* | (2006.01) |
| *G11B 20/10* | (2006.01) |
| *H04N 5/926* | (2006.01) |
| *G11B 20/12* | (2006.01) |
| *G11B 27/00* | (2006.01) |

(52) U.S. Cl.
CPC .............. *H04N 5/92* (2013.01); *H04N 21/434* (2013.01); *H04N 21/854* (2013.01); *G11B 20/10* (2013.01); *G11B 20/12* (2013.01); *G11B 27/00* (2013.01); *H04L 9/0861* (2013.01); *H04N 5/926* (2013.01)

(56) References Cited

U.S. PATENT DOCUMENTS

| | | |
|---|---|---|
| 2006/0176782 A1 | 8/2006 | Han |
| 2007/0083895 A1* | 4/2007 | McCarthy .......... H04N 21/4858 725/46 |
| 2008/0005259 A1* | 1/2008 | Inano .................... G06K 7/0008 709/212 |
| 2008/0152302 A1 | 6/2008 | Kido |
| 2009/0089828 A1* | 4/2009 | Carlsgaard ......... H04N 21/4318 725/28 |
| 2012/0117128 A1 | 5/2012 | Hamada et al. |
| 2015/0223158 A1* | 8/2015 | McCann ................ H04W 48/14 370/254 |
| 2016/0269904 A1 | 9/2016 | Sharma et al. |

FOREIGN PATENT DOCUMENTS

| | | |
|---|---|---|
| CN | 101193234 A | 6/2008 |
| CN | 101290718 A | 10/2008 |
| CN | 106254942 A | 12/2016 |
| ER | 3511939 A1 | 7/2019 |
| JP | 2006-506771 A | 2/2006 |
| JP | 2010-273152 A | 12/2010 |
| JP | 2011-023071 A | 2/2011 |
| JP | 2014-534696 A | 12/2014 |
| JP | 2017-038288 A | 2/2017 |
| WO | WO 2018/047558 A1 | 3/2018 |

OTHER PUBLICATIONS

Shen et al., Digital Video Archives Management through Metadata Implementation, 2004, pp. 16-22 and 33.

* cited by examiner

FIG. 12

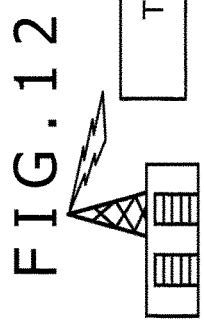

PACKETS CARRYING PMT

| TS packet | TS packet | TS packet | TS packet | TS packet | TS packet |

| Syntax | No. of bits | Mnemonic |
|---|---|---|
| program_map_section () { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0;i< N;i++) { | | |
|     descriptor() ---- PARENTAL INFORMATION DESCRIPTOR 81 | | |
|   } | | |
|   for (i = 0;i< N;i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (j = 0;j< M;j++) { | | |
|       descriptor() | | |
|     } | | |
|   } | | |
|   CRC_32 | 32 | rpchof |
| } | | |

FIG. 13

(1a) PARENTAL INFORMATION INCLUDED IN MPEG-2 TS FORMAT DATA

| Syntax | No. of bits | Mnemonic |
|---|---|---|
| Parental_rating_descriptor (){ descriptor_tag descriptor_length for(i=0; i<N; i++ ){ country_code Rating } } | 8 8 24 8 | uimsbf uimsbf bslbf uimsbf |

82 PARENTAL RATING (1b) rating DATA

| rating | MEANING |
|---|---|
| 0x00 | UNDEFINED |
| 0x01–0x0F | LOWEST ALLOWABLE AGE OF VIEWING = rating + 3 |
| 0x10–0xFF | DEFINED BY CARRIER |

FIG. 14

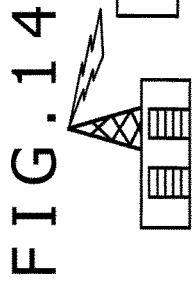

PACKETS CARRYING MPT

| TLV packet | TLV packet | TLV packet | TLV packet | TLV packet | TLV packet |

| Syntax | No. of bits | Mnemonic |
|---|---|---|
| MMT_Package_Table () { | | |
|   table_id | 8 | uimsbf |
|   version | 8 | uimsbf |
|   length | 16 | uimsbf |
|   reserved | 6 | bslbf |
|   MPT_mode | 2 | bslbf |
|   MMT_package_id_length | 8 | uimsbf |
|   for (i=0; i<N; i++) { | | |
|     MMT_package_id_byte | 8 | bslbf |
|   } | | |
|   MPT_descriptors_length | 16 | uimsbf |
|   for ( i=0; i<N; i++) { | | |
|     MPT_descriptors_byte ········ 91 PARENTAL INFORMATION DESCRIPTOR | 8 | bslbf |
|   } | | |
|   number_of_assets | 8 | uimsbf |
|   for (i=0; i<N; i++) { | | |
|     identifier_type | 8 | uimsbf |
|     asset_id_scheme | 32 | uimsbf |
|     asset_id_length | 8 | uimsbf |
|     for (j=0; j<M; j++) { | | |
|       asset_id_byte | 8 | uimsbf |
|     } | | |
|     asset_type | 32 | char |
|     reserved | 7 | bslbf |
|     asset_clock_relation_flag | 1 | bslbf |
|     location_count | 8 | uimsbf |
|     for (j=0; j<M; j++) { | | |
|       MMT_general_location_info () | | |
|     } | | |
|     asset_descriptors_length | 16 | uimsbf |
|     for (j=0; j<M; j++) { | | |
|       asset_descriptors_byte | 8 | bslbf |
|     } | | |
|   } | | |
| } | | |

FIG. 15

(2a) PARENTAL INFORMATION INCLUDED IN MMT FORMAT DATA

| Syntax | No. of bits | Mnemonic |
|---|---|---|
| MH-Parental_Rating_Descriptor (){ | | |
| descriptor_tag | 16 | uimsbf |
| descriptor_length | 8 | uimsbf |
| for(i=0; i<N; i++ ){ | | |
| country_code | 24 | bslbf |
| Rating | 8 | uimsbf |
| } | | |
| } | | |

92 PARENTAL RATING (2b) rating DATA

| rating | MEANING |
|---|---|
| 0x00 | UNDEFINED |
| 0x01–0x0F | LOWEST ALLOWABLE AGE OF VIEWING = rating + 3 |
| 0x10–0xFF | DEFINED BY CARRIER |

FIG. 16

| TITLE | RECORDING DATE/TIME | BROADCASTING STATION | ATTACHED INFORMATION 1 | ATTACHED INFORMATION 2 |
|---|---|---|---|---|
| A | 7/1 13:00−16:00 | 7Ch | GENRE: DOCUMENTARY | HEVC 3840×2160 |
| B | 7/2 12:30−13:00 | 1Ch | GENRE: DRAMA | HEVC 3840×2160 |
| ... | ... | ... | ... | ... |

FIG.17

| Syntax | No. of bits | Mnemonic |
|---|---|---|
| zzzzz. clpi{ | | |
|   type_Indicator | 8*4 | bslbf |
|   version_number | 8*4 | bslbf |
|   SequenceInfo_start_address | 32 | uimsbf |
|   ProgramInfo_start_address | 32 | uimsbf |
|   CPI_start_address | 32 | uimsbf |
|   ClipMark_start_address | 32 | uimsbf |
|   MakerPrivateData_start_address | 32 | uimsbf |
|   reserved | 96 | bslbf |
|   ClipInfo() | | |
|   for(i=0;i<N1;i++){ | | |
|     padding_word | 16 | bslbf |
|   } | | |
|   SequenceInfo() | | |
|   for(i=0;i<N2;i++){ | | |
|     padding_word | 16 | bslbf |
|   } | | |
|   ProgramInfo() | | |
|   for(i=0;i<N3;i++){ | | |
|     padding_word | 16 | bslbf |
|   } | | |
|   CPI() | | |
|   for(i=0;i<N4;i++){ | | |
|     padding_word | 16 | bslbf |
|   } | | |
|   ClipMark() | | |
|   for(i=0;i<N5;i++){ | | |
|     padding_word | 16 | bslbf |
|   } | | |
|   MakerPrivateData() | | |
|   for(i=0;i<N6;i++){ | | |
|     padding_word | 16 | bslbf |
|   } | | |
| } | | |

101: ClipInfo block
102: SequenceInfo block
103: ProgramInfo block
104: CPI block

FIG. 18

| Syntax | No. of bits | Mnemonic |
|---|---|---|
| ClipInfo() { | | |
|    length | 32 | uimsbf |
|    reserved_for_future_use | 8 | bslbf |
|    application_type | 8 | bslbf |
|    Clip_stream_type | 8 | uimsbf |
|    reserved_for_word_align | 4 | bslbf |
|    encode_condition | 2 | bslbf |
|    transcode_mode_flag | 1 | bslbf |
|    contorolled_timee_flag | 1 | bslbf |
|    TS_average_rate | 32 | uimsbf |
|    TS_recording_rate | 32 | uimsbf |
|    num_of_source_packets | 32 | uimsbf |
|    BD_system_use | 1024 | bslbf |
|    TS_type_info_block() | | |
|    if(Clip_stream_typeE==2) { | | |
|       preceding_Clip_Information_file_name | 8*5 | bslbf |
|       Clip_codec_identifier | 8*4 | bslbf |
|       reserved_for_future_use | 8 | bslbf |
|       SPN_exit_from_preceding_Clip | 32 | uimsbf |
|       following_Clip_Information_file_name | 8*5 | bslbf |
|       Clip_codec_identifier | 8*4 | bslbf |
|       reserved_for_future_use | 8 | bslbf |
|       SPN_enter_to_following_Clip | 32 | uimsbf |
|    } | | |
| } | | |

105

RESERVED AREA (C1) STREAM TYPE (C2) ENCODING INFORMATION (C3) TS RATING INFORMATION (C4) SOURCE PACKET INFORMATION

FIG. 20

| Syntax | No. of bits | Mnemonic |
|---|---|---|
| zzzzz.clpi{ | | |
|   type_Indicator | 8*4 | bslbf |
|   version_number | 8*4 | bslbf |
|   SequenceInfo_start_address | 32 | uimsbf |
|   ProgramInfo_start_address | 32 | uimsbf |
|   CPI_start_address | 32 | uimsbf |
|   ClipMark_start_address | 32 | uimsbf |
|   MakerPrivateData_start_address | 32 | uimsbf |
|   ParentalInfo_start_address | 32 | uimsbf |
|   reserved | 96 | bslbf |
|   ClipInfo() | | |
|   for(i=0;i<N1;i++){ | | |
|     padding_word | 16 | bslbf |
|   } | | |
|   SequenceInfo() | | |
|   for(i=0;i<N2;i++){ | | |
|     padding_word | 16 | bslbf |
|   } | | |
|   ProgramInfo() | | |
|   for(i=0;i<N3;i++){ | | |
|     padding_word | 16 | bslbf |
|   } | | |
|   CPI() | | |
|   for(i=0;i<N4;i++){ | | |
|     padding_word | 16 | bslbf |
|   } | | |
|   ClipMark() | | |
|   for(i=0;i<N5;i++){ | | |
|     padding_word | 16 | bslbf |
|   } | | |
|   MakerPrivateData() | | |
|   for(i=0;i<N6;i++){ | | |
|     padding_word | 16 | bslbf |
|   } | | |
|   ParentalInfo() | | |
|   for(i=0;i<N6;i++){ | | |
|     padding_word | 16 | bslbf |
|   } | | |
| } | | |

111: PARENTAL INFORMATION RECORDING AREA ADDRESS
110: PARENTAL INFORMATION

FIG. 21

| Syntax | No. of bits | Mnemonic |
|---|---|---|
| ParentalInfo() { | | |
|   length | 8*4 | bslbf |
|   113 rating | 8 | uimsbf |
|   reserved_for_future_use | 88 | bslbf |
| } | | |

(a) PARENTAL rating

| rating | MEANING |
|---|---|
| 0x00 | UNDEFINED |
| 0x01–0x0F | LOWEST ALLOWABLE AGE OF VIEWING = rating + 3 |
| 0x10–0xFF | DEFINED BY CARRIER |

FIG. 22

| Syntax | No. of bits | Mnemonic |
|---|---|---|
| xxxx.rpls/yyyy.vpls { | | |
|   type_Indicator | 8*4 | bslbf |
|   version_number | 8*4 | bslbf |
|   playList_start_address | 32 | uimsbf |
|   playlistMark_start_address | 32 | uimsbf |
|   MakerPrivateData_start_address | 32 | uimsbf |
|   reserved | 160 | bslbf |
|   UIApplInfoPlayList() ......... 121 | | |
|   for (i=0;i<N1;i++) { | | |
|     padding_word | 16 | bslbf |
|   } | | |
|   PlayList() | | |
|   for (i=0;i<N2;i++) { | | |
|     padding_word | 16 | bslbf |
|   } | | |
|   PlayListMark() | | |
|   for (i=0;i<N3;i++) { | | |
|     padding_word | 16 | bslbf |
|   } | | |
|   MakerPrivateData() | | |
|   for (i=0;i<N4;i++) { | | |
|     padding_word | 16 | bslbf |
|   } | | |
| } | | |

121: UI APPLICATION INFORMATION

FIG. 23

| Syntax | No. of bits | Mnemonic |
|---|---|---|
| UIAPPInfoPlayList() { | | |
| length | 32 | uimsbf |
| reserved_for_future_use    *(122 RESERVED AREA)* | 16 | bslbf |
| PlayList_character_set | 8 | uimsbf |
| reserved_for_word_align | 4 | bslbf |
| Playback_protect_flag | 1 | bslbf |
| write_protect_flag | 1 | bslbf |
| Is_played_flag | 1 | bslbf |
| Is_edited_flag | 1 | bslbf |
| time_zone | 8 | bslbf |
| reserved_for_word_align | 8 | bslbf |
| record_time_and_date    *(P1) RECORDING DATE/TIME* | 4*14 | bslbf |
| Playlist_duration | 4*6 | bslbf |
| maker_ID | 16 | uimsbf |
| maker_model_code    *(P2) CHANNEL NO.* | 16 | uimsbf |
| channel_number | 16 | buimsbf |
| reserved_fo_word_align | 8 | bslbf |
| channel_name_length    *(P3) CHANNEL NAME* | 8 | uimsbf |
| channel_name | 8*20 | bslbf |
| Playlist_name_length    *(P4) RECORDED PROGRAM NAME* | 8 | uimsbf |
| Playlist_name | 8*255 | bslbf |
| PlayList_detail_length    *(P5) RECORDED PROGRAM DETAILS* | 16 | uimsbf |
| PlayList_detail | 8*1200 | bslbf |
| } | | |

FIG. 26

| TITLE | RECORDING DATE/TIME | BROADCASTING STATION | ATTACHED INFORMATION 1 | ATTACHED INFORMATION 2 | LOWEST ALLOWABLE AGE OF REPRODUCTION |
|---|---|---|---|---|---|
| A | 7/1 13:00–16:00 | 7Ch | GENRE: DOCUMENTARY | HEVC 3840×2160 | 18 |
| B | 7/2 12:30–13:00 | 1Ch | GENRE: DRAMA | HEVC 3840×2160 | 18 |
| ... | ... | ... | ... | ... | ... |

FIG. 27

| Syntax | No. of bits | Mnemonic |
|---|---|---|
| xxxx.rpls/yyyy.vpls { | | |
|   type_Indicator | 8*4 | bslbf |
|   version_number | 8*4 | bslbf |
|   playList_start_address | 32 | uimsbf |
|   playlistMark_start_address | 32 | uimsbf |
|   MakerPrivateData_start_address | 32 | uimsbf |
|   ParentalInfo_start_address | 32 | uimsbf |
|   reserved | 160 | bslbf |
|   UIApplInfoPlayList() | | |
|   for (i=0;i<N1;i++) { | | |
|     padding_word | 16 | bslbf |
|   } | | |
|   PlayList() | | |
|   for (i=0;i<N2;i++) { | | |
|     padding_word | 16 | bslbf |
|   } | | |
|   PlayListMark() | | |
|   for (i=0;i<N3;i++) { | | |
|     padding_word | 16 | bslbf |
|   } | | |
|   MakerPrivateData() | | |
|   for (i=0;i<N4;i++) { | | |
|     padding_word | 16 | bslbf |
|   } | | |
|   ParentalInfo() | | |
|   for (i=0;i<N4;i++) { | | |
|     padding_word | 16 | bslbf |
|   } | | |
| } | | |

126: PARENTAL INFORMATION RECORDING AREA ADDRESS
125: PARENTAL INFORMATION

FIG. 28

| Syntax | No. of bits | Mnemonic |
|---|---|---|
| ParentalInfo() { | | |
|   length | 8*4 | bslbf |
|   rating | 8 | uimsbf |
|   reserved_for_future_use | 88 | bslbf |
| } | | |

127 PARENTAL RATING (a) PARENTAL rating

| rating | MEANING |
|---|---|
| 0x00 | UNDEFINED |
| 0x01–0x0F | LOWEST ALLOWABLE AGE OF VIEWING = rating + 3 |
| 0x10–0xFF | DEFINED BY CARRIER |

FIG. 29

| Syntax | No. of bits | Mnemonic |
|---|---|---|
| UIAPPInfoPlayList() { | | |
| length | 32 | uimsbf |
| reserved_for_future_use | 16 | bslbf |
| PlayList_character_set | 8 | uimsbf |
| reserved_for_word_align | 4 | bslbf |
| Playback_protect_flag | 1 | bslbf |
| write_protect_flag | 1 | bslbf |
| Is_played_flag | 1 | bslbf |
| Is_edited_flag | 1 | bslbf |
| time_zone | 8 | bslbf |
| reserved_for_word_align | 8 | bslbf |
| record_time_and_date | 4*14 | bslbf |
| Playlist_duration | 4*6 | bslbf |
| maker_ID | 16 | uimsbf |
| maker_model_code | 16 | uimsbf |
| channel_number | 16 | buimsbf |
| reserved_fo_word_align | 8 | bslbf |
| channel_name_length | 8 | uimsbf |
| channel_name | 8*20 | bslbf |
| Playlist_name_length | 8 | uimsbf |
| Playlist_name | 8*255 | bslbf |
| PlayList_detail_length | 16 | uimsbf |
| PlayList_detail | 8*1200 | bslbf |
| } | | |

131 { Playback_protect_flag, write_protect_flag, Is_played_flag → REPRODUCTION RESTRICTION FLAG (P1) RECORDING DATE/TIME
(P2) CHANNEL NO.
(P3) CHANNEL NAME
(P4) RECORDED PROGRAM NAME
(P5) RECORDED PROGRAM DETAILS

FIG. 30

| Syntax | No. of bits | Mnemonic |
|---|---|---|
| info. bdav[ | | |
| type_indicator | 8*4 | bslbf |
| version_number | 8*4 | bslbf |
| TableOfplayList_start_address | 32 | uimsbf |
| MakerPrivateData_start_address | 32 | uimsbf |
| reserved | 192 | bslbf |
| UIApplInfoBDAV()  ⎯ UI APPLICATION INFORMATION | | |
| for (i=0;i<N1;i++){ | | |
| padding_word | 16 | bslbf |
| } | | |
| TableOfPlayList() | | |
| for (i=0;i<N2;i++){ | | |
| padding_word | 16 | bslbf |
| } | | |
| MakerPrivateData() | | |
| for (i=0;i<N3;i++){ | | |
| padding_word | 16 | bslbf |
| } | | |
| } | | |

| Syntax | No. of bits | Mnemonic |
|---|---|---|
| UIAPPInfoBDAV() { | | |
| length | 32 | uimsbf |
| reserved_for_future_use | 16 | bslbf |
| BDAV_character_set | 8 | bslbf |
| reserved_for_word_align | 6 | bslbf |
| BDAV_protect_flag | 1 | bslbf |
| resume_valid_flag | 1 | bslbf |
| PIN | 8*4 | bslbf |
| resume_PlayList_file_name | 8*10 | bslbf |
| ref_to_menu_thumbnail_index | 16 | uimsbf |
| BDAV_name_length | 8 | uimsbf |
| BDAV_name | 8*255 | bslbf |
| } | | |

133 PIN CODE (PASSWORD)

FIG. 37

| Syntax | BIT COUNT (Number of bits) | Mnemonic |
|---|---|---|
| digital_recording_control_data | 2 | bslbf |
| encryption_mode | 1 | bslbf |
| encryption_flag | 2 | bslbf |
| copy_restriction_mode | 1 | bslbf |
| rating | 8 | uimsbf |
| Reserved_for_future_use | 25 | bslbf |
| extension_flag | 1 | bslbf |
| If (extension==1) { | | |
| extension_length | 16 | uimsbf |
| For (i=0; i<extension_length; i++) { | | |
| extension_bytes | 8 | bslbf |
| } | | |
| } | | |

(A) DIGITAL RECORDING CONTROL INFORMATION (digital_recording_control_data)
(B) ENCRYPTION INFORMATION (encryption_mode)
(C) ENCRYPTION FLAG (encryption_flag)
(D) COPYING COUNT RESTRICTION INFORMATION (copy_restriction_mode)
(E) PARENTAL RATING (rating)

| Syntax | BIT COUNT (Number of bits) | Mnemonic |
|---|---|---|
| MMTP_packet_length | 16 | uimsbf |
| digital_recording_control_data | 2 | bslbf |
| encryption_mode | 1 | bslbf |
| encryption_flag | 2 | bslbf |
| copy_restriction_mode | 1 | bslbf |
| rating | 8 | uimsbf |
| Reserved_for_future_use | 9 | bslbf |
| extension_flag | 1 | bslbf |
| If (extension==1) { | | |
| extension_length | 16 | uimsbf |
| For (i=0; i<extension_length; i++) { | | |
| extension_bytes | 8 | bslbf |
| } | | |
| } | | |

(A) DIGITAL RECORDING CONTROL INFORMATION (digital_recording_control_data)
(B) ENCRYPTION INFORMATION (encryption_mode)
(C) ENCRYPTION FLAG (encryption_flag)
(D) COPYING COUNT RESTRICTION INFORMATION (copy_restriction_mode)
(E) PARENTAL RATING (rating)

181

INFORMATION PROCESSING APPARATUS, INFORMATION RECORDING MEDIUM, INFORMATION PROCESSING METHOD, AND PROGRAM

CROSS REFERENCE TO PRIOR APPLICATION

This application is a National Stage Patent Application of PCT International Patent Application No. PCT/JP2018/019484 (filed on May 21, 2018) under 35 U.S.C. § 371, which claims priority to Japanese Patent Application No. 2017-107975 (filed on May 31, 2017), which are all hereby incorporated by reference in their entirety.

TECHNICAL FIELD

The present disclosure relates to an information processing apparatus, an information recording medium, an information processing method, and a program. For further details, the present disclosure relates to an information processing apparatus, an information recording medium, an information processing method, and a program that allow reproduction control using reproduction restriction information prescribed in advance in a configuration for accepting input of MMT (MPEG Media Transport) format data whose standardization is underway as a future data transport standard for broadcasting waves and so on, recording the data to media, and reproducing the data.

BACKGROUND ART

Standardization efforts are currently underway to realize high-quality video data transport including broadcasting, etc. of 4K video, 8K video, and so on, and a data delivery scheme using an MMT (MPEG Media Transport) format has been under study as one of such efforts.

The MMT format prescribes a data transfer scheme (transport format) for transporting coded data included in content such as video, audio, and subtitles and control information (SI: Signaling Information) that includes various pieces of management information such as control information and attribute information via broadcasting waves or a network.

The MMT format is scheduled to be used, for example, for a next generation of content such as 4K video and high dynamic range (HDR) video.

It should be noted that the MPEG-2 TS format is currently popular for use as a transport format for video, audio, subtitles, and so on and as a data recording format for media.

Also, BDMV and BDAV standards (formats) are widely used as recording/reproduction application standards (formats) that support this MPEG-2 TS format.

It should be noted that although BDMV and BDAV are primarily application standards for data recording and reproduction using a BD (Blu-ray (registered trademark) Disc), these standards are applicable to not only a BD but also data recording and reproduction using media other than a BD such as a flash memory and an HDD.

A configuration for data recording and reproduction processes using a BD is recited, for example, in PTL 1 (JP 2011-023071A).

BDMV is an application standard developed with a BD-ROM in mind having, for example, movie or other content recorded therein in advance and has found widespread use primarily in a non-rewritable BD-ROM such as package content.

On the other hand, BDAV is a standard developed primarily for the data recording and reproduction processes using a rewritable BD-RE disc, one-time recordable BD-R disc, or other media. BDAV is used, for example, for recording and reproduction of pictures shot, for example, with a video camera by a user and for recording and reproduction of TV broadcasting.

In order to record delivered content compliant with the above MMT format in an information recording medium (media) and accomplish a content reproduction process using a reproduction application that supports the BDAV format, it is necessary to record data in accordance with this BDAV format.

Discussion is currently underway regarding a configuration for expanding the BDAV format and allowing recording and reproduction of MMT format data.

For example, in the case where an information processing apparatus such as a TV set receives delivered data compliant with the MMT format sent from a broadcasting station, etc. and records the data to recording media such as BD, flash memory, or HDD (hard disk), not only video, audio, and subtitle data but also data such as some pieces of control information (SI) are recorded as a clip AV stream file prescribed in the BDAV format.

Various ideas are currently being discussed as a mode for recording this clip AV stream.

For example, one idea would be to convert video, audio, and subtitle data compliant with the MMT format into the MPEG-2 TS format, an existing format.

Further, another idea is also under study. In this idea, a packet sequence having data compliant with the MMT format stored therein is stored in a clip AV stream file in an 'as-is' manner, followed by recording of the file in media.

Specifically, a sequence of MMTP (MMT Protocol) packets or a sequence of TLV (Type Length Value) packets, higher-order packets of MMTP packets, is recorded in media.

MMTP packets and TLV packets store, for example, control information (SI: Signaling Information) that includes various pieces of management information in addition to data to be reproduced such as video, audio, and subtitles.

As described above, as for data to be reproduced such as video, audio, and subtitles, such data is recorded by generating a clip AV stream file in MPEG-2 TS format or that includes an MMTP packet sequence or a TLV packet sequence. In either case, target data such as video, audio and other data of this clip AV stream file is reproduced by using a reproduction application that supports the BDAV format.

The BDAV format prescribes database files such as playlist file and clip information file as reproduction control information files, and a reproduction application that supports the BDAV format reproduces data by referring to these reproduction control information files (database files).

However, data delivered in accordance with the MMT format does not include any playlist file or clip information file prescribed in this BDAV format.

In order to record this MMT format data to media and reproduce content by using an application that supports the BDAV format, a process is required for generating playlist files and clip information files prescribed in the BDAV format and recording the files in media.

However, nothing is yet to take any concrete form regarding this process.

CITATION LIST

Patent Literature

[PTL 1]
JP 2011-023071A

SUMMARY

Technical Problem

The present disclosure has been devised, for example, in light of the foregoing problem, and it is an object of the present disclosure to provide an information processing apparatus, an information recording medium, an information processing method, and a program that can accept input of delivered data compliant with the MMT format, generate database files prescribed in the BDAV format and record the data to media, and reproduce media recorded content by using these database files.

In a working example, the present disclosure relates, for example, to an information processing apparatus, an information recording medium, an information processing method, and a program that allow reproduction restriction by using, for example, reproduction control information set in MMT format data sent over broadcasting waves such as parental information, age-related reproduction restriction information, also during reproduction of media recorded content.

Solution to Problem

A first aspect of the present disclosure is an information processing apparatus that includes a data processing section. The data processing section accepts input of input data including MPEG-2 TS format data or MMT format data and generates recorded data compliant with BDAV format or SPAV format, a data recording format for an information recording medium.

The data processing section records, in the information recording medium, a clip AV stream file storing content and information regarding age permitted for reproduction corresponding to the content acquired from the input data.

Further, a second aspect of the present disclosure is an information processing apparatus that includes a data processing section. The data processing section performs a reproduction process of reproducing data recorded in an information recording medium.

The information recording medium stores MPEG-2 TS format data or MMT format data that has been recorded in accordance with the BDAV format or the SPAV format.

The data processing section acquires information regarding age permitted for reproduction corresponding to content from the information recording medium and performs content reproduction control on the basis of acquired information.

Further, a third aspect of the present disclosure is an information recording medium that has recorded data compliant with BDAV format or SPAV format.

The information recording medium includes, as recorded data, a clip AV stream file and information regarding age permitted for reproduction. The clip AV stream file stores content to be reproduced. The information regarding age permitted for reproduction includes information regarding age permitted for reproduction of the content to be reproduced recorded therein.

A reproduction apparatus can acquire information regarding age permitted for reproduction corresponding to content to be reproduced from the information recording medium and perform control reproduction of content on the basis of the acquired information.

Further, a fourth aspect of the present disclosure is an information processing method performed by an information processing apparatus.

The information processing apparatus includes a data processing section. The data processing section accepts input of input data including MPEG-2 TS format data or MMT format data and generates recorded data compliant with BDAV format or SPAV format, a data recording format for an information recording medium.

The data processing section records, in the information recording medium, a clip AV stream file storing content and information regarding age permitted for reproduction corresponding to the content acquired from the input data.

Further, a fifth aspect of the present disclosure is an information processing method performed by an information processing apparatus.

The information processing apparatus includes a data processing section. The data processing section performs a reproduction process of reproducing data recorded in an information recording medium.

The information recording medium stores MPEG-2 TS format data or MMT format data that has been recorded in accordance with the BDAV format or the SPAV format.

The data processing section acquires information regarding age permitted for reproduction corresponding to content from the information recording medium and performs content reproduction control on the basis of acquired information.

Further, a sixth aspect of the present disclosure is a program executed by an information processing apparatus to perform information processing.

The information processing apparatus includes a data processing section. The data processing section accepts input of input data including MPEG-2 TS format data or MMT format data and generates recorded data compliant with the BDAV format or the SPAV format, a data recording format for an information recording medium.

The program causes the data processing section to record, in the information recording medium, a clip AV stream file storing content and information regarding age permitted for reproduction corresponding to the content acquired from the input data.

Further, a seventh aspect of the present disclosure is a program executed by an information processing apparatus to perform information processing.

The information processing apparatus includes a data processing section. The data processing section performs a reproduction process of reproducing data recorded in an information recording medium.

The information recording medium stores MPEG-2 TS format data or MMT format data that has been recorded in accordance with the BDAV format or the SPAV format.

The program causes the data processing section to acquire information regarding age permitted for reproduction corresponding to content from the information recording medium and perform content reproduction control on the basis of acquired information.

It should be noted that the program of the present disclosure is, for example, a program that can be provided to an information processing apparatus or a computer system capable of executing various program codes by a recording medium in a computer-readable form or a communication medium. The provision of such a program in a computer-readable form realizes a process appropriate to the program in an information processing apparatus or a computer system.

Still other objects, features, and advantages of the present disclosure will become apparent from more detailed description based on working examples of the present disclosure which will be described later and the attached drawings. It should be noted that the system in the present specification refers to a configuration having a logical set of a plurality of apparatuses and is not necessarily limited to the apparatuses having respective configurations accommodated in the same enclosure.

Advantageous Effect of Invention

A configuration of a working example of the present disclosure realizes a configuration that allows reproduction control based on age at the time of reproduction by recording information regarding age permitted for reproduction corresponding to media recorded content.

Specifically, for example, a clip AV stream file storing content to be reproduced acquired from input data including MPEG-2 TS format data or MMT format data and information regarding age permitted for reproduction corresponding to content acquired from the input data are placed into a playlist file, a clip information file, a usage control information file, or other file and recorded in media. A reproduction apparatus reads the information regarding age permitted for reproduction corresponding to the content to be reproduced from the playlist file or other file and compares the information regarding age permitted for reproduction with user's age information, thus allowing for content reproduction to be controlled.

The present configuration realizes a configuration that allows reproduction control based on age at the time of reproduction by recording information regarding age permitted for reproduction corresponding to media recorded content.

It should be noted that the effect recited in the present specification is merely illustrative and not restrictive, and there may be additional effects.

BRIEF DESCRIPTION OF DRAWINGS

FIG. 12 is a diagram describing an example of recording "parental information" in MPEG-2 TS format.

FIG. 13 illustrates diagrams describing an example of recording "parental information" in MPEG-2 TS format.

FIG. 14 is a diagram describing an example of recording "parental information" in MMT format.

FIG. 15 illustrates diagrams describing an example of recording "parental information" in MMT format.

FIG. 16 is a diagram illustrating an example of a content list (recorded program list), list data of content that can be reproduced by a playlist file.

FIG. 17 is a diagram illustrating a data configuration (syntax) of a clip information file.

FIG. 18 is a diagram illustrating a data configuration (syntax) of clip information "ClipInfo( )" of the clip information file.

FIG. 20 is a diagram illustrating a data configuration (syntax) of the clip information file in which the parental information is recorded.

FIG. 21 is a diagram describing a specific data configuration (syntax) of parental information "ParentalInfo( )" recorded in the clip information file.

FIG. 22 is a diagram describing a data configuration (syntax) of the playlist file.

FIG. 23 is a diagram illustrating a data configuration (syntax) of user interface application information "UIAppInfoPlayList."

FIG. 26 is a diagram describing an example of a list of content (list of recorded programs) that can be displayed on a reproduction apparatus such as a TV set by referring to a playlist file in which parental information is recorded.

FIG. 27 is a diagram illustrating an example of setting for adding a parental information recording area as new recorded information for the playlist file.

FIG. 28 is a diagram describing a specific data configuration (syntax) of parental information "ParentalInfo( )" recorded in the playlist file.

FIG. 29 is a diagram illustrating a data configuration (syntax) of the user interface application information "UIAppInfoPlayList" of the playlist file.

FIG. 30 is a diagram describing an example of a passcode recording position in the case where a passcode is recorded in media having content recorded therein.

FIG. 31 is a diagram describing an example of a passcode recording position in the case where a passcode is recorded in media having content recorded therein.

FIG. 37 is a diagram illustrating a data configuration (syntax) of data recorded in the TLV packet additional header illustrated in FIG. 35, is a diagram describing an example of data recorded in the usage control information file.

FIG. 38 is a diagram illustrating a data configuration (syntax) of data recorded in the MMTP packet additional header illustrated in FIG. 36.

DESCRIPTION OF EMBODIMENTS

A detailed description will be given below of an information processing apparatus, an information recording medium, an information processing method, and a program of the present disclosure with reference to drawings. It should be noted that the description will be given in the following order:
 1. Configuration example of the communication system
 2. MMT (MPEG Media Transport) format
 3. BDAV format and SPAV format
 4. Processes in the case of recording MMT format data in accordance with the BDAV format
 5. Age-related reproduction restriction information (parental information)
 6. Example of recording parental information in a clip information file
  6-1. (Working example A1) Working example of recording parental information in a reserved area in clip information "ClipInfo( )"
  6-2. (Working example A2) Working example of adding a parental information recording area, a new area, to a clip information file and recording parental information thereto
 7. Examples of recording parental information in a playlist file
  7-1. (Working example B1) Working example of recording parental information in a reserved area in user interface application information "UIAppInfoPlayList"
  7-2. (Working example B2) Working example of adding a parental information recording area, a new area, to a playlist file and recording parental information
 8. Configuration example allowing for cancellation of viewing restriction by entering a passcode
 9. Working example of recording parental information in a usage control information file (Usage file)
 10. Working example of recording parental information in a header of a packet stored in a clip AV stream file
 11. Configuration of and processes performed by the information processing apparatus that performs a process of recording data in an information recording medium
 12. Configuration of and processes performed by the information processing apparatus that performs a process of reproducing data from an information recording medium
 13. Configuration example of the information processing apparatus
 14. Conclusion of the configuration of the present disclosure 1. Configuration Example of the Communication System A description will be given first of an example of a communication system, a configuration example for using an information processing apparatus that performs processes of the present disclosure with reference to FIG. 1.

Figure 1:
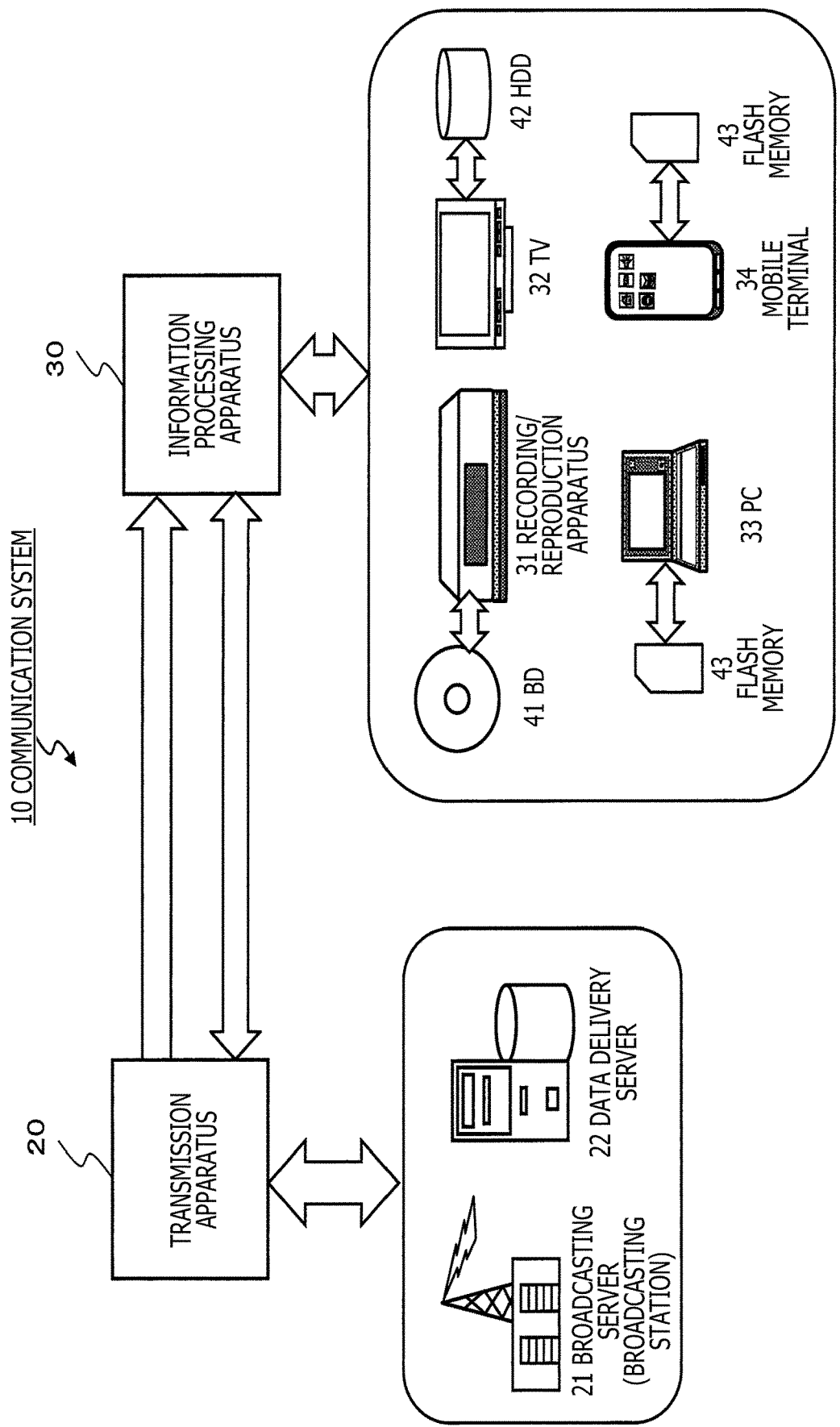
FIG. 1 is a diagram describing a configuration example for using an information processing apparatus that performs processes of the present disclosure.

An information processing apparatus 30 illustrated in FIG. 1 performs a data recording process of recording data to inserted media such as a BD (Blu-ray (registered trademark) Disc), a flash memory, or a hard disk (HDD), a data reproduction process of reproducing data from such media, and further other processes including a data copying process of copying data to other media.

Data recorded in the media by the information processing apparatus 30 is, for example, transmitted content provided by transmission apparatuses 20 such as a broadcasting station (broadcasting server) 21 and a data delivery server 22. Specifically, data recorded in the media is broadcast programs provided by television stations.

These pieces of transmitted content are sent to the information processing apparatus 30 from the transmission apparatuses 20 via broadcasting waves or a network such as the Internet.

The information processing apparatus 30 is, for example, a recording/reproduction apparatus 31, a TV set 32, a PC 33, a mobile terminal 34, or other apparatus. Various media such as a BD (Blu-ray (registered trademark) Disc) 41, an HDD (hard disk) 42, and a flash memory 43 are inserted into these information processing apparatuses, and the information processing apparatuses perform a data recording process of recording data to these media, a data reproduction process of reproducing data therefrom, and further a data copying process of copying data thereto, and so on.

Data is sent from the transmission apparatuses 20 to the information processing apparatus 30 in accordance with the MEG-2 TS format or MMT (MPEG Media Transport) format.

Both the MEG-2 TS format and the MMT format define a data transport scheme (transport format) for transporting coded data included in content such as video, audio, and subtitles via broadcasting waves or a network.

The MEG-2 TS format has already found common use whereas the MMT format will be used for future transmission of 4K and 8K video.

The transmission apparatuses 20 code content data, generate a data file including coded data and metadata of the coded data, place generated coded data into a TS packet prescribed in the MEG-2 TS format or an MMTP (MMT Protocol) packet prescribed in MMT, and send the packet via broadcasting waves or a network.

Data provided to the information processing apparatus 30 by the transmission apparatuses 20 includes not only video, audio, subtitles, and other data to be reproduced but also control information (SI: Signaling Information) that includes various pieces of management information such as control information ranging from guidance information such as program guidance, notice information, and control messages.

2. MMT (MPEG Media Transport) Format

As described above, data transmission from the transmission apparatuses 20 to the information processing apparatus 30 will be carried out in accordance with the MMT (MPEG Media Transport) format in the future.

A description will be given of the MMT (MPEG Media Transport) format with reference to FIG. 2 and subsequent drawings.

Figure 2:
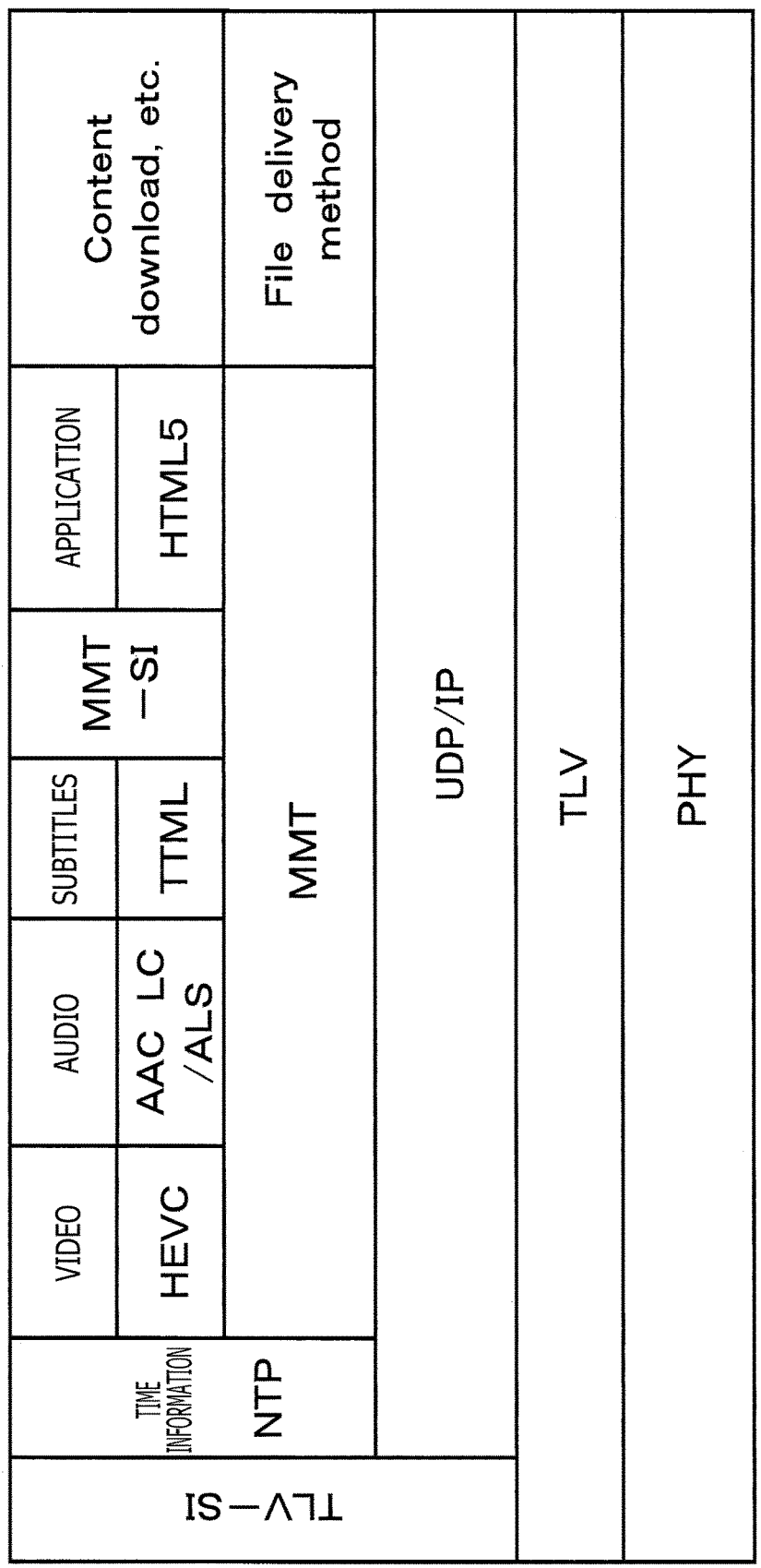
FIG. 2 is a diagram describing MMT format.

FIG. 2 illustrates a stack model of the MMT format.

In the MMT stack model illustrated in FIG. 2, a physical layer (PHY) is provided as a lowermost layer. The physical layer is divided into a broadcasting layer for handling broadcasting processes and a broadband layer for handling networking processes.

MMT allows for handling of processes using two networks, one for broadcasting and another for networking.

A TLV (Type Length Value) layer is available as an upper layer of the physical layer (PHY). The TLV layer is a format defining layer that prescribes an IP packet multiplexing scheme. A plurality of IP packets is multiplexed and sent as a TLV packet. TLV-SI is a transport layer of control information (SI) such as control messages compliant with the TLV format.

Control information (SI) includes setting information, guidance information such as program guidance, notice information, control information, and management information. Setting information is required for the side of the information processing apparatus 30 to receive and reproduce content (program).

Control information (SI) placed into a TLV packet whose process is generated in the TLV layer is TLV-SI and primarily includes control information related to a reception process.

Control information (SI) placed into an MMTP packet, a packet generated in accordance with the MMT protocol (MMTP) is MMT-SI indicating an uppermost layer and primarily includes control information related to a reproduction control.

A UDP/IP layer is set above the TLV layer.

In more detail, the UDP/IP layer can be divided into an IP layer and a UDP layer. This layer prescribes transport for placing a UDP packet into an IP packet payload.

An MMT layer and a File delivery method layer are set above the UDP/IP layer.

Such a setup allows two schemes to be used for data transmission, one used in the case where an MMTP packet is placed into an IP packet and sent and another in which data is sent as an IP packet using File delivery method, a data transport scheme that does not use an MMTP packet.

The following layers are set above the MMT layer:
 a layer of video data, coded video data compliant with HEVC (High Efficiency Video Coding), a video coding standard, and
 a layer of audio data coded in accordance with one of the following audio coding standards:
 (1) coded audio data compliant with MPEG4 AAC LC (Advanced Audio Coding Low Complexity);
 (2) coded audio data compliant with MPEG4 ALS (Audio Losless Coding);
 further, subtitle data, coded subtitle data compliant with TTML (Timed Text Markup Language), a subtitle coding standard;
 control information (MMT-SI) sent by using an MMTP packet; and
 various applications written in accordance with HTML5 (Hyper Text Markup Language 5).

These pieces of data are sent in an MMTP packet.

Control information (MMT-SI) is control information (signaling information) sent in an MMTP packet and includes setting information, guidance information such as program guidance, notice information, control information, and management information. Setting information is required for the side of the information processing apparatus 30 to receive and reproduce content (program).

It should be noted that time information (NTP: Network Time Protocol) is absolute time information and sent after being placed directly into a UDP packet.

Data service for handling other data delivery and content download, etc. (Contentdownload, etc.) provide a configuration to permit delivery using a file delivery method different from MMT.

As illustrated in FIG. 2, not only video, audio, and subtitles but also control information (MMT-SI) including various pieces of management information such as various pieces of notice information and control information and applications are sent in an MMTP packet.

A description will be given of a specific configuration example of an MMTP packet with reference to FIG. 3.

Figure 3:
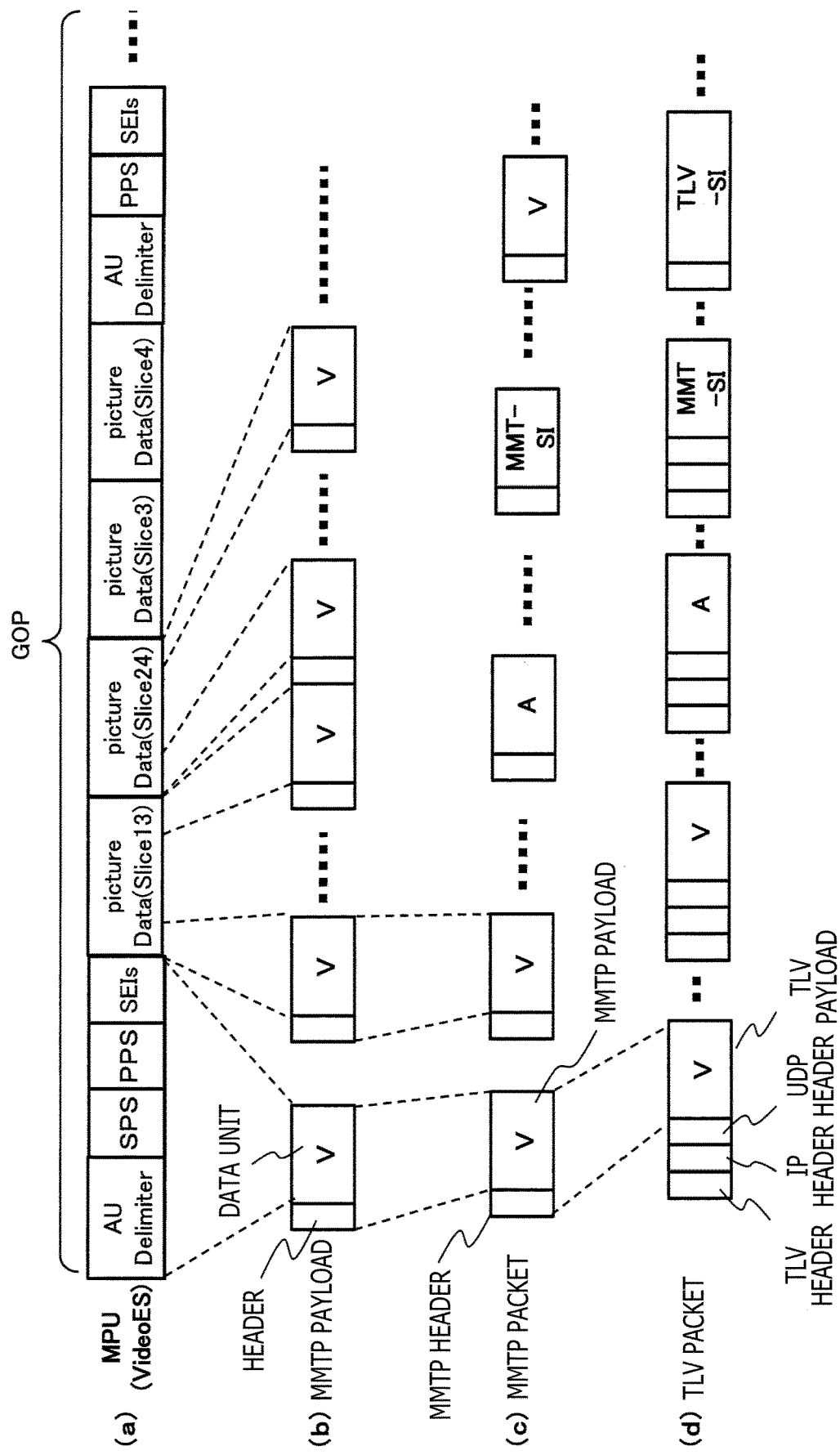
FIG. 3 illustrates diagrams describing configuration examples for storing video data compliant with the MMT format.

FIG. 3 illustrates the following four examples of data configurations:
 (a) MPU (Media Presentation Unit);
 (b) MMTP payload;
 (c) MMTP packet; and
 (d) TLV packet.

A TLV packet classified as (d) is sent via broadcasting waves or a network. Header information regarding a UDP header, an IP header, and a TLV header is set in a TLV packet. A separate TLV packet is set for each data type.

That is, one data type is placed into the payload of a TLV packet. Specifically, video (V), audio (A), subtitles (S), or control information (SI) including various pieces of management information is stored separately.

It should be noted that two types of control information (SI) are available, namely, control information (MMT-SI) placed into an MMTP packet and control information (TLV-SI) sent in a TLV packet, and that these pieces of control information are placed into different and separate TLV packets.

The MMTP packet illustrated in FIG. 3(c) is an example of a TLV payload, a TLV packet payload.

The MMTP packet illustrated in FIG. 3(c) includes an MMTP header and an MMTP payload.

One data type is placed into the payload of an MMTP packet. Specifically, any one data type, i.e., any one of video (V), audio (A), subtitles (S), and control information (MMT-SI) to be placed into the MMTP packet, is placed into a separate MMTP packet.

FIGS. 3(a) and 3(b) illustrate detailed configurations of video data placed into the MMTP payload of the MMTP packet illustrated in FIG. 3(c).

FIG. 3(b) illustrates, of the MMTP packets illustrated in FIG. 3(c), those whose MMTP payloads are video data (V).

The MMTP payloads illustrated in FIG. 3(b) each include a header and a data unit.

Video data and the following various parameters are placed into the data unit as illustrated in FIG. 3(a):

AU Delimiter (Access Unit Delimiter);
SPS (Sequence Parameter Set);
PPS (Picture Parameter Set); and
SEIs (Supplemental Enhancement Information).

These parameters are used to display video.

An MPU (Media Presentation Unit) illustrated in FIG. 3(a) is a data processing block of data to be reproduced such as video, audio, and subtitles in MMT format. The example illustrated in FIG. 3(a) is an example of a video data MPU, and the MPU is the same block as a GOP (Group of Pictures) as a so-called coding/decoding process block.

As illustrated in FIG. 3(a), for example, video data is divided into parameters prescribed in the MMT format and data included in video. These parameters and data are placed into MMTP payloads illustrated in FIG. 3(b), thus forming MMTP packets illustrated in FIG. 3(c).

Further, the MMTP packets are each set as a payload of a TLV packet illustrated in FIG. 3(d), and the TLV packets are each sent via broadcasting waves or a network.

It should be noted that MMTP packets and TLV packets are set for each data type and sent for each piece of video and subtitle data and each piece of MMT-SI data.

TLV-SI is sent in a TLV packet without being placed into an MMTP packet.

3. BDAV Format and SPAV Format

A description will be given next of the BDAV format and the SPAV format, data recording formats for recording delivered content compliant with the MPEG-2 TS format or the above MMT format, for example, to media such as a BD (Blu-ray (registered trademark) Disc), a flash memory, or an HDD (hard disk) and reproducing the content therefrom, with reference to FIG. 4 and subsequent drawings.

For example, in the case where video, audio, subtitles, and other content are reproduced from media such as a BD (Blu-ray (registered trademark) Disc), a flash memory, or an HDD (hard disk), reproduction control information and index information are required to reproduce these pieces of content. Reproduction control information and index information are generally referred to as database files.

These reproduction control information and index information vary depending on the reproduction application that handles the reproduction process of reproducing recorded data from the media.

As described above, the BDMV and BDAV standards (data recording formats) are available as current recording and reproduction application standards (=data recording formats). These application standards have been developed primarily as data recording and reproduction application standards using a BD (Blu-ray (registered trademark) Disc).

It should be noted that BDMV and BDAV are primarily application standards for data recording and reproduction using a BD. Although data recording formats (standards), these standards are applicable to data recording and reproduction not only using a BD but also using a flash memory or other media different from the BD.

BDMV is an application standard developed with a BD-ROM in mind in which, for example, movie or other content is recorded therein and has found widespread use primarily in a non-rewritable BD-ROM such as package content.

On the other hand, BDAV is a standard developed primarily for the data recording and reproduction processes using a rewritable BD-RE disc, one-time recordable BD-R disc, or other media. BDAV is used, for example, for recording and reproduction of pictures shot, for example, with a video camera by users and for recording and reproduction of TV broadcasting.

In order to perform a content reproduction process of reproducing content from media in which delivered content compliant with the MPEG-2 TS format or the above MMT format is recorded by using a reproduction application that supports the BDAV format, it is necessary to record data in accordance with this BDAV format.

As described earlier, the BDAV format prescribes playlist file, clip information file, and other files as reproduction control information recording files, and a reproduction application that supports the BDAV format performs a data reproduction process using recorded information in these reproduction control information files (database files).

Figure 4:
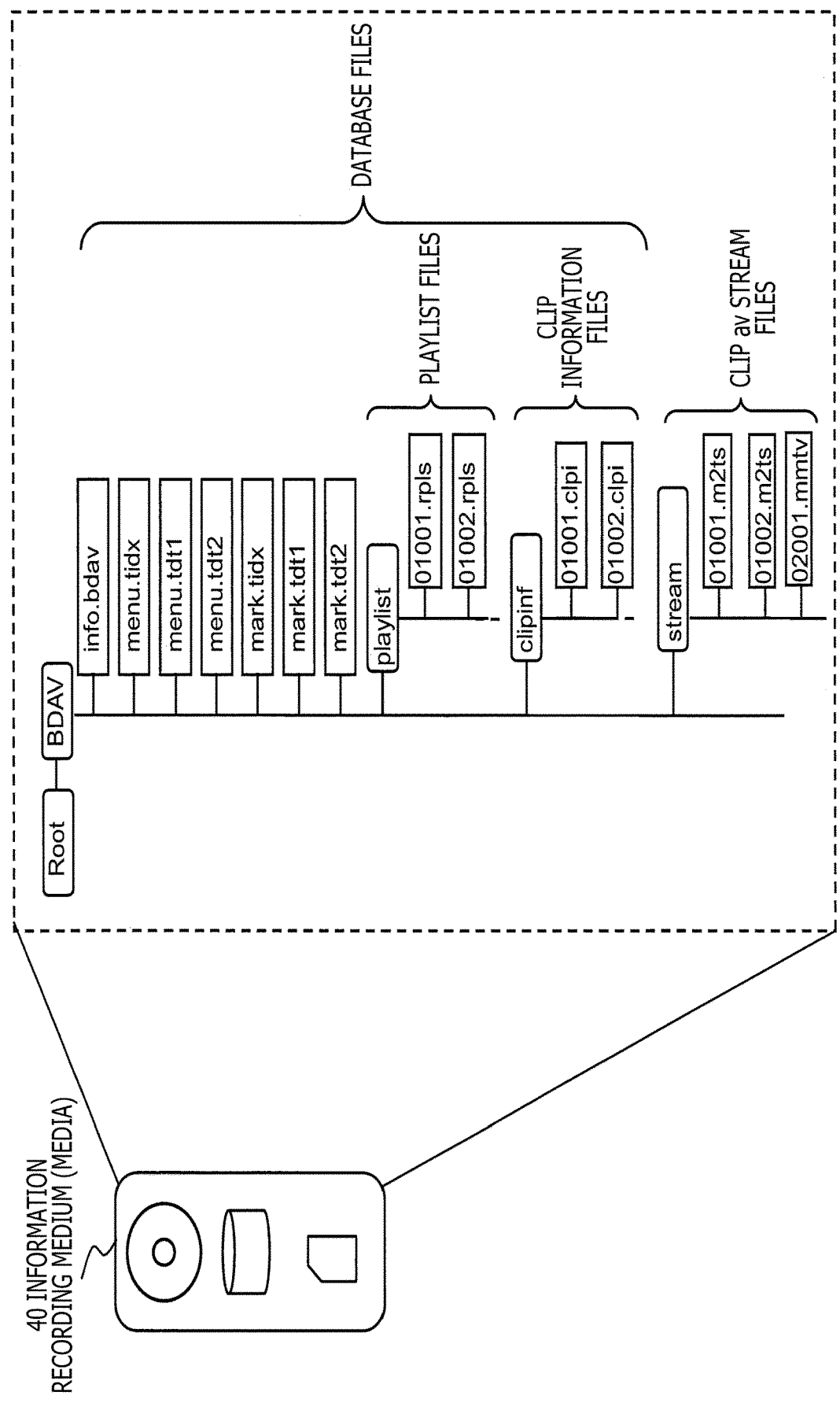
FIG. 4 is a diagram describing BDAV format.

FIG. 4 is a diagram illustrating a configuration example of a directory of data recorded in an information recording medium (media) 40 in accordance with the BDAV format.

Various files storing management information, reproduction control information, and target data to be reproduced are set in the directory as illustrated in FIG. 4.

Management information files include, for example, an info file (info), menu files (menu), mark files (mark), and so on illustrated in FIG. 4. These files primarily store management information regarding titles to be presented to users.

Also, the following files are, for example, recorded as reproduction control information files:

playlist files (playlist), and
clip information files (clipinf).

Further, clip AV stream files (streams) are recorded as files storing data to be reproduced.

Playlist files prescribe an order of reproduction of content or other information in accordance with program information of the reproduction program specified by the title and have, for example, information specifying a clip information file in which reproduction position information or other information is recorded.

Clip information files are files specified by playlist files and include reproduction position information, etc. of clip AV stream files.

Clip AV stream files store AV stream data to be reproduced and management information. Clip AV stream files include video, audio, subtitle, and other data to be reproduced and packets storing management information.

It should be noted that PSI/SI (Program Specific Information/Service Information) is an example of management information prescribed in the MPEG-2 TS format and recorded in clip AV stream files.

It should be noted that although existing broadcast data and network-delivered data are MPEG-2 TS format data that includes TS (Transport Stream) packets, future data including high-definition video, etc. such as 4K and 8K video is expected to be MMT format data that includes MMTP packets described above.

FIG. 4 illustrates, as clip AV stream files (stream), two types of stream files, a stream file (nnnnn.m2ts) that includes MPEG-2 TS format data including TS packets and MMT format data (nnnnn.mmtv) including MMTP packets.

The example of a directory illustrated in FIG. 4 is an example of a directory in which data received by the information processing apparatus 30 is recorded in media as MPEG-2 TS format data in an 'as-is' manner in the case where the data is MPEG-2 TS format data and in which the received data is recorded in media as MMT format data in the case where the data is MMT format data.

It should be noted that in the case where MMT format data is recorded in media, the following two types of processes for generating a clip AV stream file are possible:

(1) generate a clip AV stream file by converting the MMT format into the MPEG-2 TS format; and (2) generate a clip AV stream file that includes a packet sequence having data compliant with the MMT format stored therein.

Discussion is currently underway in favor of the second (2) process, i.e., generating a clip AV stream file that includes a packet sequence having data compliant with the MMT format stored therein and recording the file to media.

Specifically, discussion is currently underway in favor of recording as a sequence of MMTP (MMT Protocol) packets or a sequence of TLV (Type Length Value) packets, higher-order packets of MMTP packets.

A detailed description will be given later of a specific example thereof.

Management information files, playlist files, and clip information files, data files, are files storing management information used for the reproduction process of video, audio, subtitles, and so on, data to be reproduced that is stored in clip AV stream files. These files store reproduction control information and attribute information, etc. of data to be reproduced and are referred to as database files.

A sequence for reproducing content recorded in an information recording medium is as follows:

(a) first, specify a specific playlist from the management information files using a reproduction application; and (b) select a clip information file prescribed in the selected playlist, read an AV stream, data to be reproduced such as video and audio, or a command from a clip AV stream file in accordance with data recorded in the clip information file, and start a process of reproducing the AV stream or executing the command execution.

Figure 5:
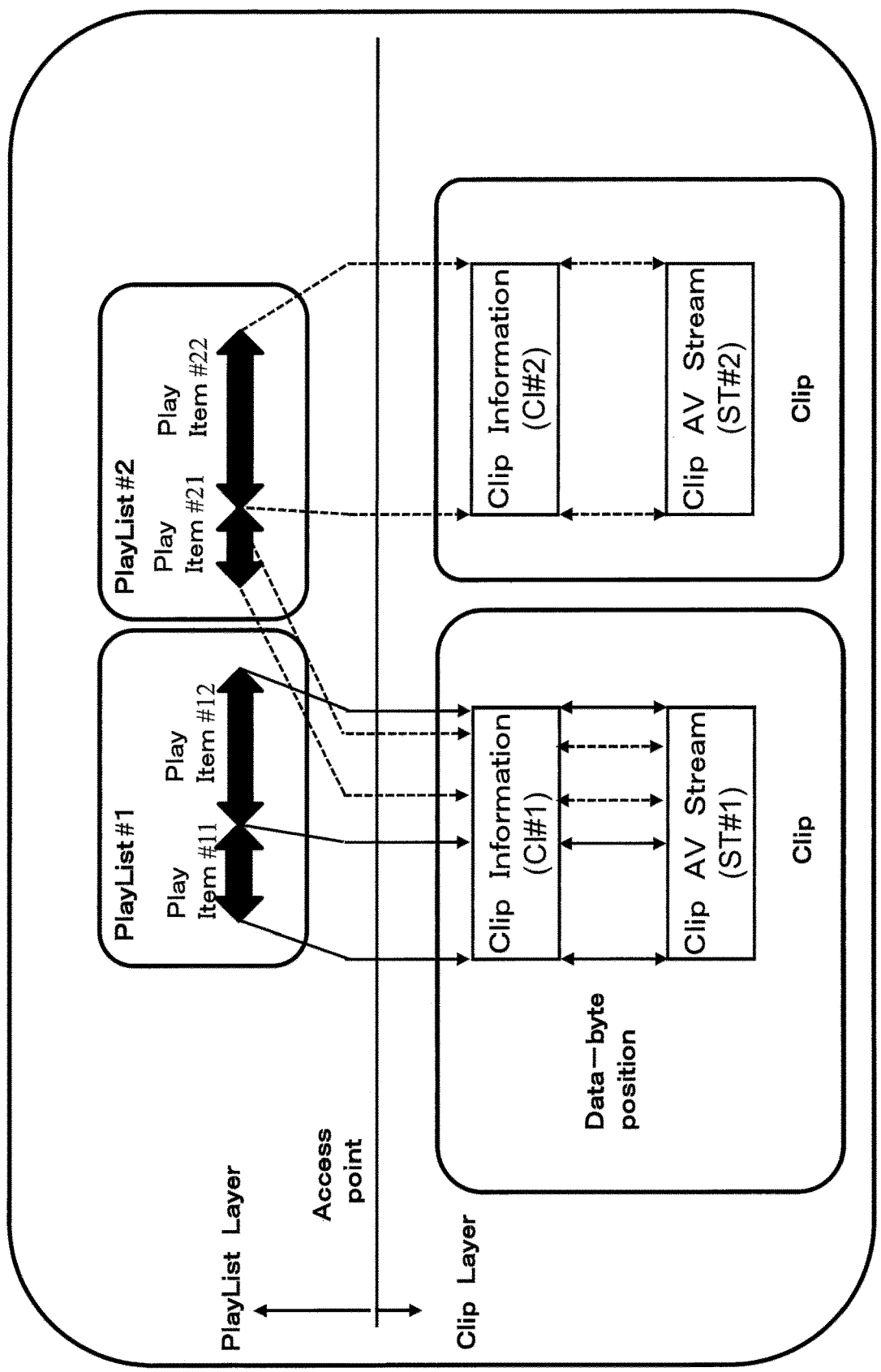
FIG. 5 is a diagram describing an example of a data reproduction process compliant with the BDAV format.

FIG. 5 is a diagram describing correspondence between the following data recorded in the information recording medium (media) 40, that is:

playlist files;
clip information files; and
clip AV stream files.

AV streams that include data to be reproduced such as video, audio, and subtitles, actual data to be reproduced, are recorded as clip AV stream files, and further, playlist files and clip information files are prescribed as management information and reproduction control information files of these AV streams.

Files in a plurality of these categories can be classified into the following two layers as illustrated in FIG. 5:

a playlist layer including playlist files; and
a clip layer including clip AV stream files and clip information files.

It should be noted that a clip AV stream is associated with a clip information file, that a pair of these files are considered an object, and that they are together called a clip or a clip file.

Management information such as EP map is recorded in a clip information file. EP map has, recorded therein, detailed information regarding data included in the clip AV stream file such as I picture position information of MPEG data.

It should be noted that in the case a clip AV stream file is MPEG-2 TS format data, the clip AV stream file includes TS packets.

Also, in the case where a clip AV stream file is MMT format data, the clip AV stream file includes MMTP packets.

A clip information file stores, for example, management information for acquiring reproduction start position of data stored in a clip AV stream file such as correspondence data, etc. between a data position of byte string data of the clip AV stream file and an entry point (EP), reproduction start point in the case of deployment on a time axis, and so on.

A playlist has information indicating, with timestamps, information on the time axis, access points corresponding to clip reproduction start and end positions.

For example, it is possible to acquire a data readout position of a clip AV stream file, i.e., an address of a reproduction start point, by referring to a clip information file on the basis of a timestamp indicating an elapsed reproduction time position from a start point.

A clip information file is used to find, from this timestamp, address information where stream decoding is to be initiated in the clip AV stream file.

As described above, a playlist file has information specifying a reproduction interval of reproducible data included in the clip (=clip AV stream files+clip information files) layer.

One or more play items are set in the playlist, and each of the play items has information specifying a reproduction interval of reproducible data included in the clip (=clip AV stream files+clip information files) layer.

It should be noted that in the case where a clip AV stream file storing data to be reproduced is existing MPEG-2 TS format data as described earlier, the clip AV stream file includes TS packets.

Also, in the case where a clip AV stream file is MMT format data which will be used for high-definition video data such as 4K and 8K video, the clip AV stream file includes TLV packets.

Figure 6:
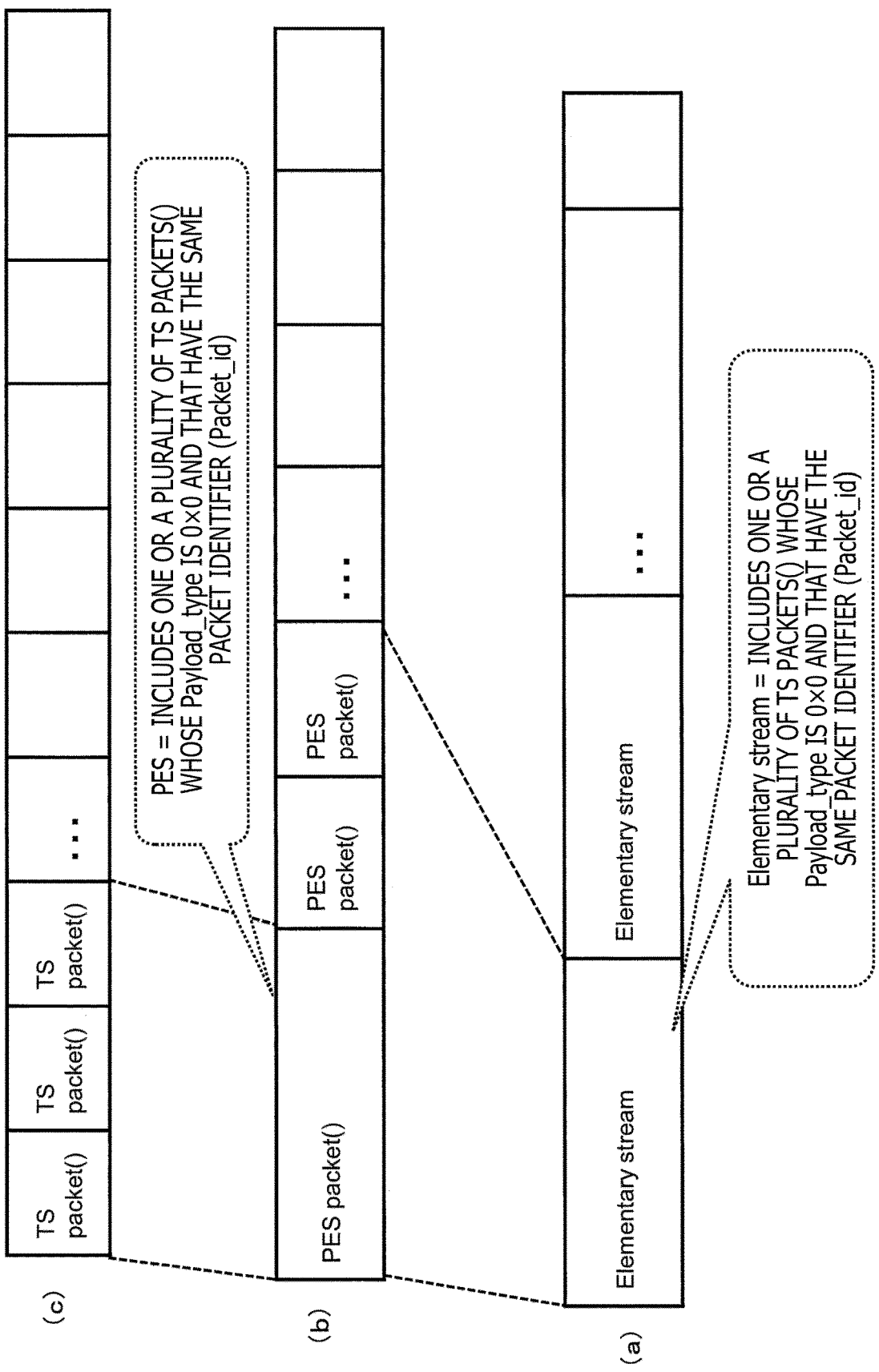
FIG. 6 illustrates diagrams describing MPEG-2 TS format.

A description will be given of the MMT format and the MPEG-2 TS format with reference to FIGS. 6 and 7.

The MPEG-2 TS format will be described first with reference to FIG. 6.

The MPEG-2 TS format is a format that prescribes a data storage format (container format) for coded data, etc. at the time of storage of data included in content such as video, audio, and subtitles and management information (PSI/SI) in a recording medium (media) or transmission thereof via broadcasting waves or a network.

The MPEG-2 TS format is a format standardized by ISO13818-1 and used, for example, for data recording to a BD (Blu-ray (registered trademark) Disc), digital broadcasting, and so on.

FIGS. 6(a) to 6(c) are diagrams illustrating configurations of MPEG-2 TS format data.

FIG. 6(a) depicted at the bottom is a diagram illustrating an overall configuration of MPEG-2 TS format data.

As illustrated in FIG. 6(a), MPEG-2 TS format data includes a plurality of elementary streams.

An elementary stream is a unit set as a block of video, audio, subtitle, and so on.

An elementary stream includes one or a plurality of PES (Packetized Elementary Stream) packets as illustrated in FIG. 2(b).

Specifically, an elementary stream includes one or a plurality of PES packets whose payload type (Payload_type) is 0x0 and that have the same packet identifier (Packet_id).

A PES packet includes one or a plurality of TS packets as illustrated in FIG. 6(c).

Specifically, a PES packet includes one or a plurality of TS packets whose payload type (Payload_type) is 0x0 and that have the same packet identifier (Packet_id).

Unlike the MMTP packet described earlier, the TS packet has a fixed length, and the size of a TS packet is fixed at 188 bytes.

The MMT (MPEG Media Transport) format will be described next with reference to FIG. 7.

Although FIG. 3 was already referred to regarding the MMT format, the explanatory diagrams illustrated in FIG. 7 describe, in an easy-to-understand manner, the association with the MPEG-2 TS format described with reference to FIG. 6.

As described earlier, the MMT format prescribes a data transport scheme (transport format) for transporting coded data included in content such as video, audio, and subtitles via broadcasting waves or a network.

Figure 7:
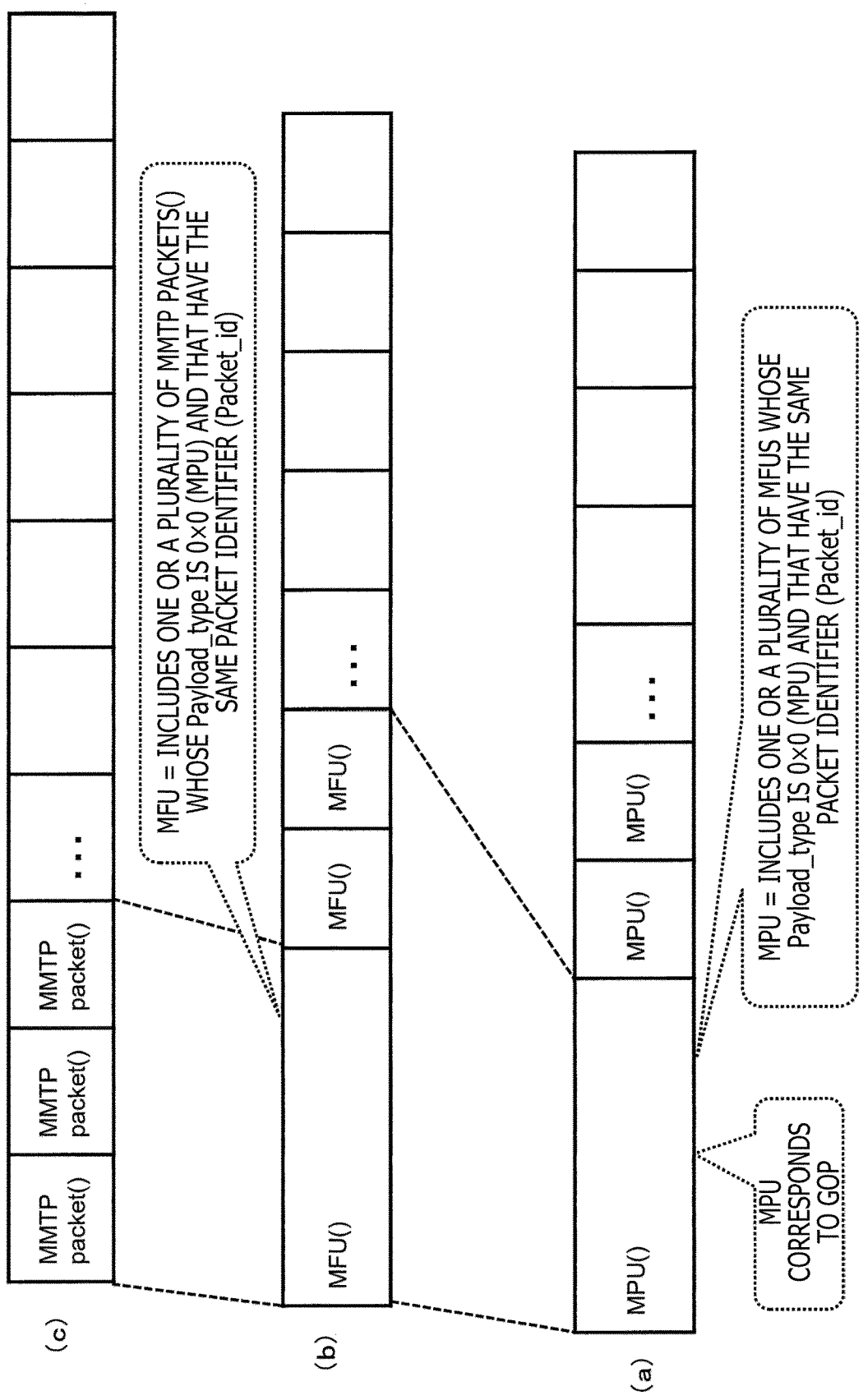
FIG. 7 illustrates diagrams describing the MMT format.

FIG. 7 illustrates diagrams describing the MMT format, a file format prescribed in ISO/IEC 23008-1.

FIGS. 7(a) to 7(c) illustrate configurations of MMT format data.

FIG. 7(a) depicted at the bottom is a diagram illustrating an overall configuration of MMT format data.

As illustrated in FIG. 7(a), MMT format data includes a plurality of media presentation units (MPUs).

An MPU is a unit set as a block of video, audio, subtitle, and so on. For example, in the case of video, one MPU corresponds to a GOP (Group of Pictures), a block of MPEG-compressed video.

An MPU includes one or a plurality of media fragment units (MFUs) as illustrated in FIG. 7(b).

Specifically, an MPU includes one or a plurality of MFUs whose payload type (Payload_type) is 0x0 (MPU) and that have the same packet identifier (Packet_id).

An MFU includes one or a plurality of MMTP packets as illustrated in FIG. 7(c).

Specifically, an MFU includes one or a plurality of MMTP packets whose payload type (Payload_type) is 0x0 (MPU) and that have the same packet identifier (Packet_id).

An MMTP packet has a variable length and can be set to various packet sizes.

Each of the MMTP packets includes a header (MMTP header) that stores attribute information and so on and a payload (MMTP payload) that stores actual data of coded video and so on.

It should be noted that the SPAV format is available as a format similar to the BDAV format. As described earlier, BDMV and BDAV are primarily application standards for data recording and reproduction using a BD. In contrast, the SPAV format is primarily an application standard for data recording and reproduction to and from a hard disk.

It should be noted, however, that the BDAV format and the SPAV format are both applicable to recording and reproduction using a variety of media such as BD, flash memory, and HDD.

SPAV format data allows for data recording and reproduction by processes similar to the data recording and reproduction processes in the BDAV format. It should be noted, however, that the SPAV format differs partially from the BDAV format in filename setting.

Figure 8:
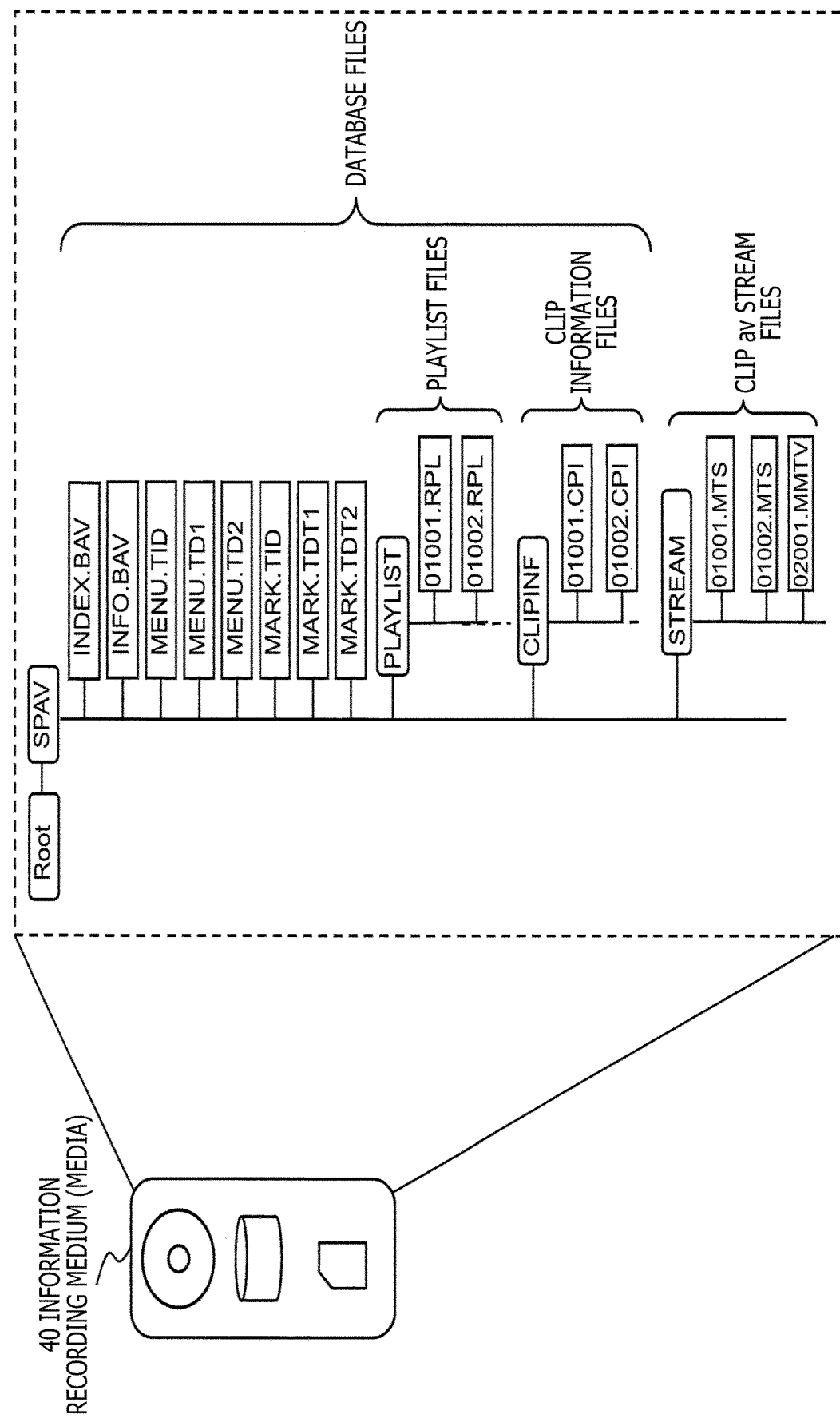
FIG. 8 is a diagram describing SPAV format.

FIG. 8 illustrates a configuration example of an SPAV format directory.

Various files storing management information, reproduction control information, and data to be reproduced are set in the SPAV format directory illustrated in FIG. 8 as with the BDAV format described earlier with reference to FIG. 4.

Management information files include, for example, an info file (INFO), menu files (MENU), mark files (MARK), and so on illustrated in FIG. 8. These files primarily store management information regarding titles to be presented to users.

Also, the following files are, for example, recorded as reproduction control information files:

playlist files (PLAYLIST); and clip information files (CLIPINF).

Further, clip AV stream files (STREAM) are recorded as files storing data to be reproduced.

As illustrated in FIG. 8, directory names and file extensions of the SPAV format are different from those of the BDAV format described with reference to FIG. 4.

It should be noted, however, that data stored in each file and a role of each file are similar to those in the BDAV format.

In the description given below, a processing example will be described in which MPEG-2 TS format data or MMT format data is recorded and reproduced as BDAV format data. However, the working example described below is also applicable to a process of recording and reproducing MPEG-2 TS format data or MMT format data as SPAV format data.

4. Processes in the Case of Recording MMT Format Data in Accordance with the BDAV Format A description will be given next of processes in the case of recording MMT format data in accordance with the BDAV format.

As described earlier, the MMT format is a data delivery format used for 4K video and other data scheduled to be delivered by broadcasting stations and other organizations in the future and is compliant with the protocol stack described with reference to FIG. 3.

On the other hand, the BDAV format is a format for recording data to media and prescribes database files including reproduction control information files such as playlist file and clip information file as described with reference to FIG. 4.

It should be noted that the BDAV format not only is a data recording format but also supports a data recording and reproduction application standard, and data recorded in media in accordance with the BDAV format is reproduced by using a reproduction application compliant with the BDAV format.

Therefore, in order to record delivered content compliant with the MMT format to media and reproduce content from the media by using a reproduction application that supports the BDAV format, it is necessary to record data in accordance with the BDAV format.

As described earlier, discussion is currently underway regarding regulations for expanding the BDAV format and allowing recording and reproduction of MMT format data.

It should be noted that in the case where MMT format data is recorded in media, the following two types of processes for generating a clip AV stream file are possible as described earlier:

(1) generate a clip AV stream file by converting the MMT format into the MPEG-2 TS format; and (2) generate a clip AV stream file that includes a packet sequence having data compliant with the MMT format stored therein.

Discussion is currently underway in favor of the second (2) process, i.e., generating a clip AV stream file that includes a packet sequence having data compliant with the MMT format stored therein and recording the file to media.

Specifically, discussion is currently underway in favor of recording as a sequence of MMTP (MMT Protocol) packets or a sequence of TLV (Type Length Value) packets, higher-order packets of MMTP packets.

For example, in the case where an information processing apparatus such as recording apparatus receives delivered data compliant with the MMT format sent from a broadcasting station, etc. and records the data to recording media such as BD, flash memory, or HDD (hard disk), not only video, audio, and subtitle data but also data such as some pieces of management information (SI) are recorded as a sequence of packets storing data compliant with the MMT format.

That is, a sequence of packets storing data compliant with the MMT format is recorded in a clip AV stream file [e.g., 02001.mmtv] set in the BDAV format illustrated in FIG. 4 or the SPAV format illustrated in FIG. 8.

It should be noted that, as for a playlist file or a clip information file, a reproduction control information file corresponding to a clip AV stream file [e.g., 02001.mmtv] storing MMT format data, the recording apparatus generates a playlist file or a clip information file with a control information setting compliant with MMT format data and records the file to media.

It should be noted that an AV stream file storing MMT format data can be specifically recorded as any one of two types of packet sequence, namely, a sequence of MMTP (MMT Protocol) packets or a sequence of TLV (Type Length Value) packets, higher-order packets of MMTP packets.

A description will be given of a specific configuration example of recording a clip AV stream file storing MMT format data with reference to FIGS. 9 and 10.

Figure 9:
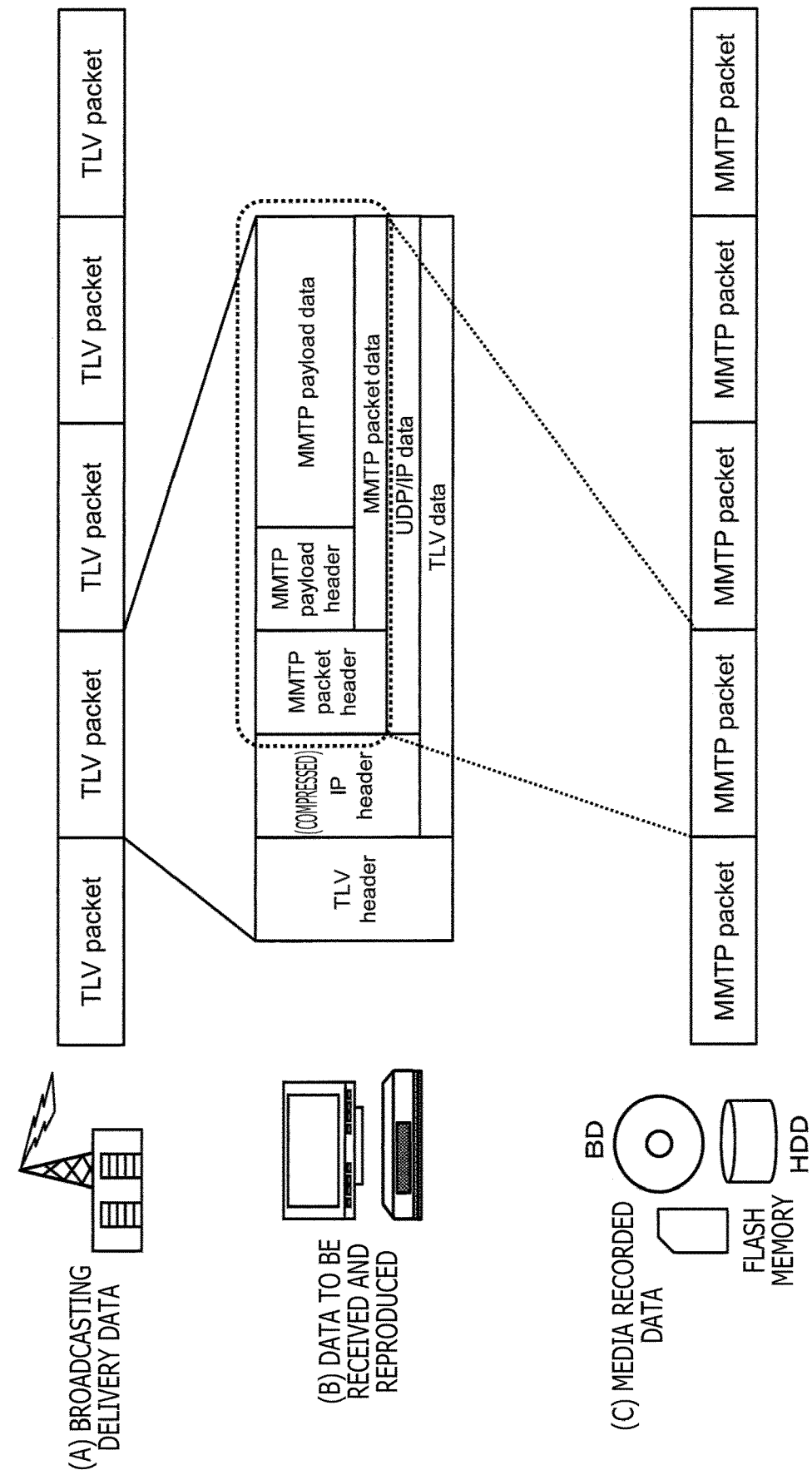
FIG. 9 illustrates diagrams describing a processing example in which data received from a broadcasting station, etc. is recorded in an information recording medium (media) as an MMTP packet sequence, MMT format data.

FIG. 9 illustrates diagrams describing a processing example of recording an MMTP (MMT Protocol) packet sequence compliant with the MMT format to recording media such as BD, flash memory, or HDD (hard disk).

FIG. 9 illustrates the following three types of data:

(A) TLV packet sequence which is delivered broadcast data;

(B) TLV packet processed as data to be received and reproduced; and (C) MMTP packet sequence proposed as a configuration for data recorded in media.

A TLV packet sequence, delivered broadcast data, classified as (A), is a TLV packet sequence in MMT (MPEG Media Transport) format described earlier with reference to FIG. 2.

This TLV packet sequence is sent from the transmission apparatus 20 such as broadcasting station.

A TLV packet processed as data to be received and reproduced classified as (B) is a TLV packet received and reproduced by the information processing apparatus 30 such as a TV set or a recording apparatus. A detailed configuration of a TLV packet included in a TLV packet sequence depicted by (A) is illustrated.

A TLV packet is in MMT (MPEG Media Transport) format described earlier with reference to FIG. 2.

An MMTP packet sequence illustrated as a configuration for data recorded in media classified as (C) is an MMTP packet sequence currently proposed as media recorded data.

An MMTP packet recorded in media is an MMTP packet included in part of a TLV packet as can be understood from dotted lines indicating correspondence with FIG. 9(B) and includes the following elements:

(a) MMTP packet header (MMTP_packet_header); and (b) MMTP packet data (MMTP_packet_data) (=payload).

It should be noted that MMTP packet data (MMTP_packet_data) (=payload) includes the following elements:

(b1) MMTP payload header (MMTP_payload_header); and (b2) MMTP payload data (MMTP_payload_data).

A configuration currently proposed as data recorded in an information recording medium (media) is a configuration in which only MMTP packets, constituent elements of a TLV packet, are recorded in a manner arranged side by side in a line as illustrated in FIG. 9(C).

Figure 10:
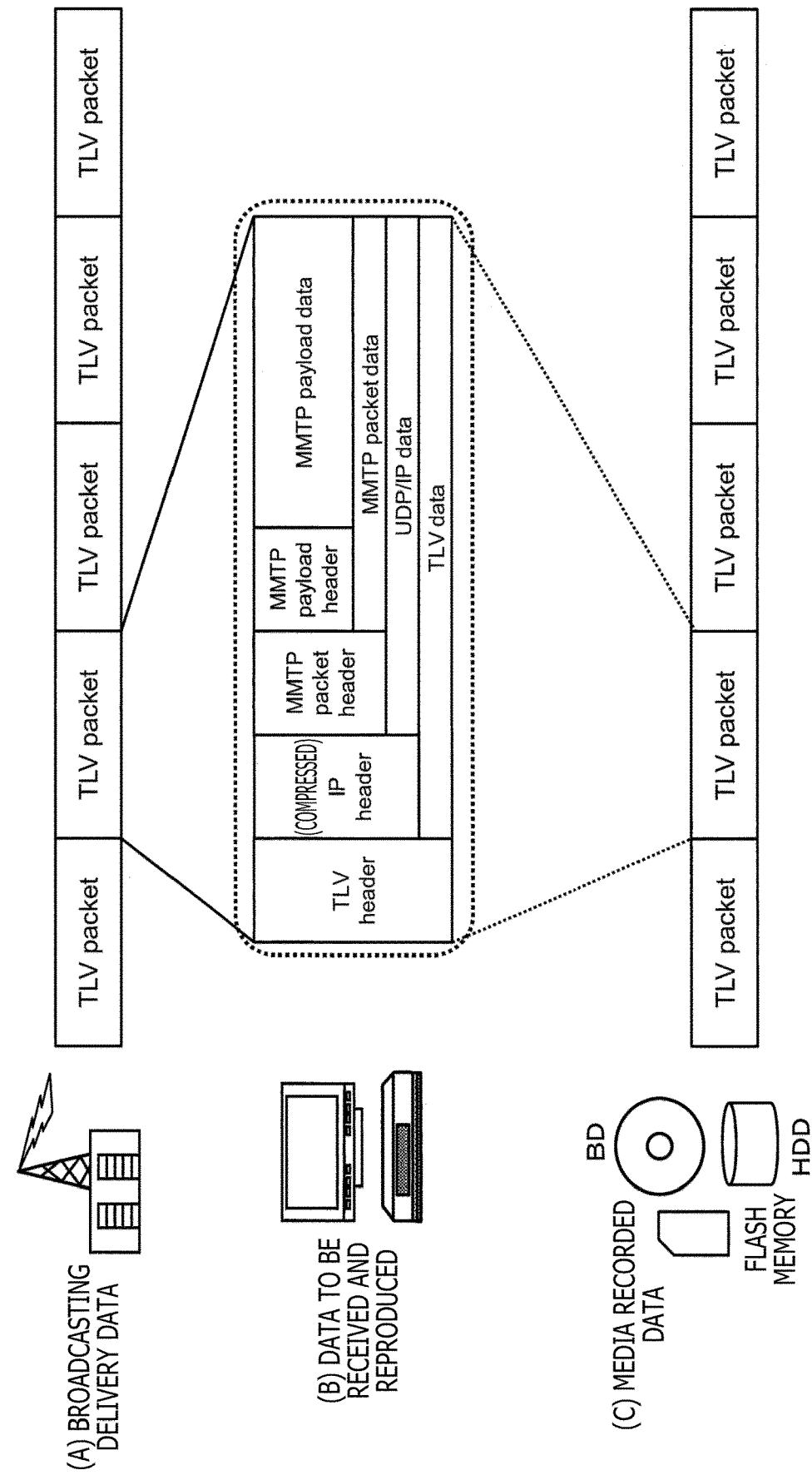
FIG. 10 illustrates diagrams describing a processing example of recording data received from a broadcasting station, etc. in an information recording medium (media) as a TLV packet sequence storing MMTP packets, MMT format data.

FIG. 10 illustrates diagrams describing a processing example of recording a sequence of higher-order TLV packets storing MMTP packets rather than MMTP (MMT Protocol) packets to recording media such as BD, flash memory, or HDD (hard disk).

FIG. 10 illustrates the following three pieces of data as do FIG. 9:

(A) TLV packet sequence which is delivered broadcast data;

(B) TLV packet processed as data to be received and reproduced; and (C) TLV packet sequence proposed as a configuration for data recorded in media.

Data classified as (A) and (B) is similar to data described with reference to FIG. 9.

A TLV packet sequence illustrated as a configuration for data recorded in media classified as (C) is another example of a TLV packet sequence currently proposed as media recorded data.

A TLV packet recorded in media is a TLV packet including an MMTP packet as can be understood from dotted lines indicating correspondence with FIG. 10(B) and includes the following elements:

(a) TLV packet header (TLV_header); and (b) TLV packet data (TLV_data) (=payload).

As described above, the MMTP (MMT Protocol) packet sequence described with reference to FIG. 9 and the TLV (Type Length Value) packet sequence described with reference to FIG. 10 is possible as forms of MMT format data recorded in media such as a BD.

In the case where MMT format data is recorded in media using the settings as illustrated in FIG. 9 or FIG. 10 and reproduced by using a reproduction application that supports the BDAV format, the reproduction is achieved by using reproduction control information files compliant with the BDAV format, i.e., playlist files and clip information files.

It should be noted that the BDAV format not only is a data recording format but also supports a data recording and reproduction application standard and that data that has been recorded in media in accordance with the BDAV format is reproduced by using a reproduction application compliant with the BDAV format.

The BDAV format prescribes database files specific to the BDAV format such as playlist file and clip information file, reproduction control information file, and a reproduction application that supports the BDAV format reproduces data by using these reproduction control information files (database files).

As described earlier, database files such as playlist file and clip information file prescribed in the BDAV format were originally prescribed as files that can be generated on the basis of delivered data in MPEG-2 TS format.

Therefore, even if recorded in a playlist file or a clip information file compliant with the current BDAV format in an 'as-is' manner, delivered data compliant with the MMT format different in format from the MPEG-2 TS format may end up as data that cannot be used by a reproduction application that supports the BDAV format.

In order to record MMT format data to media and reproduce content by using an application that supports the BDAV format, it is necessary to generate a playlist file and a clip information file compliant with MMT format data during recording of MMT format data and record these files to media.

Also, it is necessary to reproduce MMT format data from media by using a playlist file and a clip information file compliant with MMT format data during reproduction of MMT format data recorded in media.

Figure 11:
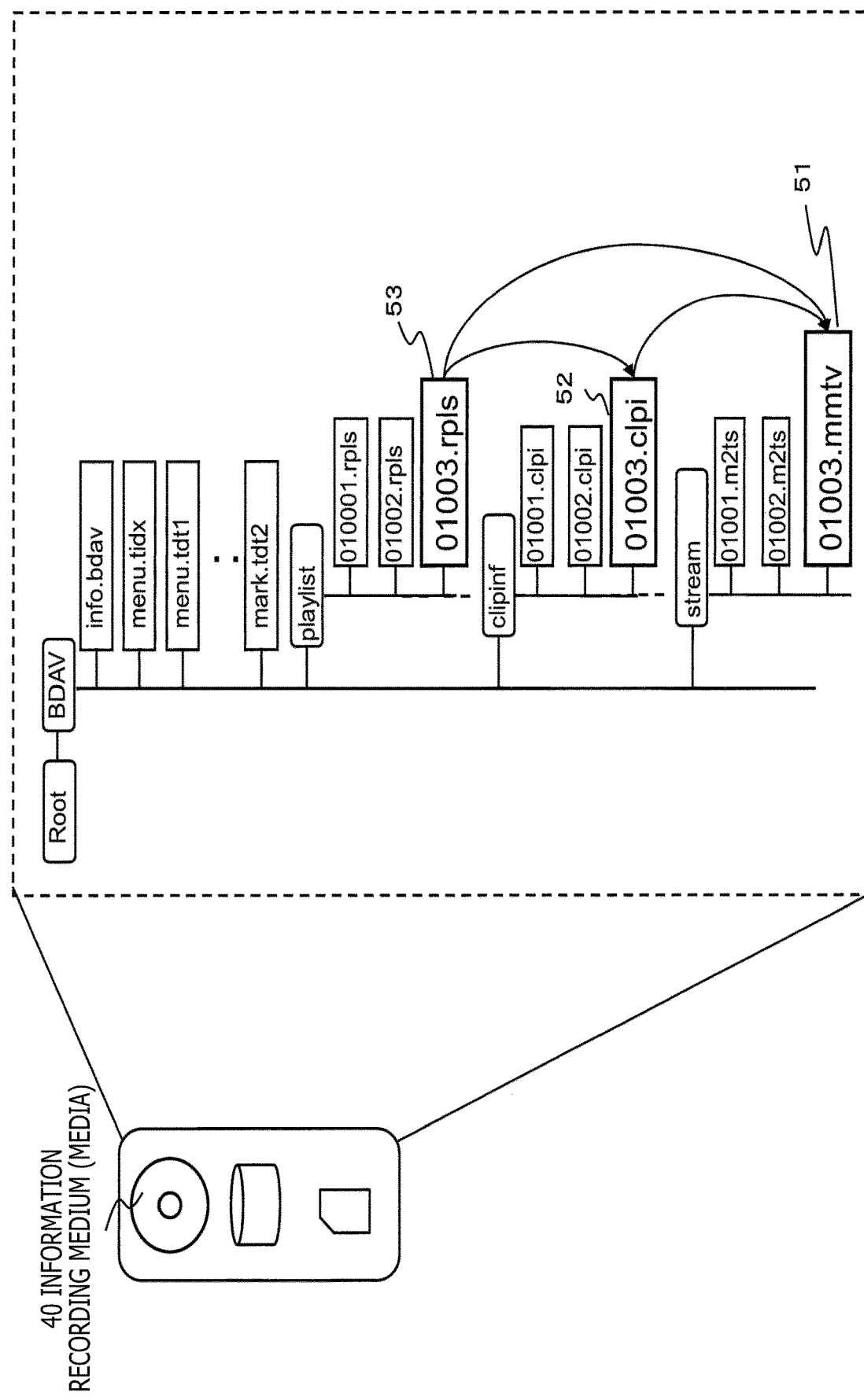
FIG. 11 is a diagram describing a processing example in which MMT format data is recorded as BDAV format data.

Specifically, it is necessary to generate a clip information file (nnnnn.clpi) 52 and a playlist file (nnnnn.rpls) 53 compliant with a clip AV stream file 51 storing MMT format data, record the files 52 and 53 to media (e.g., BD, flash memory, or HDD), and use these files for reproduction as illustrated in FIG. 11.

In the case where the clip AV stream file 51 storing MMT format data recorded in the media is reproduced, the reproduction can be conducted by using the clip information file (nnnnn.clpi) 52 and the playlist file (nnnnn.rpls) 53 compliant with the clip AV stream file 51 storing MMT format data.

However, data delivered in accordance with the MMT format, data delivered by a broadcasting station, does not include all data to be recorded as a playlist file and a clip information file prescribed in this BDAV format.

Also, the clip AV stream file 51 storing MMT format data differs in data format from MPEG-2 TS format data, and data cannot be reproduced properly even if a playlist file and a clip information file having data in the same format as a playlist file and a clip information file compliant with MPEG-2 TS format data are used.

Therefore, in order to record this MMT format data to media and reproduce content by using an application that supports the BDAV format, it is necessary to generate a playlist file and a clip information file in a data format specific to MMT format data that allows to control reproduction of the clip AV stream file 51 storing MMT format data and record these files to media.

5. Age-Related Reproduction Restriction Information (Parental Information)

Various pieces of content are included in content received via broadcasting or networks. Reproduction of some of these pieces of content is permitted only in the case where the viewer is at a certain age or older.

Thus, in order to control reproduction in a manner appropriate to various pieces of content, content delivered via broadcasting or networks may be delivered together with reproduction control information corresponding to the content.

For example, parental information is available as information regarding age permitted for reproduction that permits reproduction only in the case where the viewer is at a certain age or older.

In both the MPEG-2 TS format that has been in common use and the MMT format which is expected to find increasing use in the future, this "parental information," information regarding age permitted for reproduction, is sent together with content whose reproduction is permitted only in the case where the viewer is at a certain age or older.

In the case where received content is reproduced by a TV set, etc., the TV set or other reproduction apparatus compares viewer's age information stored in advance in a memory of the reproduction apparatus and the setting of this "parental information," thus allowing the apparatus to reproduce the content or cancel the reproduction. That is, reproduction can be controlled in accordance with viewer's age.

A description will be given of examples of recording "parental information" in MPEG-2 TS format that has been in common use and the MMT format with reference to FIG. 12 and subsequent drawings.

FIG. 12 illustrates a data configuration (syntax) of a program map table (PMT), control information corresponding to content sent from a broadcasting station, etc. in accordance with the MPEG-2 TS format. Numbers of bits (No. of bits) and mnemonics are depicted together with syntax.

It should be noted that "uimsbf" in data notation signifies "unsigned integer most significant bit first."

"bslbf" signifies "bit string, left bit first."

A parental information descriptor 81 is recorded as a descriptor of a program map table (PMT), control information corresponding to content sent from a broadcasting station, etc. in accordance with the MPEG-2 TS format.

FIG. 13 illustrates a data configuration (syntax) of the parental information descriptor 81.

A parental rating descriptor includes the following pieces of data:
descriptor tag (descriptor_tag)=descriptor identifier;
descriptor length (descriptor_length)=descriptor byte count;
country code (country_code)=applicable country; and
rating (rating)=viewing age restriction information (parental rating information).

Specific age restriction information of content is recorded in a parental rating 82 illustrated in the figure.

Specific examples of recording of this parental rating 82 and meanings of ratings are as illustrated in FIG. 13(1*b*) and as follows:
Rating=0x00: Undefined;
Rating=0x01-0x0F: Lowest allowable age of viewing equal to the rating plus 3; and
Rating=0x00: Defined by carrier.

"Rating=0x01-0x0F" means that a setting from 0x01=1 to 0x0F=15 can be recorded and that a lowest allowable age of viewing can be set in the range of 3 to 18 years old for the setting from 1 to 15 in this field.

Reproduction control information including such parental information is sent as control information corresponding to a given piece of content such as for each program.

FIG. 14 illustrates a data configuration (syntax) of an MMT package table (MPT), control information corresponding to MMT format content sent in association with content sent from a broadcasting station, etc. in accordance with the MMT format.

A parental information descriptor 91 is recorded as a descriptor of an MMT package table (MPT), control information corresponding to content sent from a broadcasting station, etc. in accordance with the MMT format.

FIG. 15 illustrates a data configuration (syntax) of the parental information descriptor 91.

A parental rating descriptor includes the following pieces of data:
  a descriptor tag (descriptor_tag)=descriptor identifier;
  a descriptor length (descriptor_length)=descriptor byte count;
  a country code (country_code)=applicable country; and
  a rating (rating)=viewing age restriction information (parental rating information).

Specific age restriction information of content is recorded in a parental rating 92 illustrated in the figure.

Specific examples of recording of the parental rating 92 and meanings of ratings are as illustrated in FIG. 15(2b) and as follows:
  Rating=0x00: Undefined;
  Rating=0x01-0x0F: Lowest allowable age of viewing equal to the rating plus 3; and
  Rating=0x00: Defined by carrier.

These pieces of data are similar to those described earlier with reference to FIG. 13.

As described above, content in MPEG-2 TS format and MMT format alike delivered via broadcasting or networks and whose reproduction is permitted only in the case where the viewer is at a certain age or older is sent together with this "parental information."

In the case where received content is reproduced by a TV set, etc., the TV set or other reproduction apparatus compares viewer's age information stored in advance in a memory of the reproduction apparatus and a setting of this "parental information," after which the apparatus reproduces the content or cancels the reproduction. That is, reproduction can be controlled in accordance with viewer's age.

However, in the case where content delivered via broadcasting or networks is recorded in a recording medium such as a BD in accordance with the BDAV format and this recorded content is reproduced, a playlist file and a clip information file are used as reproduction control information. If the above "parental information" is not recorded in these files, one cannot decide whether or not the content to be reproduced is subject to reproduction restriction that prescribes a lowest allowable age of reproduction.

For example, in the case where BDAV format data recorded in media is reproduced, a playlist file, reproduction control information, is selected first, after which a list of pieces of content data that can be reproduced is displayed on a display section of a TV set, etc.

The user (viewer) can select a piece of content to reproduce while watching this content list.

FIG. 16 illustrates an example of a content list (recorded program list), list data of content that can be reproduced by a playlist file.

As illustrated in FIG. 16, a content list includes titles, recording dates and times, broadcasting stations, attached information, and so on.

These pieces of information are those that have been recorded in a playlist file.

However, the above "parental information" is not recorded in a playlist file compliant with the current BDAV format. As a result, reproduction control cannot be conducted using "parental information."

In the case where BDAV format data is reproduced, the reproduction process is performed by referring to a database file such as playlist file or clip information file, reproduction control information.

Therefore, if information corresponding to "parental information" is not recorded in any one of database files prescribed in the BDAV format, there is a possibility that the reproduction process may be performed with no regard to age restriction.

A description will be given below of a configuration of the present disclosure for preventing such a situation.

6. Example of Recording Parental Information in a Clip Information File

A description will be given below of a working example of recording parental information in a clip information file as a configuration example for solving the above problem.

In the configuration described below, the following identification data, i.e., parental information, is recorded in a clip information file that includes reproduction control information regarding content recorded in media such as a BD (content in a clip AV stream file):

(1) whether the content to be reproduced using the clip information file has a prescribed lowest allowable age of reproduction; and (2) in the case where the content has a prescribed lowest allowable age of reproduction, what is the lowest allowable age of reproduction?

A description will be given first of a data configuration (syntax) of a clip information file with reference to FIG. 17.

As described earlier, information regarding data to be reproduced using a clip information file is recorded in the clip information file. Specifically, for example, a clip information file includes reproduction position information of a clip AV stream file and so on.

FIG. 17 is a diagram illustrating a data configuration (syntax) of a clip information file.

Information regarding data to be reproduced that is associated with clip information is recorded in the clip information file. As illustrated in FIG. 17, the following information is recorded:
  clip information "ClipInfo( )" 101;
  sequence information "SequenceInfo( )" 102;
  program information "ProgramInfo( )" 103; and
  CPI information "CPI( )" 104.

Attribute information of the AV stream file corresponding to the clip information file is recorded in the clip information "ClipInfo( )" 101.

Information regarding a reproduction sequence of data to be reproduced that is stored in the AV stream file corresponding to this clip information file is recorded in the sequence information "SequenceInfo( )" 102.

Information regarding a program (program_sequence) that includes a reproduction interval, a time interval, and other definition information of the clip AV stream to be reproduced by the clip information file is recorded in the program information "ProgramInfo( )" 103.

An EP map with an EP (entry point) setting of an I picture presentation time stamp (PTS) or other information is recorded in the CPI information "CPI( )" 104.

The following two examples will be described one by one as examples of recording parental information in this clip information file:

(working example A1) working example of recording parental information in a reserved area in clip information "ClipInfo( )"; and (working example A2) working example of adding a parental information recording area, a new area, to a clip information file and recording parental information thereto.

These two examples will be described one by one below.

6-1. (Working Example A1) Working Example of Recording Parental Information in a Reserved Area in Clip Information "ClipInfo( )"

A description will be given first of a working example of recording parental information in a reserved area in clip information "ClipInfo( )."

As described earlier with reference to FIG. 17, attribute information of the AV stream file corresponding to the clip information file is recorded in the clip information "ClipInfo( )" 101.

FIG. 18 is a diagram illustrating a data configuration (syntax) of the clip information "ClipInfo( )" 101.

For example, the following pieces of information are recorded in the clip information "ClipInfo( )" as illustrated in FIG. 18:

(C1) stream type;
(C2) encoding information;
(C3) TS rating information; and
(C4) source packet information.

As illustrated in FIG. 18, this clip information "ClipInfo( )" has an 8-bit unused reserved area 105.

Parental rating is recorded by using the reserved area 105.

Figure 19:
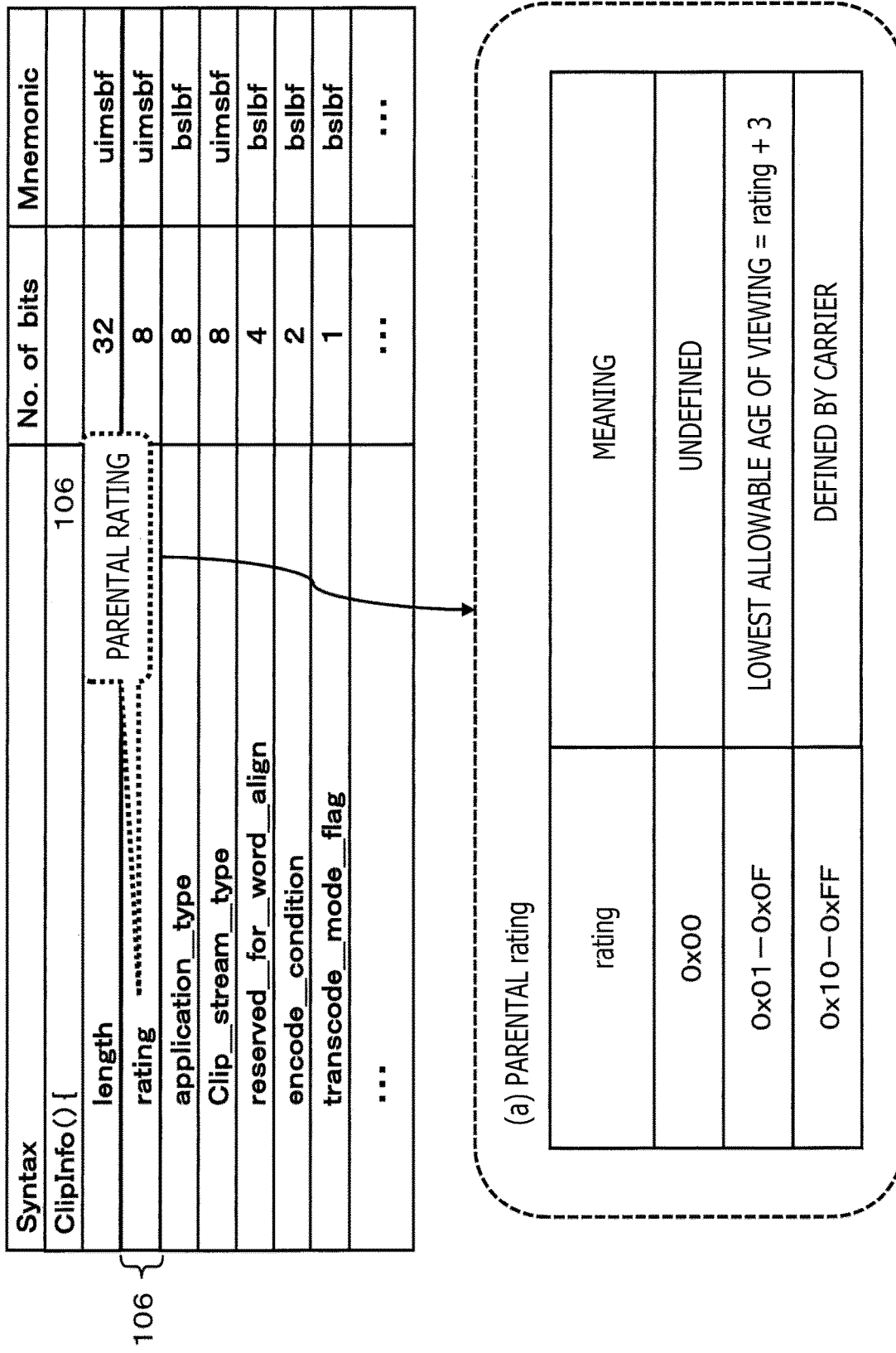
FIG. 19 is a diagram describing an example in which a reserved area (8 bits) of the clip information "ClipInfo( )" of the clip information file is set as a recording area of parental rating information.

FIG. 19 illustrates an example in which the reserved area (8 bits) of the clip information "ClipInfo( )" of the clip information file is set as a recording area of parental rating information.

FIG. 19 illustrates a diagram describing a data configuration (syntax) of part of clip information "ClipInfo( )" of a clip information file and detailed information regarding parental rating information recorded in the clip information "ClipInfo( )."

As illustrated at the top in FIG. 19, the reserved area of the clip information "ClipInfo( )" of the clip information file is set as a recording area of a parental rating 106.

The following identification data regarding content to be reproduced using this clip information file, i.e., content stored in the clip AV stream file, is recorded in the parental rating 106:

(1) whether the content to be reproduced using the clip information file has a prescribed lowest allowable age of reproduction; and (2) in the case where the content has a prescribed lowest allowable age of reproduction, what is the lowest allowable age of reproduction?

Specific examples of recording of the parental rating 106 and meanings of ratings are as illustrated in FIG. 19(a) and as follows:

Rating=0x00: Undefined;
Rating=0x01-0x0F: Lowest allowable age of viewing equal to the rating plus 3; and
Rating=0x00: Defined by carrier.

These are the same settings as those of the parental rating recorded in the reproduction control information compliant with the MPEG-2 TS format and the MMT format described earlier with reference to FIGS. 12 to 15.

"Rating=0x01-0x0F" means that a setting from 0x01=1 to 0x0F=15 can be recorded and that a lowest allowable age of viewing can be set in the range of 3 to 18 years old for the setting from 1 to 15 in this field.

Reproduction control information including such parental information is recorded in the clip information file.

It should be noted that the example of recording ratings illustrated in FIG. 19(a) is merely an example and that other configuration may be used for the recording process.

For example, a value representing a lowest allowable age of viewing may be recorded as 8-bit data in an 'as-is' manner for setting.

This parental information is used as reproduction control information of the clip AV stream file associated with the clip information file in which parental information is recorded.

In the case where content recorded in media such as BD, i.e., content stored in a clip AV stream file, is reproduced, the reproduction process is performed by referring to the clip information file associated with the clip AV stream file regardless of whether data stored in the clip AV stream file is in MPEG-2 TS format or MMT format.

The reproduction apparatus that performs the reproduction process can determine the following in relation to content stored in the clip AV stream file associated with this clip information file by referring to parental information recorded in the clip information file:

(1) whether the content has a prescribed lowest allowable age of reproduction; and (2) in the case where the content has a prescribed lowest allowable age of reproduction, what is the lowest allowable age of reproduction?

Further, in the case where the content stored in the clip AV stream file associated with the clip information file has a prescribed lowest allowable age of reproduction, the reproduction apparatus compares viewer's age information stored in advance in the memory of the reproduction apparatus and the setting of this "parental information," thus allowing the apparatus to reproduce the content or cancel the reproduction. That is, reproduction can be controlled in accordance with viewer's age.

It should be noted that the recording apparatus that records MPEG-2 TS format data or MMT format data, received via broadcasting waves or a network, to a recording medium such as a BD performs the following process.

That is, parental information recorded as control information compliant with the MPEG-2 TS format described earlier with reference to FIGS. 12 and 13 or parental information recorded as control information compliant with the MMT format described with reference to FIGS. 14 and 15 is acquired first.

Next, this parental information is recorded in a clip information file and then to media.

That is, a clip information file having the recorded data illustrated in FIGS. 18 and 19 is generated and recorded in media.

Such a process allows the reproduction apparatus to control the reproduction in accordance with the parental information initially set in content received via broadcasting waves or a network, and specifically, in accordance with the viewer's age.

6-2. (Working Example A2) Working Example of Adding a Parental Information Recording Area, a New Area, to a Clip Information File and Recording Parental Information Thereto A description will be given next of a working example of adding a parental information recording area, a new area, to a clip information file and recording parental information thereto.

FIG. 20 is a diagram illustrating a data configuration (syntax) of a clip information file of the present working example.

The following pieces of information similar to those described with reference to FIG. 17 are recorded in the clip information file illustrated in FIG. 20:
clip information "ClipInfo( )" 101;
sequence information "SequenceInfo( )" 102;
program information "ProgramInfo( )" 103; and
CPI information "CPI( )" 104.

Further, the following information is recorded in the clip information file illustrated in FIG. 20:
parental information "ParentalInfo( )" 110.

It should be noted that a parental information recording area address 111 is recorded in the area at the beginning of the clip information file.

A description will be given of a specific data configuration (syntax) of the parental information "ParentalInfo( )" 110 recorded in the clip information file illustrated in FIG. 20 with reference to FIG. 21.

As illustrated in FIG. 21, the following pieces of data are included in the parental information "ParentalInfo( )" 110 recorded in the clip information file illustrated in FIG. 20:
data length (length)=byte count of parental information; and
rating (rating)=parental rating (viewing age restriction information) 113.

Specific age restriction information of content is recorded in the parental rating 113 illustrated in the figure.

Specific examples of recording of the parental rating 113 and meanings of ratings are as illustrated in FIG. 21(a) and as follows:
Rating=0x00: Undefined;
Rating=0x01-0x0F: Lowest allowable age of viewing equal to the rating plus 3; and
Rating=0x00: Defined by carrier.

These are the same settings as those of the parental rating recorded in the reproduction control information compliant with the MPEG-2 TS format and the MMT format described earlier with reference to FIGS. 12 to 15.

"Rating=0x01-0x0F" means that a setting from 0x01=1 to 0x0F=15 can be recorded and that a lowest allowable age of viewing can be set in the range of 3 to 18 years old for the setting from 1 to 15 in this field.

Reproduction control information including such parental information is recorded in the clip information file.

It should be noted that the example of recording ratings illustrated in FIG. 21(a) is merely an example and that other configuration may be used for the recording process.

For example, a value representing a lowest allowable age of viewing may be recorded as 8-bit data in an 'as-is' manner for setting.

This parental information is used as reproduction control information of the clip AV stream file associated with the clip information file in which parental information is recorded.

In the case where content recorded in media such as BD, i.e., content stored in a clip AV stream file, is reproduced, the reproduction process is performed by referring to the clip information file associated with the clip AV stream file regardless of whether data stored in the clip AV stream file is in MPEG-2 TS format or MMT format.

The reproduction apparatus that performs the reproduction process can determine the following in relation to content stored in the clip AV stream file associated with this clip information file by referring to parental information recorded in the clip information file:

(1) whether the content has a prescribed lowest allowable age of reproduction; and
(2) in the case where the content has a prescribed lowest allowable age of reproduction, what is the lowest allowable age of reproduction?

Further, in the case where the content stored in the clip AV stream file associated with the clip information file has a prescribed lowest allowable age of reproduction, the reproduction apparatus compares viewer's age information stored in advance in the memory of the reproduction apparatus and the setting of this "parental information," thus allowing the apparatus to reproduce the content or cancel the reproduction. That is, reproduction can be controlled in accordance with viewer's age.

It should be noted that the recording apparatus that records MPEG-2 TS format data or MMT format data, received via broadcasting waves or a network, to a recording medium such as a BD performs the following process.

That is, parental information recorded as control information compliant with the MPEG-2 TS format described earlier with reference to FIGS. 12 and 13 or parental information recorded as control information compliant with the MMT format described with reference to FIGS. 14 and 15 is acquired first.

Next, this parental information is recorded in a clip information file and then to media.

That is, a clip information file having the recorded data illustrated in FIGS. 20 and 21 is generated and recorded in media.

Such a process allows the reproduction apparatus to control the reproduction in accordance with the parental information initially set in content received via broadcasting waves or a network, and specifically, in accordance with the viewer's age.

7. Examples of Recording Parental Information in a Playlist File

A description will be given next of examples of recording parental information in a playlist file.

In the configuration described below, the following identification data, i.e., parental information, is recorded in a playlist file that includes reproduction control information regarding content recorded in media such as a BD (content in a clip AV stream file):

(1) whether the content to be reproduced using the playlist file has a prescribed lowest allowable age of reproduction; and
(2) in the case where the content has a prescribed lowest allowable age of reproduction, what is the lowest allowable age of reproduction?

A description will be given first of a data configuration (syntax) of a playlist file with reference to FIG. 22.

As described earlier, information regarding data to be reproduced using a playlist file is recorded in the playlist file. Specifically, for example, a playlist file prescribes an order of reproduction of content or other information and has information specifying a clip information file in which reproduction position information or other information is recorded.

FIG. 22 is a diagram describing a data configuration (syntax) of a playlist file.

A description will be given of main pieces of data recorded in the playlist illustrated in FIG. 22.

A version number (version number) represents the version number of this playlist.

A length (length) represents the byte count from immediately after this length field to the end of the data included in the playlist file.

User interface application information "UIAppInfoPlayList" 121 is an area where user interface application parameters regarding this playlist are recorded.

Data used, for example, for the display of the recorded content (program) list described with reference to FIG. 16 is recorded in this field.

The following two examples will be described one by one as examples of recording parental information in this playlist file:

(working example B1) working example of recording parental information in a reserved area in the user interface application information "UIAppInfoPlayList"; and (working example B2) working example of adding a parental information recording area, a new area, to a playlist file and recording parental information thereto.

These two examples will be described one by one below.

7-1. (Working Example B1) Working Example of Recording Parental Information in a Reserved Area in User Interface Application Information "UIAppInfoPlayList">

A description will be given first of a working example of recording parental information in a reserved area in the user interface application information "UIAppInfoPlayList."

As described earlier with reference to FIG. 22, the user interface application information "UIAppInfoPlayList" 121 is an area where user interface application parameters regarding this playlist are recorded.

Data used, for example, for the display of the recorded content (program) list described with reference to FIG. 16 is recorded in this field.

The user interface application information "UIAppInfoPlayList" 121 will be described in detail with reference to FIG. 23.

FIG. 23 is a diagram illustrating a data configuration (syntax) of the user interface application information "UIAppInfoPlayList" 121.

For example, the following pieces of information are recorded in the user interface application information "UIAppInfoPlayList" 121 as illustrated in FIG. 23:

(P1) recording date and time (record_time_and_date);
(P2) channel number (channel_number);
(P3) channel name (channel_name);
(P4) recorded program name (Playlist_name); and
(P5) recorded program details (Playlist_detail).

All these pieces of data are available for use as data displayed in the recorded content (program) list illustrated in FIG. 16.

(P1) Recording Date and Time (Record_Time_and_Date)

This field is a 56-bit (4×14) field where recording start date and time of content subject to reproduction control (content to be reproduced that is stored in the stream file) in this playlist is recorded. This field includes 14 numerals representing year/month/day/hour/minutes/seconds in the form of 4-bit binary coded decimal (BCD).

For example, 2016/07/01:01:02:03 is recorded as "0x20160701010203."

(P2) Channel Number (Channel_Number)

This field represents a channel number or a service number of an entity that provides content subject to reproduction control (content to be reproduced that is stored in the stream file) in this playlist.

(P3) Channel Name (Channel_Name)

This field represents a channel name or a service name of an entity that provides content subject to reproduction control (content to be reproduced that is stored in the stream file) in this playlist.

(P4) Recorded Program Name (Playlist_Name)

The name of this playlist, and in many cases, a title of content subject to reproduction control (content to be reproduced that is stored in the stream file) of this playlist, is recorded in this field.

(P5) Recorded Program Details (Playlist_Detail)

Detailed information of content subject to reproduction control (content to be reproduced that is stored in the stream file) of this playlist such as program genre, cast, and so on is recorded in this field.

As described above, the following pieces of information are recorded in a playlist file prescribed in the BDAV format as data available for use as data displayed in the recorded content (program) list described earlier with reference to FIG. 16:

(P1) recording date and time (record_time_and_date);
(P2) channel number (channel_number);
(P3) channel name (channel_name);
(P4) recorded program name (Playlist_name); and
(P5) recorded program details (Playlist_detail).

In order to display a recorded content (program) list illustrated in FIG. 16, it is necessary to generate a playlist file that includes these pieces of data at the time of the recording process.

For example, an information processing apparatus that receives delivered content (programs) from broadcasting stations in MPEG-2 TS format or in MMT format data and records the received content in an information recording medium (media) extracts data equivalent to (P1) to (P5) listed above from the received data and generates a playlist file that includes these pieces of data recorded therein.

However, no area is set in this user interface application information "UIAppInfoPlayList" of the playlist file illustrated in FIG. 23 to record parental information such as lowest allowable age of content reproduction.

For this reason, parental information is recorded by using part of a reserved area 122 of the user interface application information "UIAppInfoPlayList" of the playlist file illustrated in FIG. 23.

A 16-bit free area is set in the reserved area 122 illustrated in FIG. 23.

Of the 16 bits, 8 bits are used as a recording area of parental rating information.

Figure 24:
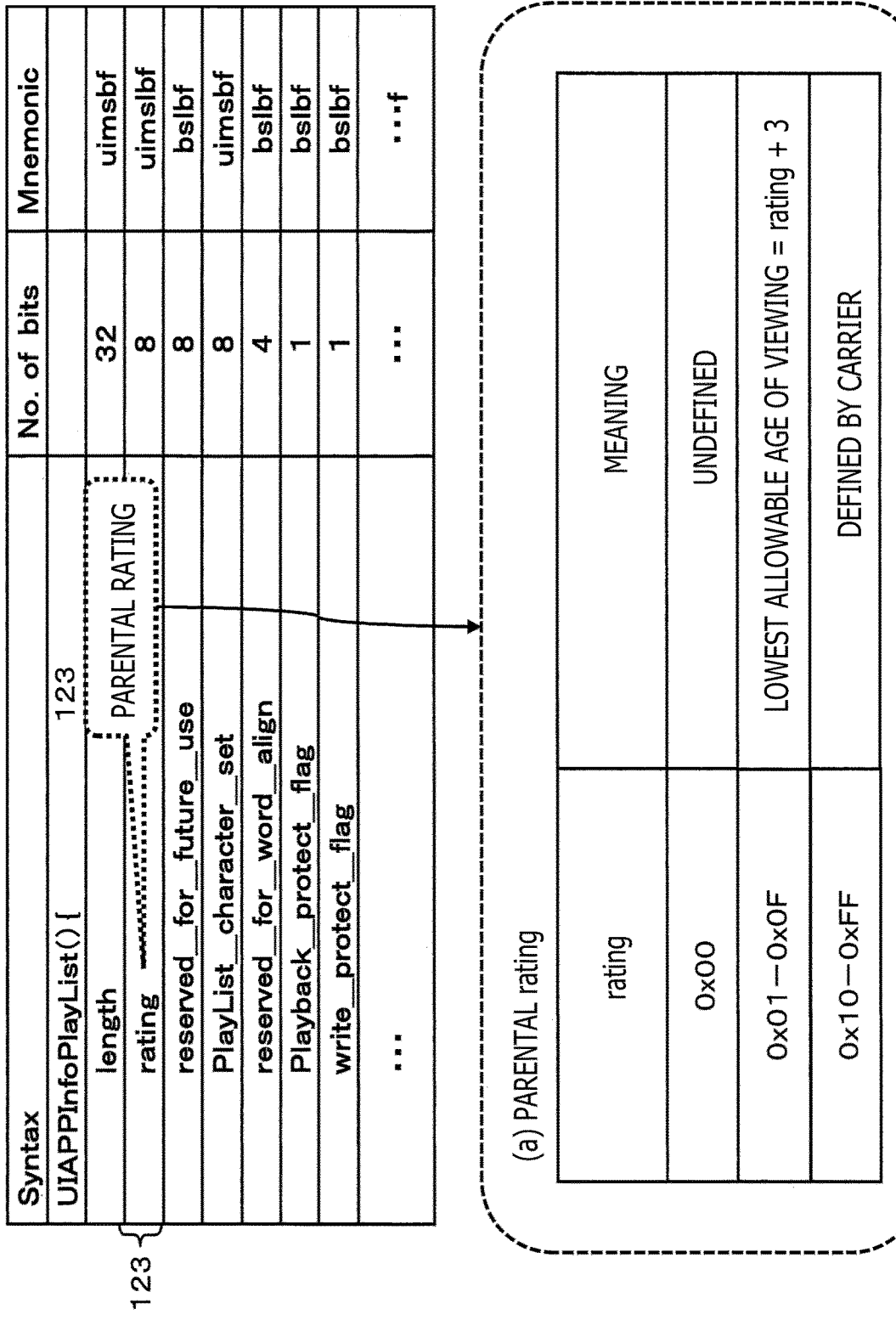
FIG. 24 is a diagram describing details of parental rating information recorded in the user interface application information "UIAppInfoPlayList."

FIG. 24 illustrates an example of setting part (8 bits) of the reserved area 122 of the user interface application information "UIAppInfoPlayList" of the playlist file as a recording area of parental rating information.

FIG. 24 illustrates diagrams describing a data configuration (syntax) of part of the user interface application information "UIAppInfoPlayList" of the playlist file and details of parental rating information recorded in the user interface application information "UIAppInfoPlayList."

As illustrated at the top in FIG. 24, part (8 bits) of the reserved area 122 of the user interface application information "UIAppInfoPlayList" of the playlist file is set as a recording area of a parental rating 123.

The following identification data regarding content to be reproduced using this playlist, i.e., content stored in the clip AV stream file, is recorded in the parental rating 123:

(1) whether the content to be reproduced using the playlist has a prescribed lowest allowable age of reproduction; and (2) in the case where the content has a prescribed lowest allowable age of reproduction, what is the lowest allowable age of reproduction?

Specific examples of recording of the parental rating 123 and meanings of ratings are as illustrated in FIG. 24(a) and as follows:

Rating=0x00: Undefined;
Rating=0x01-0x0F: Lowest allowable age of viewing equal to the rating plus 3; and
Rating=0x00: Defined by carrier.

These are the same settings as those of the parental rating recorded in the reproduction control information compliant with the MPEG-2 TS format and the MMT format described earlier with reference to FIGS. 12 to 15.

"Rating=0x01-0x0F" means that a setting from 0x01=1 to 0x0F=15 can be recorded and that a lowest allowable age of viewing can be set in the range of 3 to 18 years old for the setting from 1 to 15 in this field.

Reproduction control information including such parental information is recorded in the playlist file.

It should be noted that the example of recording ratings illustrated in FIG. 24(a) is merely an example and that other configuration may be used for the recording process.

For example, a value representing a lowest allowable age of viewing may be recorded as 8-bit data in an 'as-is' manner for setting.

It should be noted that this parental information is used as reproduction control information of content identified by a clip (clip information file and clip AV stream file) associated with the playlist file in which parental information is recorded.

However, there is a case in which a plurality of clips (clip information files and clip AV stream files) is associated with a single playlist file. That is, a plurality of clip AV stream files may exist that store data to be reproduced by using a single playlist file.

The plurality of these pieces of content stored in clip AV stream files is not necessarily identical in lowest allowable age of viewing.

A description will be given of a specific example thereof with reference to FIG. 25.

Figure 25:
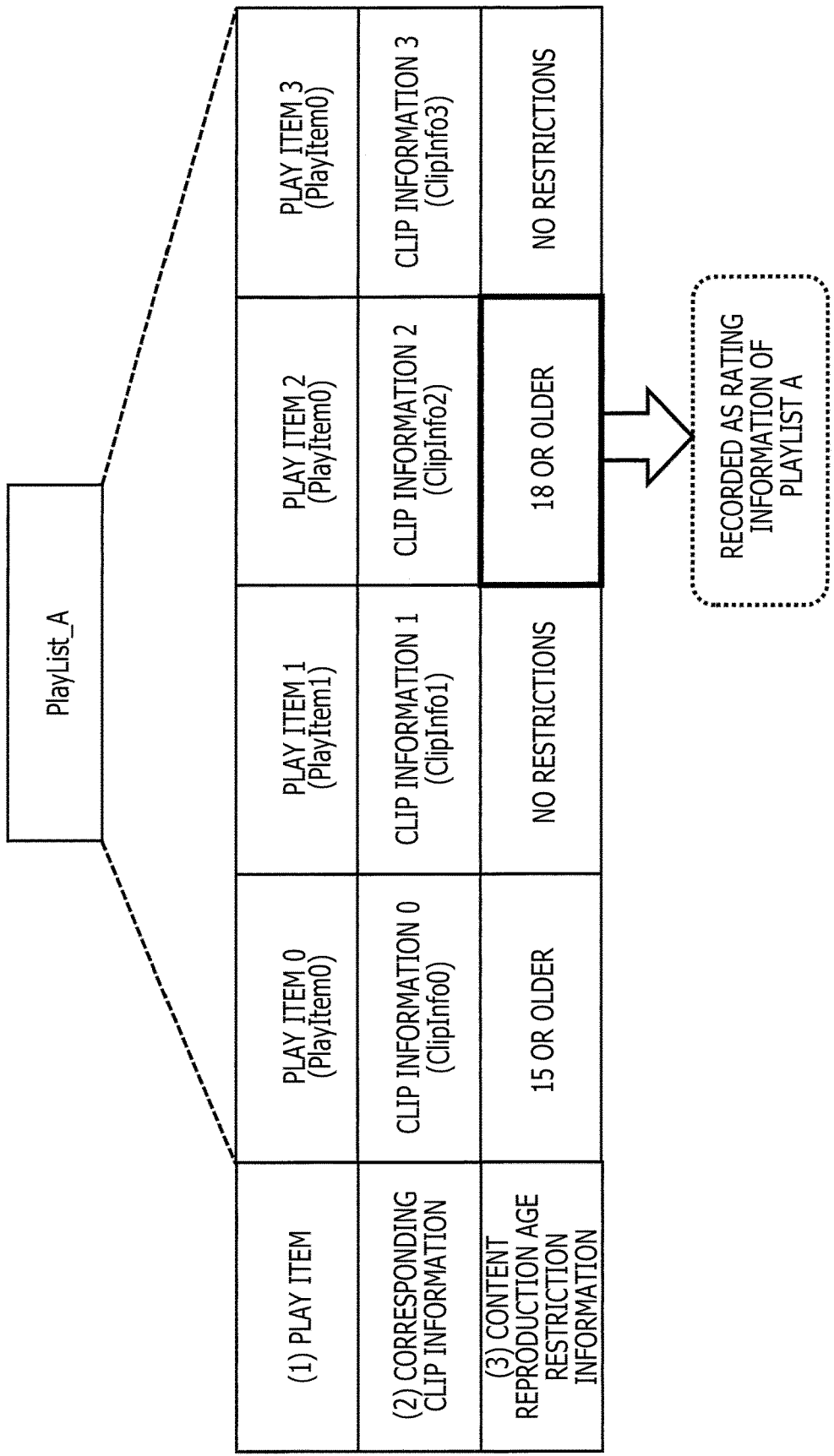
FIG. 25 is a diagram describing an example of setting a reproduction restriction for content corresponding to a plurality of play items recorded in a playlist file.

FIG. 25 illustrates a plurality of play items recorded in a playlist file, i.e., four play items 0 to 3.

A separate clip information file is associated with each of the four play items 0 to 3, and further, content stored in the clip AV stream file associated with each clip information file is reproduced.

However, content stored in the clip AV stream files associated with the respective clip information files differs in age restriction information for content reproduction permission as illustrated in the figure.

The following settings are specified in the example illustrated in the figure:

Play item 0: Age restriction for permission of target content reproduction by clip information 0=Reproduction permitted in the case where the viewer is 15 years or older;

Play item 1: Age restriction for permission of target content reproduction by clip information 1=No restrictions;

Play item 2: Age restriction for permission of target content reproduction by clip information 2=Reproduction permitted in the case where the viewer is 18 years or older; and Play item 3: Age restriction for permission of target content reproduction by clip information 3=No restrictions.

As described above, content to be reproduced may differ in age permitted for reproduction of content using a single playlist file.

In such a case, parental information, i.e., a parental rating, reflecting the age permitted for reproduction set in the content having, of all the pieces of content, the most rigorous age restriction for reproduction permission, is recorded in the playlist file.

In the example illustrated in FIG. 25, "Play item 2: Age restriction for permission of target content reproduction by clip information 2=Reproduction permitted in the case where the viewer is 18 years or older" is the content with the most rigorous restriction information. Therefore, the parental rating whose lowest allowable age of reproduction is 18 years or older is recorded in the playlist file.

The recording apparatus that records MPEG-2 TS format data or MMT format data, received via broadcasting waves or a network, to a recording medium such as a BD performs the following process.

First, clip information files and clip AV stream files associated with a playlist file are selected, and control information associated with content stored in the selected clip AV stream file is acquired.

That is, parental information recorded as control information compliant with the MPEG-2 TS format described earlier with reference to FIGS. 12 and 13 or parental information recorded as control information compliant with the MMT format described with reference to FIGS. 14 and 15 is acquired first.

Next, parental information with the most rigorous age restriction is selected from among the plurality of pieces of parental information corresponding to the plurality of selected clip AV stream files, and this parental information is recorded in the playlist file and then to media.

That is, a playlist file having the recorded data illustrated in FIG. 24 is generated and recorded in media.

Such a process allows the reproduction apparatus to control the reproduction in accordance with the parental information initially set in content received via broadcasting waves or a network, and specifically, in accordance with the viewer's age.

In the case where content recorded in media such as BD, i.e., content stored in a clip AV stream file, is reproduced, the reproduction process is performed by referring to the playlist file associated with the clip AV stream file regardless of whether data stored in the clip AV stream file is in MPEG-2 TS format or MMT format.

The reproduction apparatus that performs the reproduction process can determine the following in relation to content stored in the clip AV stream file associated with this playlist file by referring to parental information recorded in the playlist file:

(1) whether the content has a prescribed lowest allowable age of reproduction; and (2) in the case where the content has a prescribed lowest allowable age of reproduction, what is the lowest allowable age of reproduction?

Further, in the case where the content stored in the clip AV stream file associated with the playlist file has a prescribed lowest allowable age of reproduction, the reproduction apparatus compares viewer's age information stored in advance in the memory of the reproduction apparatus and the setting of this "parental information," thus allowing the apparatus to reproduce the content or cancel the reproduction. That is, reproduction can be controlled in accordance with viewer's age.

FIG. 26 is an example of a list of content (list of recorded programs) that can be displayed on a display section of a reproduction apparatus such as a TV set by referring to a playlist file in which parental information is recorded.

As with the content list described with reference to FIG. 16, titles, recording dates and times, broadcasting stations, and attached information are displayed in the content list. Further, it is possible to display information regarding lowest age permitted for reproduction.

Information regarding lowest age permitted for reproduction is information that can be displayed if one refers to parental information recorded in the playlist file.

The user (viewer) can confirm the lowest age permitted for reproduction of this playlist file on the basis of this content list.

7-2. (Working Example B2) Working Example of Adding a Parental Information Recording Area, a New Area, to a Playlist File and Recording Parental Information A description will be given next of a working example of adding a parental information recording area, a new area, to a playlist file and recording parental information thereto.

As a form of parental information recorded in a playlist file, a recording area of parental information 125 may be added in addition to the above as a new area for recording information to the playlist file, for example, as illustrated in FIG. 27.

Similar data recorded in the playlist file described earlier with reference to FIG. 22 is recorded in the playlist file illustrated in FIG. 27, and further, the following information is recorded:

parental information "ParentalInfo( )" 125.

It should be noted that a parental information recording area address 126 is recorded in the area at the beginning of the playlist file.

A description will be given of a specific data configuration (syntax) of the parental information "ParentalInfo( )" 125 recorded in the playlist file illustrated in FIG. 27 with reference to FIG. 28.

As illustrated in FIG. 28, the following pieces of data are included in the parental information "ParentalInfo( )" 125 recorded in the playlist file illustrated in FIG. 27:

data length (length)=byte count of parental information; and rating (rating)=parental rating (viewing age restriction information) 127.

Specific age restriction information of content is recorded in the parental rating 127 illustrated in FIG. 28.

Specific examples of recording of the parental rating 127 and meanings of ratings are as illustrated in FIG. 27(*a*) and as follows:

Rating=0x00: Undefined;
Rating=0x01-0x0F: Lowest allowable age of viewing equal to the rating plus 3; and
Rating=0x00: Defined by carrier.

These are the same settings as those of the parental rating recorded in the reproduction control information compliant with the MPEG-2 TS format and the MMT format described earlier with reference to FIGS. 12 to 15.

"Rating=0x01-0x0F" means that a setting from 0x01=1 to 0x0F=15 can be recorded and that a lowest allowable age of viewing can be set in the range of 3 to 18 years old for the setting from 1 to 15 in this field.

Reproduction control information including such parental information is recorded in the playlist file.

It should be noted that the example of recording ratings illustrated in FIG. 28(*a*) is merely an example and that other configuration may be used for the recording process.

For example, a value representing a lowest allowable age of viewing may be recorded as 8-bit data in an 'as-is' manner for setting.

It should be noted that, as with working example B1 described earlier, in the case where there are a plurality of pieces of content (clip AV stream files) to be reproduced using a single playlist file in the working example B2, the most rigorous age restriction value is selected and recorded in the playlist file.

Such a process allows the reproduction apparatus to control the reproduction in accordance with the parental information initially set in content received via broadcasting waves or a network, and specifically, in accordance with the viewer's age.

8. Configuration Example Allowing for Cancellation of Viewing Restriction by Entering a Passcode A description will be given next of a configuration example allowing for cancellation of viewing restriction by entering a passcode.

In the working examples described above, parental information is recorded in at least a clip information file or a playlist file.

This configuration allows the reproduction apparatus to acquire the following information by referring to a database file such as playlist file or clip information file for reproduction control:

(1) whether content stored in the clip AV stream file associated with these database files has a prescribed lowest allowable age of reproduction; and (2) in the case where the content has a prescribed lowest allowable age of reproduction, what is the lowest allowable age of reproduction?

In the case where the content stored in the clip AV stream file associated with a playlist file or a clip information file has a prescribed lowest allowable age of reproduction, the reproduction apparatus compares viewer's age information stored in advance in the memory of the reproduction apparatus and the setting of this "parental information," thus allowing the apparatus to reproduce the content or cancel the reproduction. That is, reproduction can be controlled in accordance with viewer's age.

A description will be given below of a working example allowing for cancellation of this reproduction restriction by entering a passcode prescribed in advance.

FIG. 29 is a diagram similar to that described with reference to FIG. 23 and illustrates a data configuration (syntax) of the user interface application information "UIAppInfoPlayList" of a playlist file.

For example, the following pieces of information are recorded in the user interface application information "UIAppInfoPlayList" as illustrated in FIG. 29:

(P1) recording date and time (record_time_and_date);
(P2) channel number (channel_number);
(P3) channel name (channel_name);
(P4) recorded program name (Playlist_name); and
(P5) recorded program details (Playlist_detail).

All these pieces of data are available for use as data displayed in the recorded content (program) list illustrated in FIG. 26.

As illustrated in FIG. 29, a recording area of a reproduction restriction flag "Playback_protect_flag" 131 is provided in the user interface application information "UIAppInfoPlayList" of the playlist file.

A flag that allows one to specify whether reproduction restriction regarding content to be reproduced using this playlist file is enabled or not can be recorded in this field.

For example, if the reproduction restriction flag is 1, reproduction restriction is enabled, and if the reproduction restriction flag is 0, reproduction restriction is disabled.

It should be noted that the reproduction restriction flag "Playback_protect_flag" 131 illustrated in FIG. 29 is a flag recorded in the playlist file and enabled only for content to be reproduced by that playlist.

As for parental information recorded in the playlist or clip information file described above, it is also possible to switch from enabling to disabling the reproduction restriction in accordance with parental information or vice versa by specifying a setting for this flag.

For example, switching as described below is possible. That is, if the reproduction restriction flag is 1, parental information (reproduction restriction) recorded in this playlist or the clip information file associated with this playlist is enabled, and if the reproduction restriction flag is 0, parental information (reproduction restriction) recorded in this playlist or the clip information file associated with this playlist is disabled.

However, if anybody is allowed to change the flag setting freely, the setting of parental information is meaningless. Therefore, authentication is conducted on the basis of a passcode prescribed in advance, and the flag setting can be changed only in the case where passcode authentication is successful.

This passcode requires registration in advance.

For example, a passcode can be stored in the memory of the reproduction apparatus or recorded in media having content recorded therein.

A description will be given of an example of a passcode recording position in the case where a passcode is recorded in media having content recorded therein with reference to FIGS. 30 and 31.

FIG. 30 is a diagram illustrating a data configuration (syntax) of a BDAV management information file "info.bdav," a database file set at the highest level of a BDAV directory (refer to FIG. 11).

Integral management information of the BDAV directory as a whole such as position information of various pieces of data set in the BDAV directory is recorded in the BDAV management information file "info.bdav."

UI application information "UIAppInfoBDAV( )" 132 illustrated in FIG. 30 is an example of one of the pieces of recording information.

FIG. 31 illustrates a data configuration (syntax) of UI application information "UIAppInfoBDAV( )" 132.

As illustrated in FIG. 31, a recording area of a PIN code (passcode) 133 is set in the UI application information "UIAppInfoBDAV( )" 132.

A passcode (numeric sequence) for changing the setting of the reproduction restriction flag "Playback_protect_flag" 131 in the playlist file described with reference to FIG. 29 is recorded in this field.

For example, a four-digit decimal numeric sequence is recorded.

The information processing apparatus with media storing content such as a BD inserted performs the following process, for example, when changing the setting of the reproduction restriction flag "Playback_protect_flag" 131 of the playlist file illustrated in FIG. 29:

request the user attempting to change the flag setting to enter a passcode; and compare the entered passcode against the passcode recorded in the recording area of the PIN code (passcode) 133 in the UI application information "UIAppInfoBDAV( )" 132 illustrated in FIG. 31.

Changing the setting of the reproduction restriction flag "Playback_protect_flag" 131 of the playlist file is permitted only in the case where the comparison is successful.

Such a process allows only the user who knows the passcode to change the setting of enabling or disabling parental information.

9. Working Example of Recording Parental Information in a Usage Control Information File (Usage File)

A description will be given next of a working example of recording parental information in a usage control information file (Usage file).

In the working examples described above, a description has been given of examples in which parental information is recorded in a playlist file or a clip information file.

However, there is a risk that data recorded in a playlist file or a clip information file may be overwritten and tampered with.

A description will be given of a working example of recording parental information in a usage control information file (Usage file) as a configuration for preventing such tampering.

Figure 32:
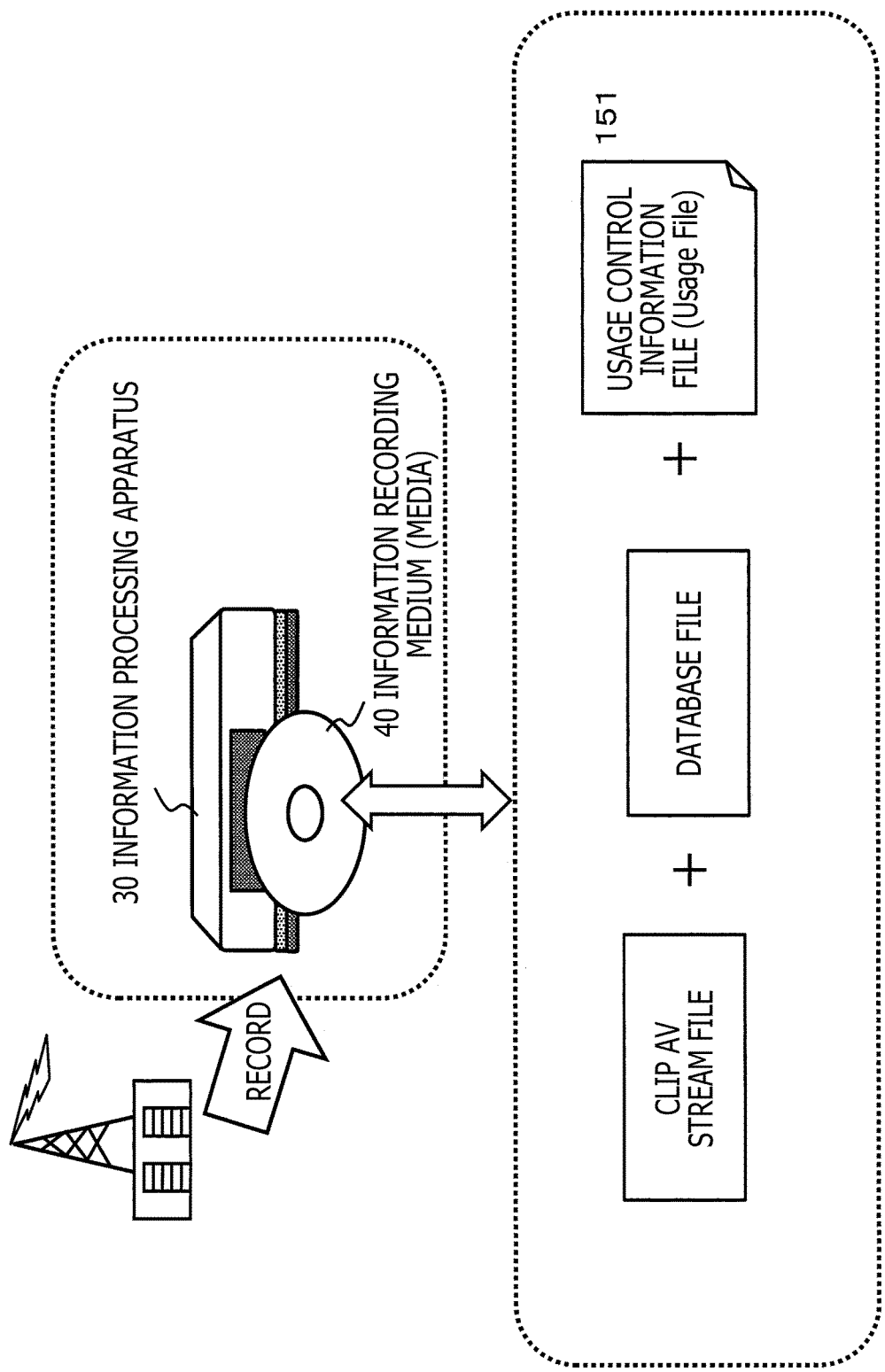
FIG. 32 is a diagram describing an example of recording "parental information" to a usage control information file and then to media.

FIG. 32 is a diagram describing an outline of the process performed by the information processing apparatus 30 in accordance with this working example.

The information processing apparatus 30 receives MMT format data from the transmission apparatus 20 such as broadcasting station. The received data includes a TLV packet sequence storing MMTP packets.

The information processing apparatus 30 records this received data in an information recording medium (media) 40.

The recording process is performed, for example, by generating BDAV format data. A clip AV stream file included in BDAV format data includes TS packets compliant with the MPEG-2 TS format, an MMTP packet sequence compliant with the MMT format, or a TLV packet sequence as described earlier.

In the present working example, not only a clip AV stream file but also database files such as playlist and clip information file and further a usage control information file (Usage File) 151 are generated as illustrated at the bottom in FIG. 32, and then parental information is recorded in the usage control information file (Usage File) 151, after which the usage control information file 151 is recorded in an information recording medium (media) together with content.

A description will be given of an example of data recorded in the usage control information file 151 with reference to FIG. 33.

Figure 33:
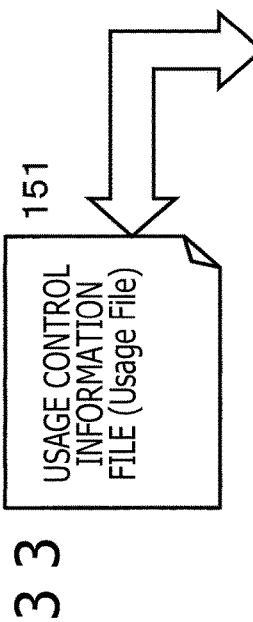
FIG. 33 is a diagram describing an example of recorded data of the usage control information file.

As illustrated in FIG. 33, the information processing apparatus 30 records, for example, the following pieces of identification data in the usage control information file 151 and then the usage control information file 151 in the information recording medium (media) 40:

(a) EPN (1 bit): Information regarding whether or not output data needs encryption during copying process;

(b) CCI (2 bits): Copying control information;

(c) Move_Not_Allowed (1 bit): Moving process permission information;

(d) Trusted_Source_Mark_Screening_Required (1 bit): Information regarding whether or not source confirmation process (electronic watermark detection process) is required; and (e) Digital_Output_Flag (1 bit): Digital output permission standard information.

Further, the following parental rating 152 is recorded:

(f) the parental rating 152 is 8-bit data that indicates (1) whether content associated with this usage control information file, i.e., content stored in the clip AV stream file, has a prescribed lowest allowable age of reproduction; and (2) in the case where the content has a prescribed lowest allowable age of reproduction, what is the lowest allowable age of reproduction?

Figure 34:
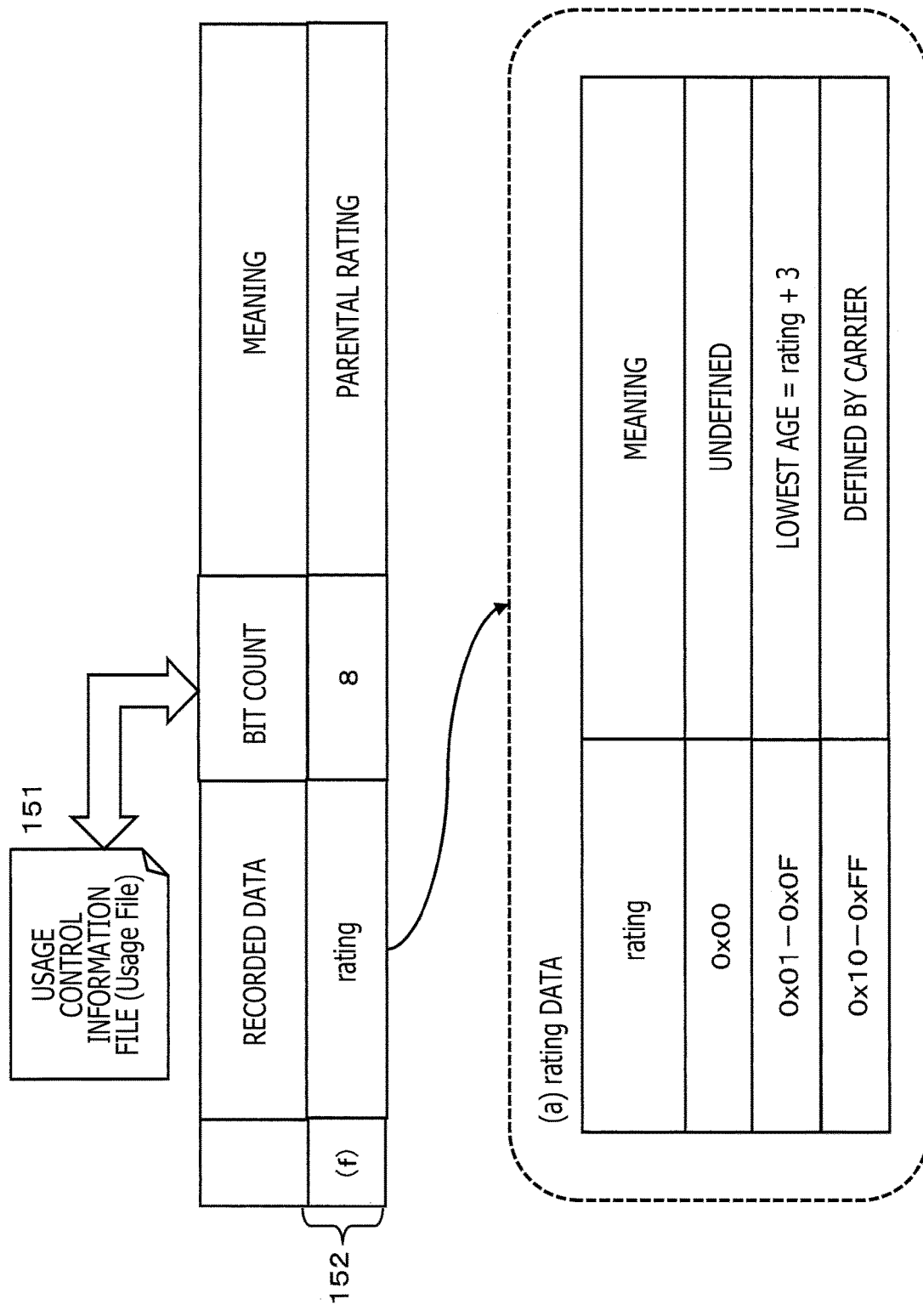
FIG. 34 is a diagram describing a specific example of a parental rating, recorded data of the usage control information file.

Specific examples of recording of the parental rating 152 and meanings of ratings are as illustrated in FIG. 34(*a*) and as follows:

Rating=0x00: Undefined;

Rating=0x01-0x0F: Lowest allowable age of viewing equal to the rating plus 3; and Rating=0x00: Defined by carrier.

These are the same settings as those of the parental rating recorded in the reproduction control information compliant with the MPEG-2 TS format and the MMT format described earlier with reference to FIGS. 12 to 15.

It should be noted that the example of recording ratings illustrated in FIG. 34(*a*) is merely an example and that other configuration may be used for the recording process.

For example, a value representing a lowest allowable age of viewing may be recorded as 8-bit data in an 'as-is' manner for setting.

It should be noted that these pieces of data recorded in a usage control information file (Usage File) can be recorded, for example, for each given content category such as for each program, and copying control information listed above under (a) to (e), parental information listed under (f), and other information corresponding to each piece of content (each program), can be recorded in the single usage control information file 151 in an enumerated manner.

It should be noted that data included in the usage control information file 151 is used to generate a key (title key) that will be used to decode content stored in the clip AV stream file.

This is a provision of the AACS (Advanced Access Content System) that prescribes the reproduction process of BDAV format data. The reproduction process of BDAV format data needs to be conducted by decoding encrypted content and performing a reproduction sequence in accordance with the AACS provision. A title key generation process using data included in the usage control information file 151 is included as a processing step of the decoding sequence of the AACS provision.

If the data included in the usage control information file 151 is changed, i.e., tampered with, a correct title key cannot be generated. As a result, encrypted content stored in the clip AV stream file recorded in the media cannot be decoded and reproduced.

That is, if parental information, data included in the usage control information file 151, is tampered with, encrypted content stored in the clip AV stream file cannot be decoded and reproduced.

The present working example prevents tampering with parental information by setting parental information as data included in the usage control information file 151, thus allowing for rigorous use of parental information.

10. Working Example of Recording Parental Information in a Header of a Packet Stored in a Clip AV Stream File A description will be given next of a working example of recording parental information in a header of a packet stored in a clip AV stream file.

An outline will be given regarding a configuration, a premise of the present disclosure, i.e., an additional header in which copying control information is recorded, with reference to FIGS. 35 and 36.

In the configuration of the present disclosure, the information processing apparatus that accepts input of data sent from a transmission apparatus such as broadcasting station and records data in media acquires a service description table (MH-SDT) included in input MMT format data and reads copying control information recorded in the service description table (MH-SDT).

Further, the information processing apparatus generates a header (additional header) having copying control information, acquired from the service description table (MH-SDT), recorded therein, inserts the header at the beginning of each TLV packet or at the beginning of each MMTP packet, and records the packet to media.

Figure 35:
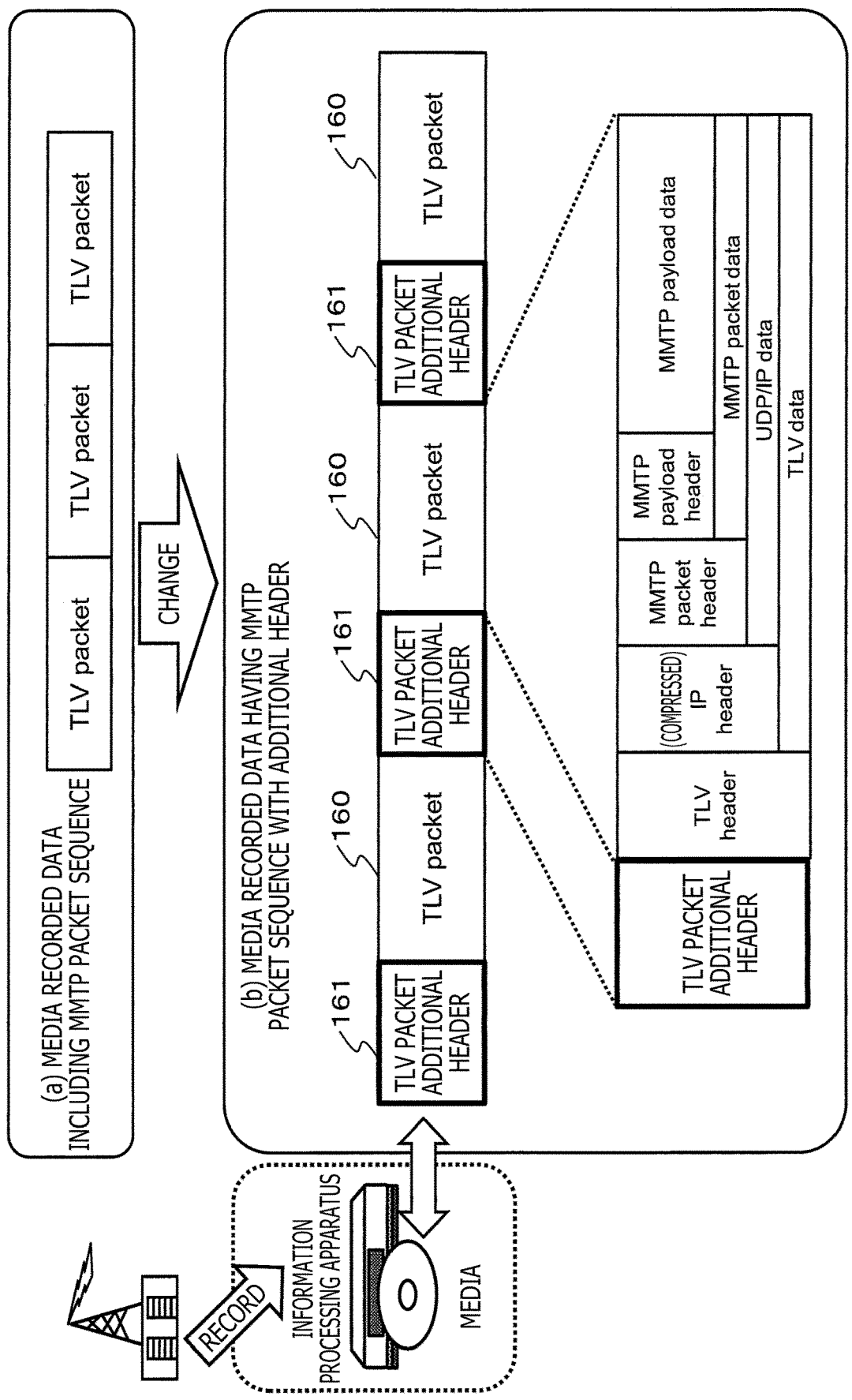
FIG. 35 is a diagram describing an example of setting an additional header in the case where a packet sequence in the clip AV stream file to be recorded in media is a TLV packet sequence.

FIG. 35 is a diagram illustrating a processing example in the case where a packet sequence in the clip AV stream file to be recorded in media is a TLV packet sequence.

In the configuration of the present disclosure, the information processing apparatus that accepts input of data sent from a transmission apparatus such as broadcasting station and records data in media (initial recording) performs the recording by setting an additional header (TLV packet additional header 161) at the beginning of each TLV packet 160 recorded in the media as illustrated in FIG. 35.

Copying control information corresponding to data stored in the subsequent TLV packet 160 is recorded in the TLV packet additional header 161.

Specifically, the additional header including the following values recorded therein is recorded:

(A) Digital recording control information (digital_recording_control_data);

(B) Encryption information (encryption_mode);

(C) Encryption flag (encryption_flag); and (D) Copying count restriction information (copy_restriction_mode).

By recording this additional header in media, the copying apparatus (information processing apparatus) can control copying of data stored in the subsequent TLV packet on the basis of data recorded in the additional header.

Further, in the present working example, parental information is recorded in the TLV packet additional header 161.

The reproduction of data stored in the subsequent TLV packet can be controlled on the basis of parental information recorded in the additional header.

The example illustrated in FIG. 35 is a processing example in the case where data included in the clip AV stream file recorded in media is a TLV packet sequence.

A description will be given next of an example of setting an additional header in the case where data included in the clip AV stream file recorded in media is an MMTP packet sequence with reference to FIG. 36.

Figure 36:
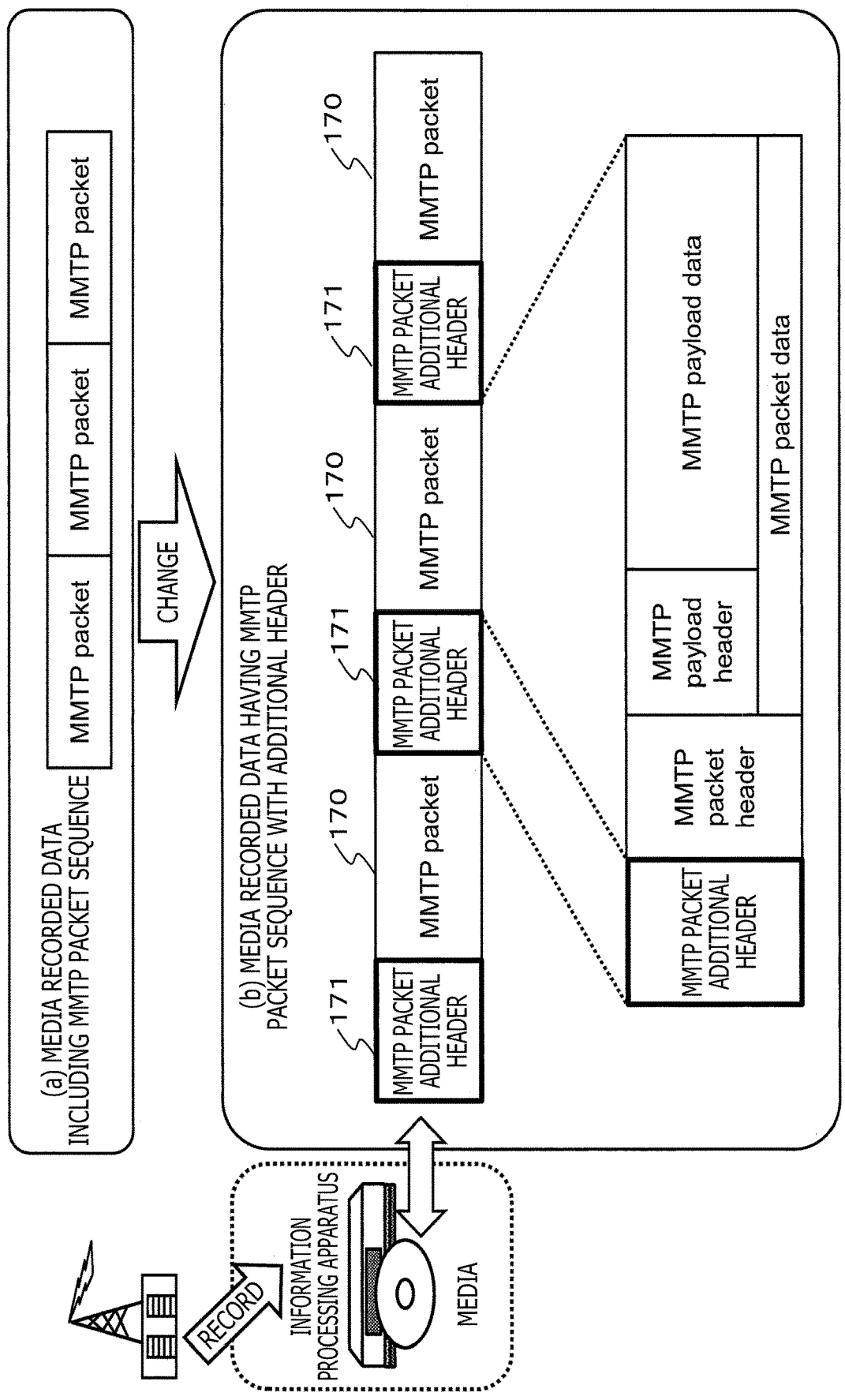
FIG. 36 is a diagram describing an example of setting an additional header in the case where data included in the clip AV stream file to be recorded in media is an MMTP packet sequence.

In this case, the information processing apparatus that accepts input of data sent from a transmission apparatus such as broadcasting station and records data in media (initial recording) performs the recording by setting an additional header (MMTP packet additional header 171) at the beginning of each MMTP packet 170 recorded in the media as illustrated in FIG. 36.

Copying control information corresponding to data stored in the subsequent MMTP packet 170 is recorded in the MMTP packet additional header 171.

That is, the additional header including the following values recorded therein is recorded:

(A) Digital recording control information (digital_recording_control_data);

(B) Encryption information (encryption_mode);

(C) Encryption flag (encryption_flag); and (D) Copying count restriction information (copy_restriction_mode).

By recording this additional header in media, the copying apparatus (information processing apparatus) can control copying of data stored in the subsequent TLV packet on the basis of data recorded in the additional header.

Further, in the present working example, parental information is recorded in the MMTP packet additional header 171.

The reproduction of data stored in the subsequent MMTP packet can be controlled on the basis of parental information recorded in the additional header.

A description will be given next of an example of a data configuration (syntax) of data recorded in the TLV packet additional header 161 illustrated in FIG. 35 and the MMTP packet additional header 171 illustrated in FIG. 36.

FIG. 37 illustrates an example of a data configuration (syntax) of data recorded in the TLV packet additional header 161 illustrated in FIG. 35.

As illustrated in FIG. 37, the following pieces of data are recorded in the TLV packet additional header:

(A) Digital recording control information (digital_recording_control_data);

(B) Encryption information (encryption_mode);

(C) Encryption flag (encryption_flag);

(D) Copying count restriction information (copy_restriction_mode); and (E) Parental rating 181.

Further, FIG. 38 illustrates an example of a data configuration (syntax) of data recorded in the MMTP packet additional header 171 illustrated in FIG. 36.

As illustrated in FIG. 38, the following pieces of data are recorded in the MMTP packet additional header:

(A) Digital recording control information (digital_recording_control_data);

(B) Encryption information (encryption_mode);

(C) Encryption flag (encryption_flag);

(D) Copying count restriction information (copy_restriction_mode); and (E) Parental rating 181.

These pieces of recorded data are similar to the pieces of data recorded in the TLV packet additional header illustrated in FIG. 37.

A detailed description will be given of the parental rating 181 recorded in the TLV packet additional header and the MMTP packet additional header illustrated in FIGS. 37 and 38 with reference to FIG. 39.

Figure 39:
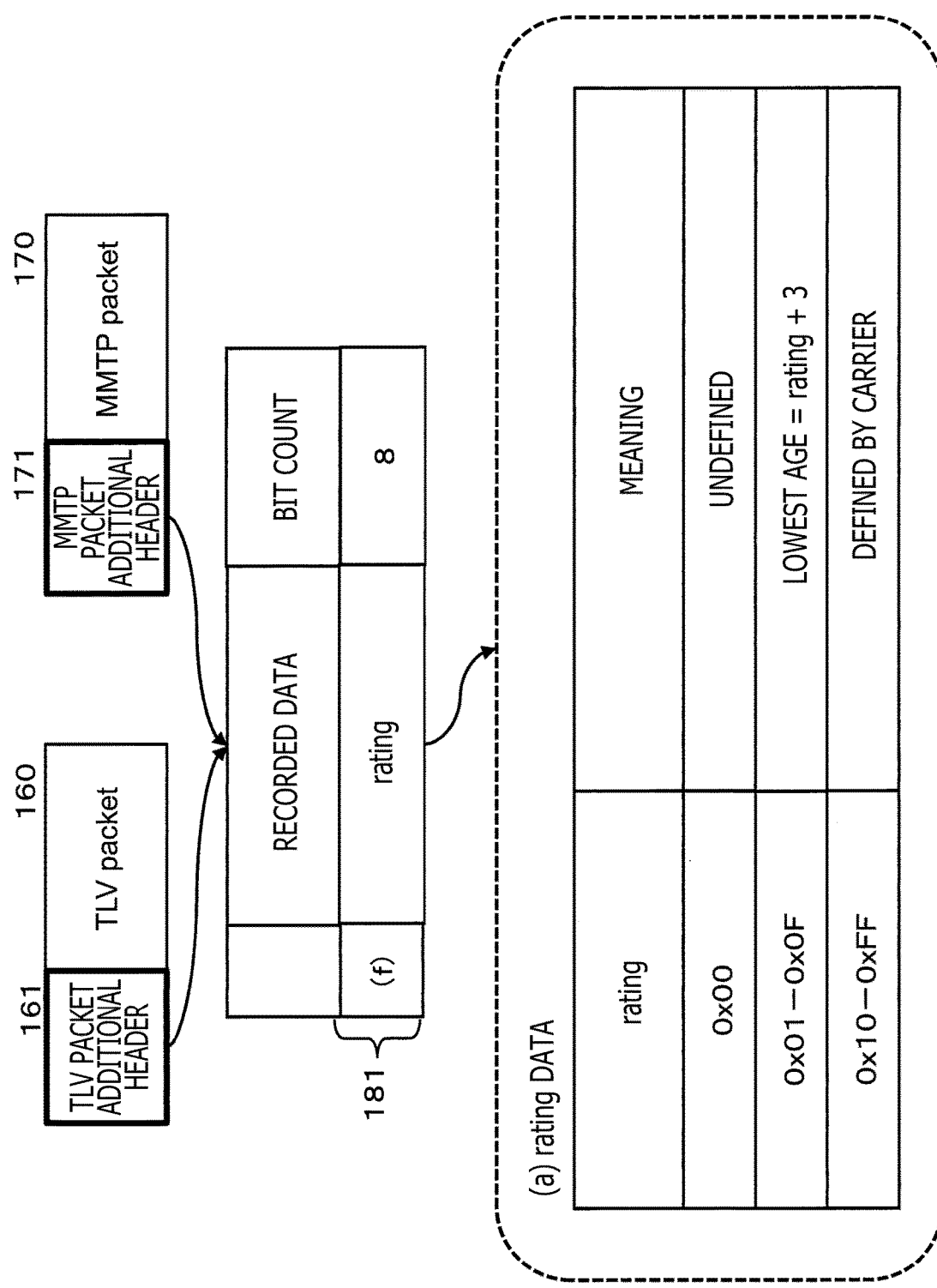
FIG. 39 is a diagram describing a specific example and meanings of parental ratings recorded in the TLV packet additional header and the MMTP packet additional header illustrated in FIGS. 37 and 38.

FIG. 39 illustrates specific examples of recording of a parental rating 181 recorded in the TLV packet additional header and the MMTP packet additional header illustrated in FIGS. 37 and 38 and meanings of ratings. Settings of the parental rating 181 and meanings thereof are as illustrated in FIG. 39(*a*) and as follows:

Rating=0x00: Undefined;

Rating=0x01-0x0F: Lowest allowable age of viewing equal to the rating plus 3; and Rating=0x00: Defined by carrier.

These are the same settings as those of the parental rating recorded in the reproduction control information compliant with the MPEG-2 TS format and the MMT format described earlier with reference to FIGS. 12 to 15.

It should be noted that the example of recording ratings illustrated in FIG. 39(*a*) is merely an example and that other configuration may be used for the recording process.

For example, a value representing a lowest allowable age of viewing may be recorded as 8-bit data in an 'as-is' manner for setting.

It should be noted that these pieces of data are recorded in the TLV packet additional header or the MMTP packet additional header and used as reproduction control information for content stored in the packet subsequent to the additional header.

It should be noted that data included in the TLV packet additional header or the MMTP packet additional header is used as information to generate a key (block key) for encryption and decoding of content stored in the clip AV stream file.

The information processing apparatus that receives broadcasting waves including MMT format data and records the data in an information recording medium (media) adds a new additional header to the MMTP packet storing MMT format data or the TLV packet (MMTP packet additional header or TLV packet additional header) and records copying control information in these additional headers, and records the packet in an information recording medium (media).

During this recording of data in an information recording medium (media), the data stored in the packet (MMTP packet or TLV packet) may need re-encryption.

For example, standards regarding copyright protection of data recorded in an information recording medium (media) such as a BD (Blu-Ray (registered trademark) Disc), an HD, or a DVD are prescribed in an AACS (Advanced Access Content System), and a form of encrypting content recorded in media such as a BD requires to be compliant with AACS stipulations.

However, broadcast content is not bound to the AACS stipulations and does not need to use the encryption form prescribed in AACS. As a result, broadcast content is delivered by a unique form of encryption.

Therefore, the information processing apparatus that receives broadcasting waves including MMT format data and recording the data in an information recording medium (media) needs to temporarily decode encrypted data received as broadcast data or read from first media such as hard disk in which the encrypted data is recorded in an 'as-is' manner, and then re-encrypt the data by a scheme compliant with the AACS stipulations, and record the data in an information recording medium (second media), a copying destination.

A description will be given next of a processing example of this encryption.

A description will be given first of an example of an encryption process in the case where a TLV packet sequence is recorded in an information recording medium (media) with reference to FIG. 40.

The information processing apparatus adds, to a TLV packet, a TLV packet additional header having copying control information recorded therein and records the TLV packet in an information recording medium (media).

Figure 40:
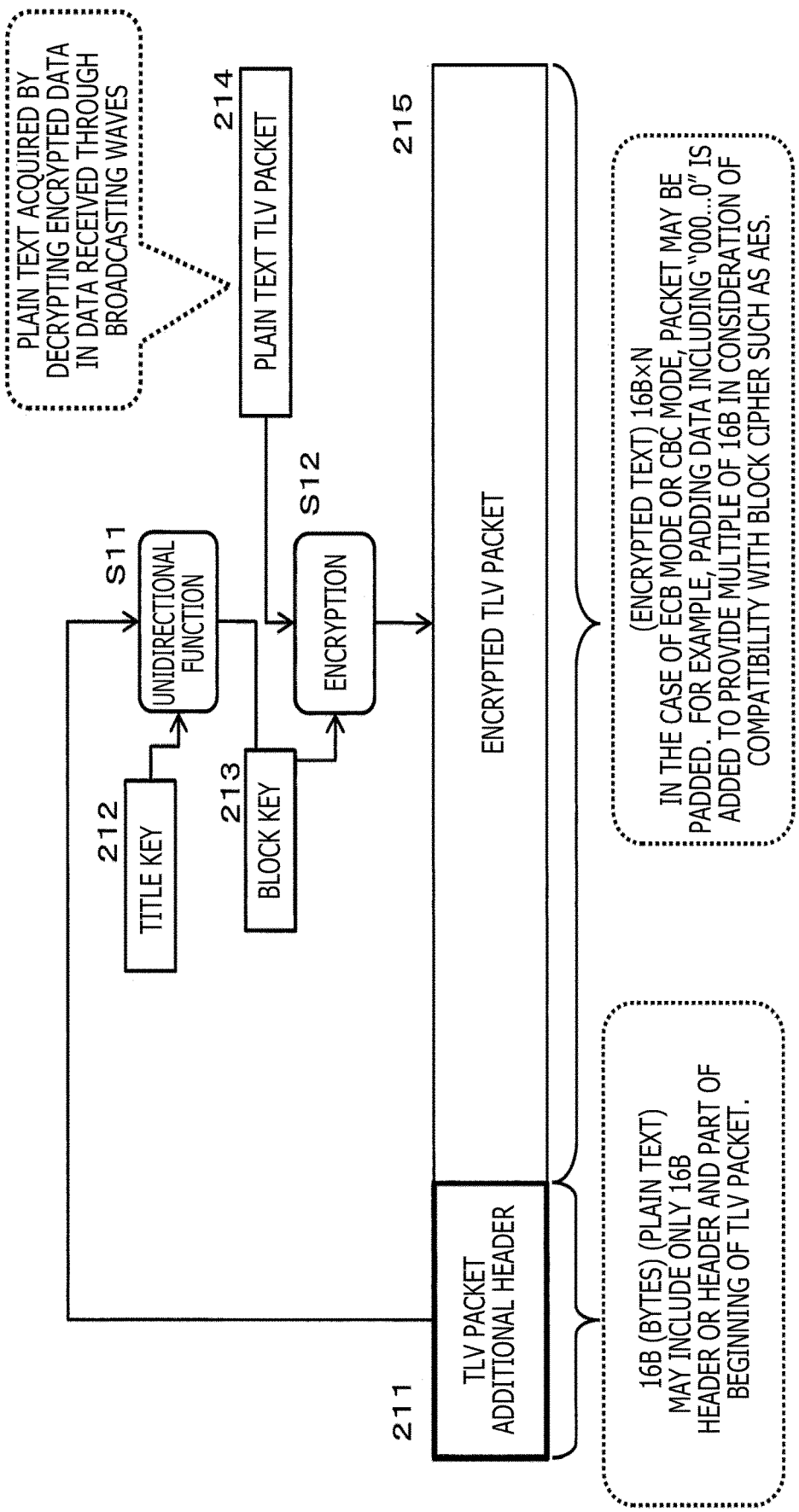
FIG. 40 is a diagram describing an example of a coding process in the case where a TLV packet sequence is recorded in an information recording medium (media).

FIG. 40 illustrates an encryption process sequence in the case where this process is performed.

First, the information processing apparatus acquires a TLV packet additional header 211 having copying control information recorded therein.

The TLV packet additional header 211 includes 16-byte plain text data. It should be noted that in the case where the TLV packet additional header is less than 16 bytes, part of the data at the beginning of the TLV packet may be combined with the TLV packet additional header as plain text data, thus expanding the TLV packet additional header 211 to 16 bytes.

(Step S11)

The information processing apparatus acquires the above 16-byte TLV packet additional header 211 and generates a block key 213 in step S11 by performing arithmetic operations based on a unidirectional function using a title key 212 generated in advance.

That is, the block key 213, an encryption key for each block (for each encryption process), is generated by using data included in the 16-byte TLV packet additional header 211 as seed information for generating the encryption key.

(Step S12)

Next, in step S12, the information processing apparatus accepts input of a plain text TLV packet 214 and generates an encrypted TLV packet 215 by performing an encryption process using the block key generated in step S11.

It should be noted that the plain text TLV packet 214 is acquired by decoding encrypted data sent from a broadcasting station, etc. This is the same data as that resulting from decoding during the reproduction process.

The encrypted TLV packet 215 generated by performing the encryption process using the block key is set as data subsequent to the TLV packet additional header 211 and recorded in the information recording medium (media).

It should be noted that the encryption process using a block key can be performed, for example, as an encryption process using ECB mode or CBC mode. Also, padding data may be added in the case where these encryption processes are performed. For example, padding data including "000 . . . 0" may be added to provide a multiple of 16 bytes in consideration of compatibility with block cipher such as AES.

A similar process is performed on all TLV packets included in the clip AV stream file, thus recording data sets, each including a TLV packet additional header and an encrypted TLV packet, in a manner arranged side by side in an information recording medium (media) such as a BD.

A description will be given next of an example of an encryption process in the case where an MMTP packet sequence is recorded in an information recording medium (media) with reference to FIG. 41.

The information processing apparatus adds, to an MMTP packet, an MMTP packet additional header having copying control information recorded therein and records the MMTP packet in an information recording medium (media).

Figure 41:
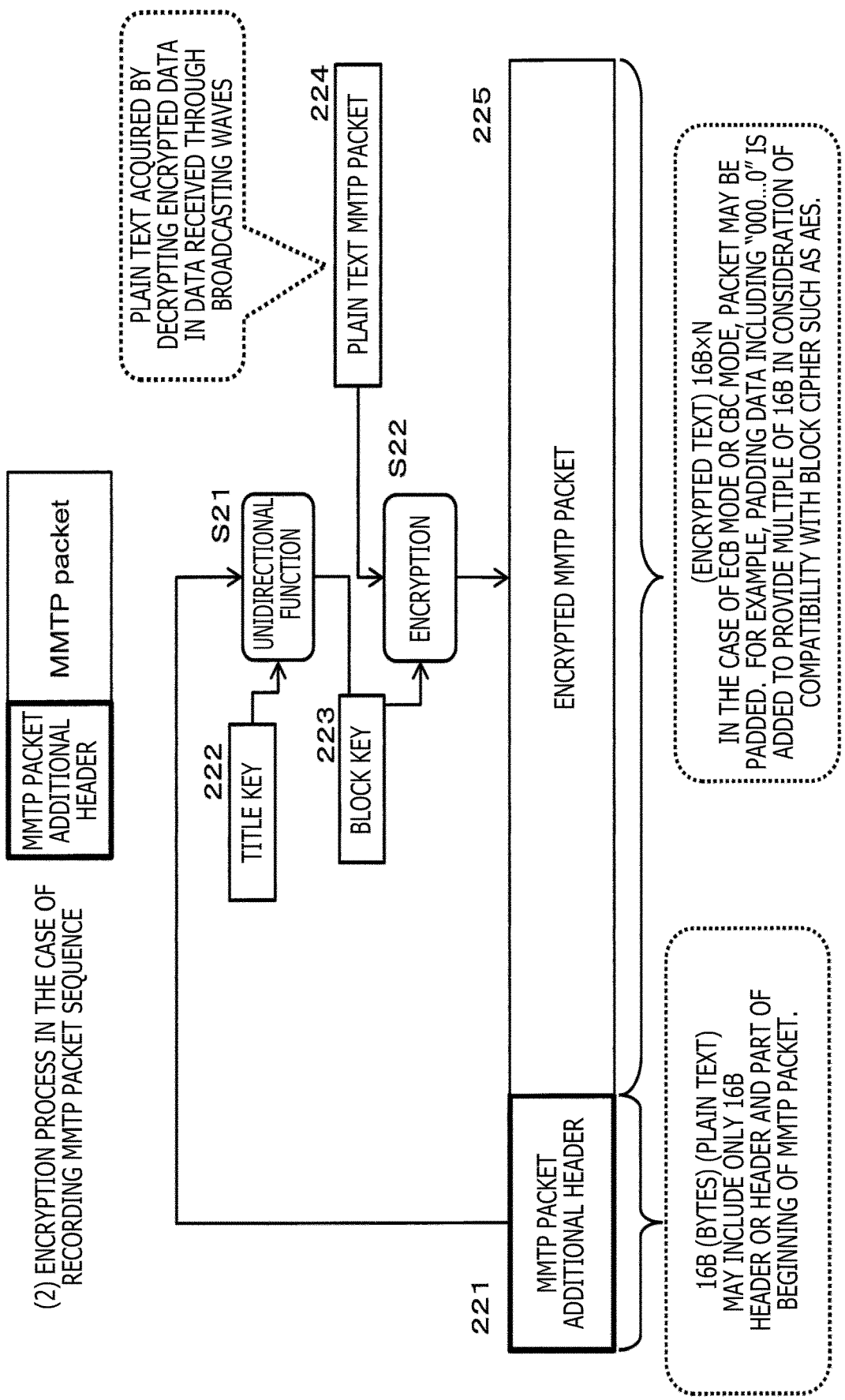
FIG. 41 is a diagram describing an example of a coding process in the case where an MMTP packet sequence is recorded in the information recording medium (media).

FIG. 41 illustrates an encryption process sequence in the case where this process is performed.

First, the information processing apparatus acquires an MMTP packet additional header 221 having copying control information recorded therein.

The MMTP packet additional header 221 includes 16-byte plain text data. It should be noted that in the case where the MMTP packet additional header is less than 16 bytes, part of the data at the beginning of the MMTP packet may be combined with the MMTP packet additional header as plain text data, thus expanding the plain text MMTP packet additional header 221 to 16 bytes.

(Step S21)

The information processing apparatus acquires the above 16-byte MMTP packet additional header 221 and generates a block key 223 in step S21 by performing arithmetic operations based on a unidirectional function using a title key 222 generated in advance.

That is, the block key 223, an encryption key for each block (for each encryption process), is generated by using data included in the 16-byte MMTP packet additional header 261 as seed information for generating the encryption key.

(Step S22)

Next, in step S22, the information processing apparatus accepts input of a plain text MMTP packet 224 and generates an encrypted MMTP packet 225 by performing an encryption process using the block key generated in step S21.

It should be noted that the plain text MMTP packet 224 is acquired by decoding encrypted data sent from a broadcasting station, etc. This is the same data as that resulting from decoding during the reproduction process.

The encrypted MMTP packet 225 generated by performing the encryption process using the block key is set as data subsequent to the MMTP packet additional header 261 and recorded in the information recording medium (media).

It should be noted that the encryption process using a block key can be performed, for example, as an encryption process using ECB mode or CBC mode. Also, padding data may be added in the case where these encryption processes are performed. For example, padding data including "000 . . . 0" may be added to provide a multiple of 16 bytes in consideration of compatibility with block cipher such as AES.

A similar process is performed on all MMTP packets included in the clip AV stream file, thus recording data sets, each including a MMTP packet additional header and an encrypted MMTP packet, in a manner arranged side by side in an information recording medium (media) such as a BD.

It should be noted that a block key similar to that described with reference to FIGS. 40 and 41 is generated followed by decoding of an encrypted TLV packet or an encrypted MMTP packet by using the generated block key at the time of content reproduction.

As described above, the process of decoding and reproducing a TLV packet or an MMTP packet stored in the clip AV stream file requires generation of a block key, and data included in an additional header (TLV packet additional header or MMTP packet additional header) is used to generate a block key.

If the data included in the additional header (TLV packet additional header or MMTP packet additional header) is changed, i.e., tampered with, a correct title key cannot be generated. As a result, encrypted content stored in the clip AV stream file cannot be decoded and reproduced.

Therefore, if parental information, data included in the additional header (TLV packet additional header or MMTP packet additional header), is tampered with, encrypted content stored in the clip AV stream file cannot be decoded and reproduced.

The present working example prevents tampering with parental information by setting parental information as data included in the additional header (TLV packet additional header or MMTP packet additional header), thus allowing for rigorous use of parental information.

11. Configuration of and Processes Performed by the Information Processing Apparatus that Performs a Process of Recording Data in an Information Recording Medium A description will be given next of a configuration of and processes performed by the information processing apparatus that performs a process of recording data in an information recording medium with reference to FIG. 42 and subsequent drawings.

The information processing apparatus of the present disclosure records input data compliant with the MPEG-2 TS format or the MMT format in an information recording medium such as a BD or a flash memory as BDAV format data or SPAV format data.

An information processing apparatus 300 records not only a clip AV stream file but also, further, a database file such as playlist or clip information file and a usage control information file in an information recording medium (recording media) 320.

Parental information corresponding to media recorded content is recorded in a database file, a usage control information file, or an additional header of a packet stored in a clip AV stream file.

It should be noted that information recorded in a database file such as playlist or clip information file, a usage control information file, or an additional header of a packet stored in a clip AV stream file is acquired not only from packets stored in video, audio, and other stream data to be reproduced that is included in input data compliant with the MPEG-2 TS format or the MMT format but also from packets stored in control information (e.g., PMT or MPT).

A description will be given below of a configuration of an information processing apparatus that performs a process of generating an information recording medium in which not only a clip AV stream file but also database files such as playlist and clip information file and usage control information file are recorded, and specifically, a process of recording data in an information recording medium such as a BD and a processing sequence.

Figure 42:
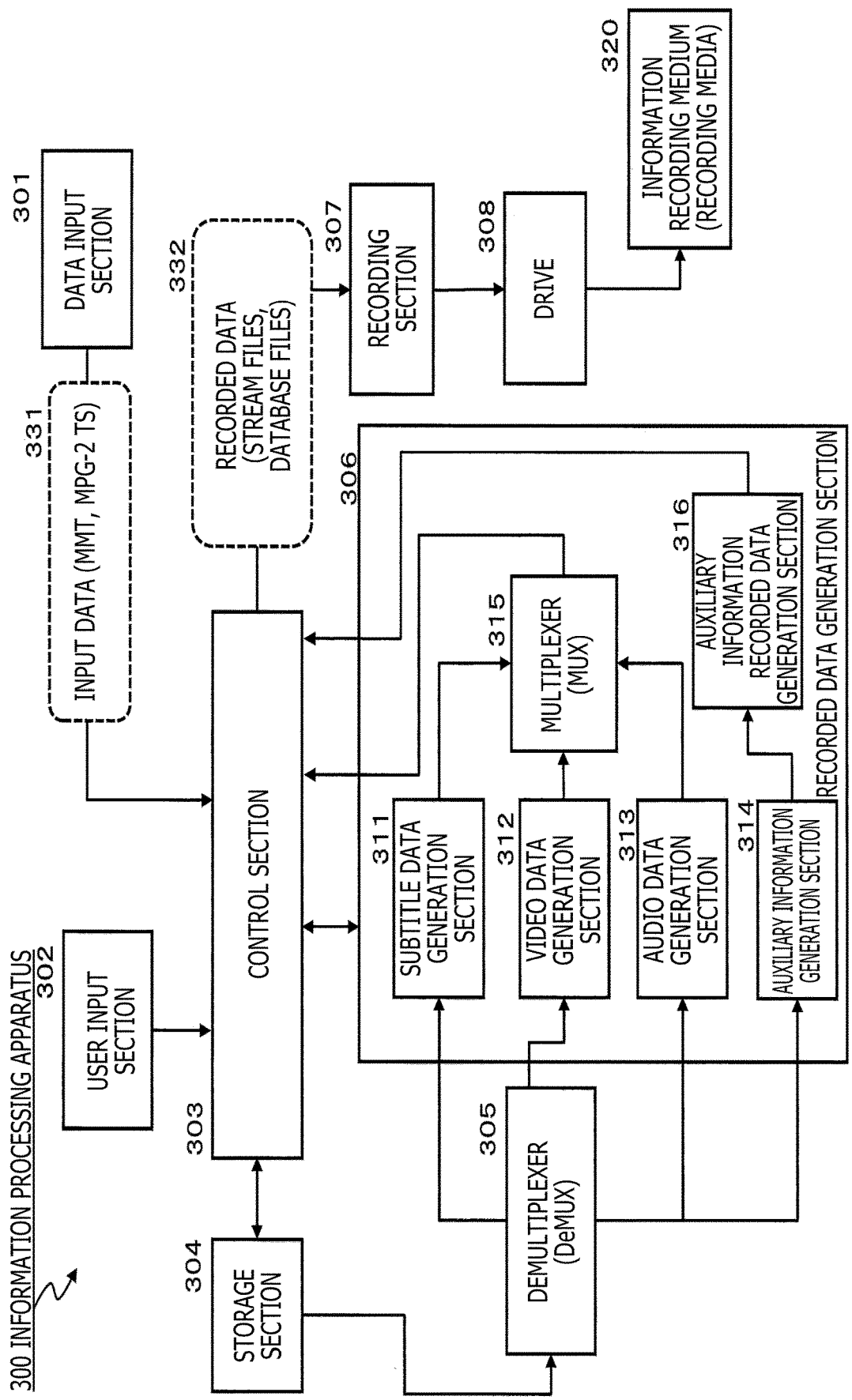
FIG. 42 is a diagram describing a configuration example of an information processing apparatus that performs a data recording process of recording data to the information recording medium (media).

FIG. 42 is a diagram illustrating a configuration example of the information processing apparatus 300 that performs a data recording process of recording data in an information recording medium such as a BD.

The information processing apparatus 300 records data to be recorded, BDAV format data or SPAV format data, in the information recording medium (recording media) 320. That is, the information processing apparatus 300 records a clip AV stream file including video and audio data, database files such as playlist file and clip information file, a reproduction control information file, a usage control information file, and so on.

A data input section 301 accepts input of input data 331, data recorded in the information recording medium 320, i.e., MMT format data or MPEG-2 TS format data. That is, the data input section 301 accepts input of input data 331 that includes video data, audio data, subtitle data, control information, and so on.

The data input section 301 includes a reception section, a media reading section, or other section. The reception section receives data sent, for example, from broadcasting stations, content servers, etc. that send MMT format data. The media reading section reads data from media in which MMT format data is recorded.

The input data 331 is stored into a storage section 304 under control of a control section 303.

A user input section 302 accepts, for example, input of a request to initiate the recording of data in the information recording medium 320 or other request.

When a data recording start request is input from the user input section 302, this input triggers the input data 331, stored in the storage section 304, to be input to a demultiplexer (DeMUX) 305.

The demultiplexer (DeMUX) 305 acquires not only packets storing respective pieces of video, audio, and subtitle data but also notice information, control information, and so on, classifies them into packets by data category, and inputs each packet to a subtitle data generation section 311, a video data generation section 312, an audio data generation section 313, or an auxiliary information generation section 314 of the recorded data generation section 306 according to a data type.

The subtitle data generation section 311 acquires subtitle data form the input data 331 input from the data input section 301 and stored in the storage section 304 and generates data to be stored in a stream file prescribed in the BDAV format.

The video data generation section 312 acquires video data from the input data 331 input from the data input section 301 and stored in the storage section 304 and generates data to be stored in a stream file prescribed in the BDAV format.

The audio data generation section 313 acquires audio data from the input data 331 input from the data input section 301 and stored in the storage section 304 and generates data to be stored in a stream file prescribed in the BDAV format.

The auxiliary information generation section 314 acquires attribute information and reproduction control information corresponding to data to be reproduced from the input data 331 input from the data input section 301 and stored in the storage section 304 and generates data to be recorded in a playlist file and a clip information file as database files, a usage control information file or clip AV stream file prescribed in the BDAV format.

Specifically, for example, parental information described in the above working example is acquired from the input data 331, and data to be recorded in a playlist file, a clip information file, a usage control information file, or an additional header of a packet stored in a clip AV stream file is generated.

A multiplexer (MUX) 315 accepts input of respective pieces of video, audio, and subtitle data converted by the subtitle data generation section 311, the video data generation section 312, and the audio data generation section 313 and generates a stream file storing these pieces of data.

It should be noted that in the case where input data is MMT format data as described earlier, the following two types of processes are possible to generate a clip AV stream file in the case of recording in media:

(1) generate a clip AV stream file by converting the MMT format into the MPEG-2 TS format; and (2) generate a clip AV stream file that includes a packet sequence (MMTP packet sequence or TLV packet sequence) storing data compliant with the MMT format.

A recorded data generation section 306 generates a clip AV stream file in accordance with one of the two forms of encryption classified above as (1) and (2).

An auxiliary information recorded data generation section 316 generates database files such as playlist file and clip information file, a usage control information file, or an additional header in which various pieces of information acquired by the auxiliary information generation section 314 from control information included in the input data 331 is recorded.

The stream file data generated by the recorded data generation section 306 and recorded data 332 including database files such as playlist file and clip information file are output and recorded in the information recording medium 320 by a recording section 306 via a drive 307 under control of the control section 303.

A description will be given next of a processing sequence of recording data in the information recording medium 320 illustrated in FIG. 42 and performed by the information processing apparatus 300 with reference to the flowchart illustrated in FIG. 43.

Figure 43:
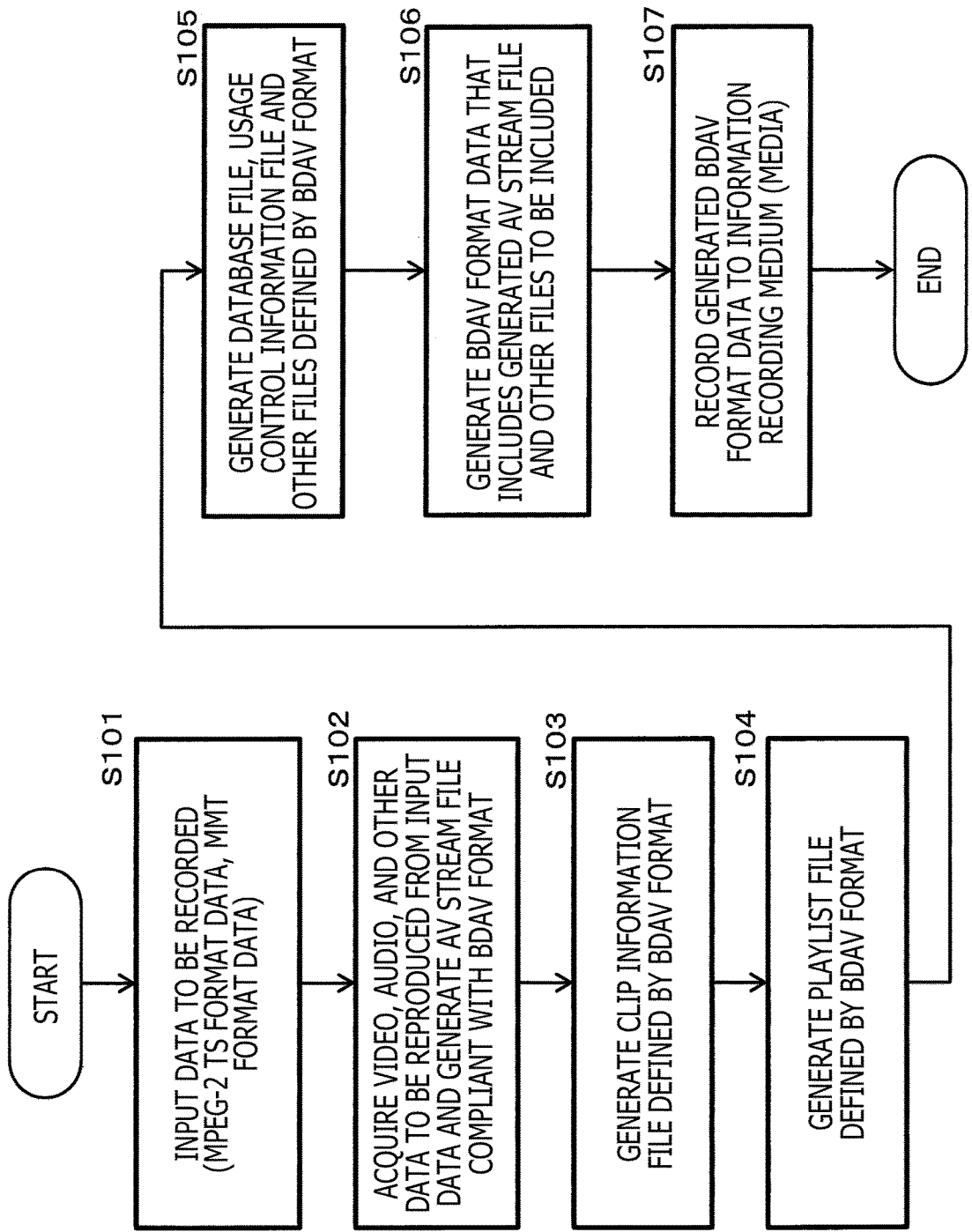
FIG. 43 is a diagram illustrating a flowchart describing a processing sequence of the data recording process of recording data to the information recording medium (media).

The processes as per the flow illustrated in FIG. 43 can be performed, for example, in accordance with the program stored in the storage section of the information processing apparatus under control of a data processing section (control section) having a CPU capable of executing programs.

A description will be given below of the processes performed in the respective steps of the flow illustrated in FIG. 43 one by one.

(Step S101)

First, the information processing apparatus 300 accepts input of data to be recorded via the data input section 301 in step S101.

It should be noted that this data to be recorded includes not only video data, audio data, and subtitle data but also notice information, control information, and so on.

(Step S102)

Next, in step S102, the information processing apparatus 300 acquires data to be reproduced such as video and audio and generates an AV stream file compliant with the BDAV format.

(Step S103)

Next, in step S103, the information processing apparatus 300 generates a clip information file by using data included in the input data.

(Step S104)

Next, in step S104, the information processing apparatus 300 generates a playlist file by using data included in the input MMT format data.

In the processes of generating a clip information file and a playlist file in steps S103 and S104, each file is generated by acquiring control information such as program map table (PMT) of MPEG-2 TS format data or an MMT package table (MPT) of MMT format data and acquiring data from these tables, etc. as described in the above working example.

It should be noted that the acquisition and recording of parental information described earlier in the above working example is performed during the clip information file and playlist file generation processes in these steps S103 and S104.

(Step S105)

Next, in step S105, the information processing apparatus 300 generates other database files, a usage control information file, and so on by using the input data.

(Step S106)

Next, in step S106, the information processing apparatus 300 generates BDAV format data by using the AV stream file, database files, usage control information file, and so on that have been generated.

(Step S107)

Next, in step S107, the information processing apparatus 300 records the BDAV format data generated in step S106 in an information recording medium (media).

In the processes of steps S102 to S106 in the flow illustrated in FIG. 43, the acquisition and recording of parental information described earlier in the above working example is performed.

A description will be given of a processing sequence of this acquisition and recording of parental information with reference to the flowchart illustrated in FIG. 44.

Figure 44:
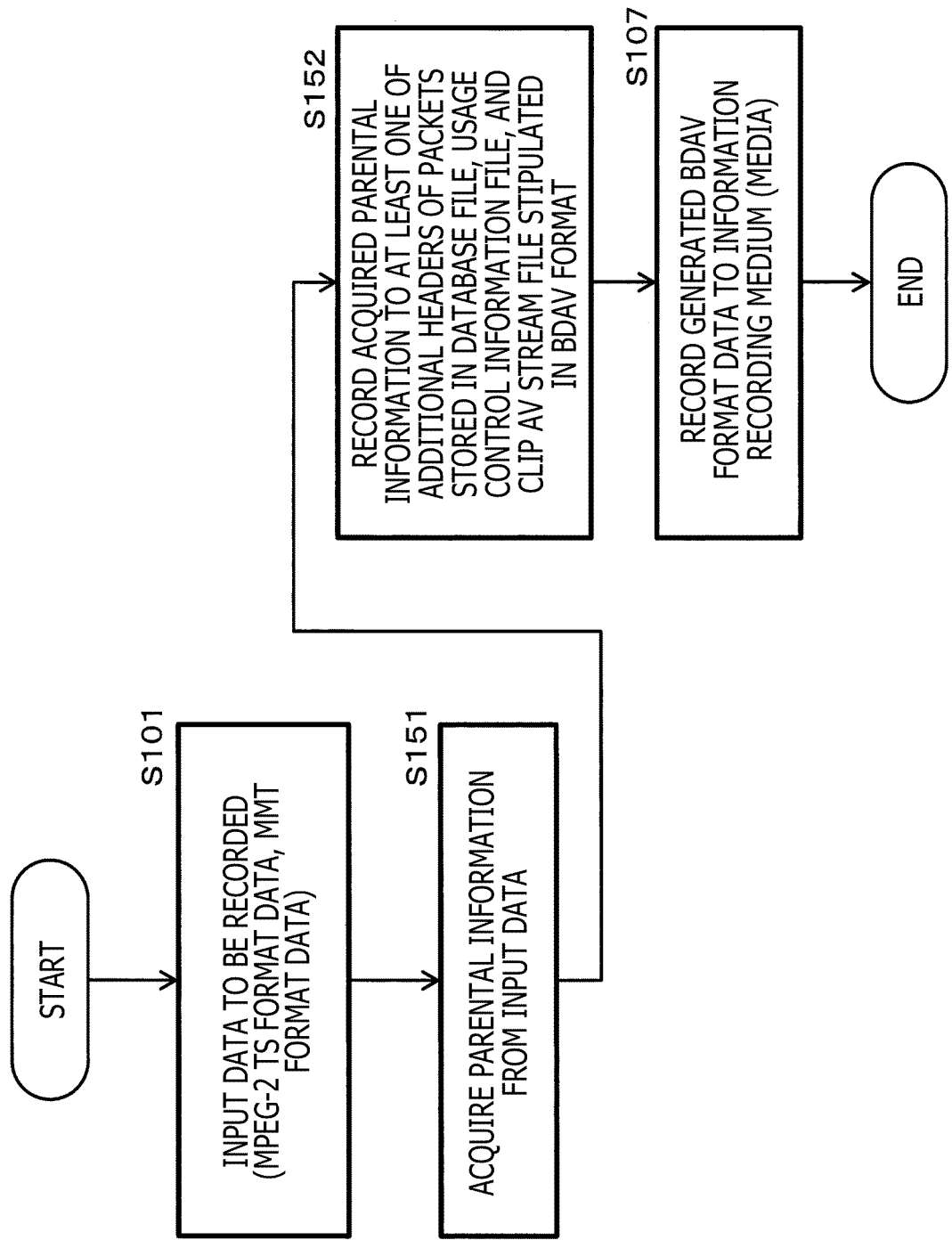
FIG. 44 is a diagram illustrating a flowchart describing a processing sequence of the data recording process of recording data to the information recording medium (media).

Step S101, the first step and step S107, the last step in the flow illustrated in FIG. 44 correspond to step S101 and step S107 in the flow illustrated in FIG. 43.

Steps S151 and S152 in the flow illustrated in FIG. 44 are some of the processes performed during the processes in steps S102 to S106 in the flow illustrated in FIG. 43, and only the acquisition and recording of parental information is recited.

The processes in the respective steps of the flow illustrated in FIG. 44 will be described one by one.

(Step S101)

First, the information processing apparatus 300 accepts input of data to be recorded via the data input section 301 in step S101.

It should be noted that this data to be recorded includes not only video data, audio data, and subtitle data but also notice information, control information, and so on.

(Step S151)

Next, in step S151, the information processing apparatus 300 acquires parental information from the input data.

In the case where the input data is MPEG-2 TS format data, the information processing apparatus 300 acquires parental information recorded in a program map table (PMT), control information corresponding to content sent from a broadcasting station, etc. in accordance with the MPEG-2 TS format as described earlier with reference to FIGS. 12 and 13.

On the other hand, in the case where the input data is MMT format data, the information processing apparatus 300 acquires parental information recorded in an MMT package table (MPT), control information corresponding to content sent from a broadcasting station, etc. in accordance with the MMT format as described earlier with reference to FIGS. 14 and 15.

(Step S152)

Next, in step S152, the information processing apparatus 300 records the acquired parental information in a playlist file and a clip information file, database files prescribed in the BDAV format, a usage control information file, or an additional header of a packet stored in a clip AV stream file.

It should be noted that this parental information recording process may be set to record parental information in one of the above files or the plurality thereof.

The processes in steps S151 and S152 allow parental information to be recorded in one of the playlist file and clip information file, database files prescribed in the BDAV format, the usage control information file, and the additional header of the packet stored in the clip AV stream file.

(Step S107)

Next, in step S107, the information processing apparatus 300 records the generated BDAV format data in an information recording medium (media).

Thanks to the process of recording these pieces of data in an information recording medium, the reproduction apparatus that performs the reproduction process of reproducing data recorded in the information recording medium can determine the following in relation to content stored in the clip AV stream file to be reproduced by referring to parental information recorded in one of the playlist file and the clip information file, the usage control information file, and the additional header of the packet stored in the clip AV stream file:

(1) whether the content has a prescribed lowest allowable age of reproduction; and (2) in the case where the content has a prescribed lowest allowable age of reproduction, what is the lowest allowable age of reproduction?

Further, in the case where the content stored in the clip AV stream file to be reproduced has a prescribed lowest allowable age of reproduction, the reproduction apparatus compares viewer's age information stored in advance in a memory of the reproduction apparatus and the setting of this "parental information," thus allowing the apparatus to reproduce the content or cancel the reproduction. That is, reproduction can be controlled in accordance with viewer's age.

12. Configuration of and Processes Performed by the Information Processing Apparatus that Performs a Process of Reproducing Data from an Information Recording Medium A description will be given next of a configuration of and processes performed by the information processing apparatus that performs a process of reproducing data from an information recording medium with reference to FIG. 45 and subsequent drawings.

The information processing apparatus that performs the reproduction process reads data recorded in the information recording medium inserted in the information processing apparatus and reproduces the data.

Figure 45:
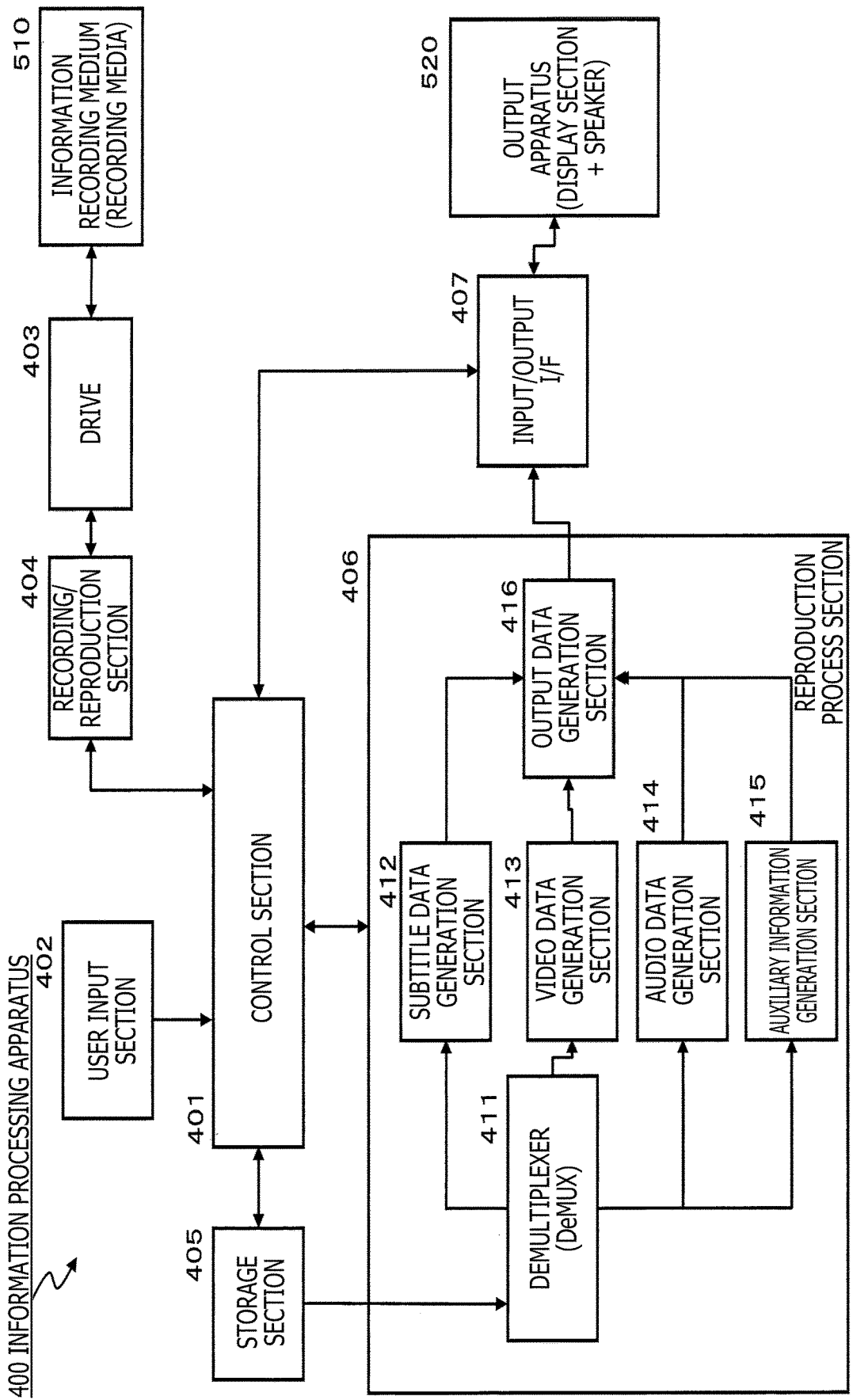
FIG. 45 is a diagram describing a configuration example of an information processing apparatus that performs a data reproduction process of reproducing data from the information recording medium (media).

FIG. 45 is a diagram illustrating a configuration of an information processing apparatus 400 that performs the process of reproducing data recorded in an information recording medium 510 such as a BD.

The information processing apparatus 400 reads data recorded in the information recording medium (recording media) 510 illustrated in FIG. 45 and outputs the data to an output apparatus (display section and speaker) 520. It should be noted that the output apparatus 520 is, for example, a TV set, a display apparatus with a display, a speaker, and other devices.

It should be noted that the information processing apparatus 400 may be the same as the information processing apparatus 300 for reading data described earlier with reference to FIG. 42. That is, the information processing apparatus 400 is capable of both recording and reproducing data.

The information recording medium (recording media) 510 is an information recording medium in which not only a clip AV stream file generated by the processes performed as per the working example described earlier but also database files such as playlist file and clip information file, usage control information file, and so on are recorded.

It should be noted that parental information is recorded in one of the playlist files, the clip information file, the usage control information file, and the additional header of the packet stored in the clip AV stream file.

A control section 401 reads data recorded in the information recording medium 510 via a recording/reproduction section 404 and a drive 403, for example, on the basis of input of information from a user input section 402 instructing that data be reproduced, stores the data into a storage section 405 as a data buffer, and outputs the stored data to a reproduction process section 406.

Also, the control section 401 generates a recorded content list described earlier with reference to FIG. 26 on the basis of input of information from the user input section 402 instructing that a recorded content list be displayed and on the basis of data recorded in the information recording medium 510 and outputs the recorded content list to the output apparatus (display section) 520.

The reproduction process section 406 generates data to be reproduced by acquiring, under control of the control section 401, data to be reproduced read out from the information recording medium 510, i.e., each piece of data from the clip AV stream file that stores respective pieces of video, audio, and subtitle data.

A demultiplexer (DeMUX) 411 acquires packets storing not only video, audio, and subtitles but also a playlist file, a clip information file, and other data, classifies them into packets by data category, and outputs each packet to a subtitle data generation section 412, a video data generation section 413, an audio data generation section 414, and an auxiliary information generation section 415 according to a data type.

The subtitle data generation section 412, the video data generation section 413, and the audio data generation section 414 perform decoding of data stored in the packets and other processes and outputs the decoded data to an output data generation section 416.

The output data generation section 416 outputs the respective pieces of subtitles, video, and audio to the output apparatus (display section and speaker) 520 via an input/output interface 407.

It should be noted that the information recording medium 510 may have a stream file storing MPEG-2 TS format data or a stream file storing MMT format data as a stream file storing data to be reproduced.

The information processing apparatus 400 performs a process of reproducing a stream file storing MPEG-2 TS format data and a stream file storing MMT format data by selecting and using a playlist file and a clip information file compliant with each format.

The auxiliary information generation section 415 generates a recorded content list, for example, by acquiring data stored in a playlist file and a clip information file and outputs the generated list to the output apparatus (display section and speaker) 520.

The output apparatus (display section and speaker) 520 outputs not only respective pieces of video, audio, subtitle, and other data but also the recorded content list input from the information processing apparatus 400 via the output apparatus (display section and speaker) 520.

A description will be given next of a reproduction control sequence by using parental information recorded in the information recording medium 510 during reproduction of data from the information recording medium 510 by the information processing apparatus 400 illustrated in FIG. 45 with reference to the flowchart illustrated in FIG. 46.

Figure 46:
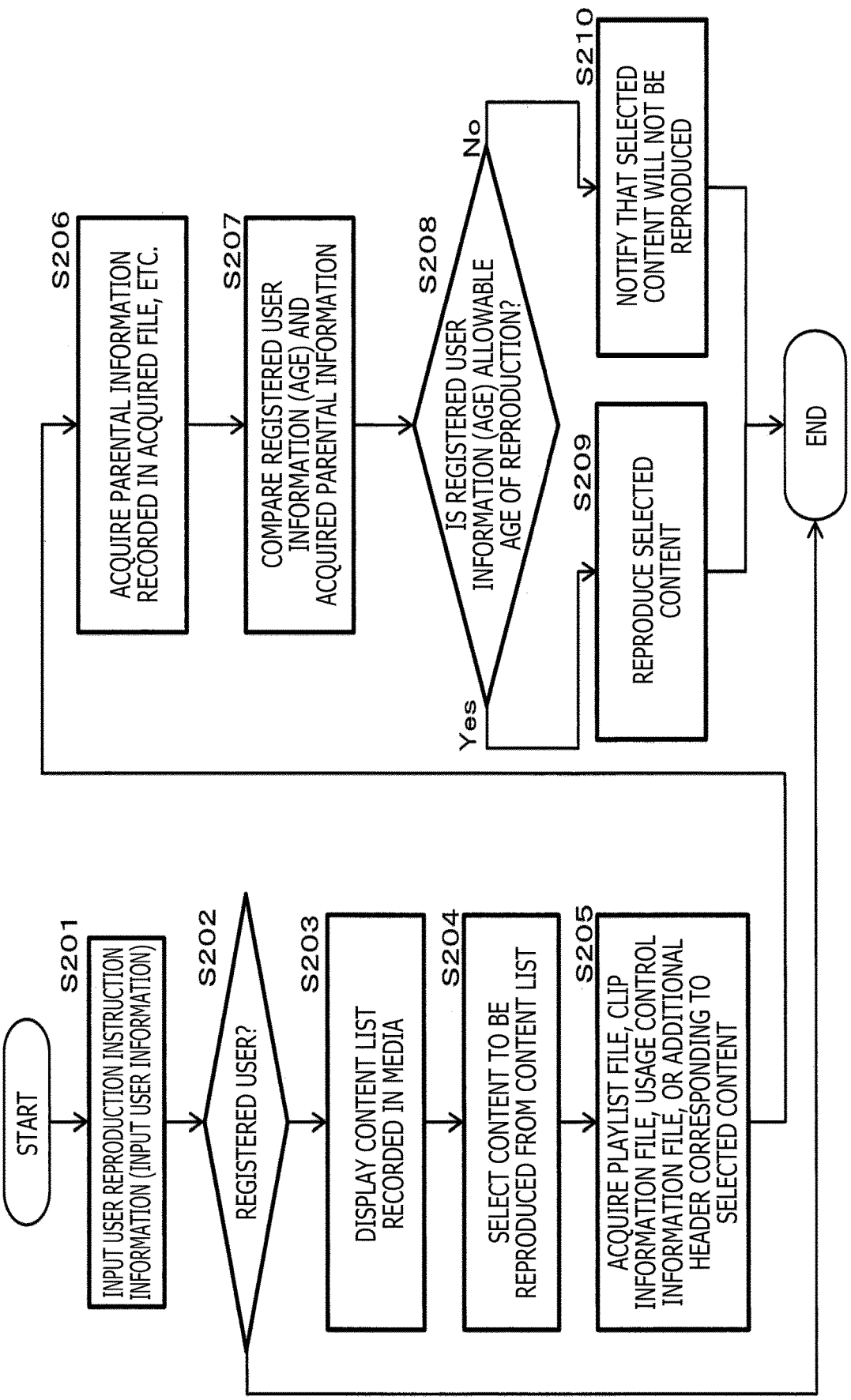
FIG. 46 is a diagram illustrating a flowchart describing a processing sequence of the data reproduction process of reproducing data from the information recording medium (media).

The processes as per the flow illustrated in FIG. 46 can be performed, for example, in accordance with the program stored in the storage section of the information processing apparatus 400 under control of a data processing section (control section) having a CPU capable of executing programs.

The information processing apparatus that performs the processes as per the flow illustrated in FIG. 46 is the information processing apparatus 400 illustrated in FIG. 45. When the information recording medium (recording media) 510 is inserted, the information processing apparatus 400 reads data recorded in the information recording medium 510 and outputs the data to the output apparatus (display section and speaker) 520. It should be noted that the output apparatus 520 is, for example, a TV set, a display apparatus with a display, a speaker, and other devices.

The information recording medium (recording media) 510 is the information recording medium (recording media) 510 with parental information recorded in one of a playlist file and a clip information file, a usage control information file, and an additional header of a packet stored in a clip AV stream file.

A description will be given below of the processes performed in the respective steps of the flow illustrated in FIG. 46 one by one.

(Step S201)

First, the control section 401 of the information processing apparatus 400 accepts input of reproduction instruction information of the user in step S201. It should be noted that user information is input at this point in time.

It should be noted that this process is set such that reproduction is permitted only for the user who has been registered in advance in the storage section of the information processing apparatus 400.

Registered information includes user's age.

(Step S202)

Next, the control section 401 of the information processing apparatus 400 decides in step S202 whether or not the user who has issued a reproduction instruction is a registered user.

That is, the control section 401 decides whether or not the user has been registered in advance in the storage section of the information processing apparatus 400.

In the case where the user is not a registered user, the process is terminated without performing the reproduction process.

In the case where the user is a registered user, the process proceeds to step S203.

(Step S203)

If the user who has issued a reproduction instruction is a registered user in the decision process in step S202, next, the control section 401 of the information processing apparatus 400 displays a content list recorded in the information recording medium (media) in step S203.

This is, for example, the content list described earlier with reference to FIG. 26.

(Step S204)

Next, in step S204, the control section 401 of the information processing apparatus 400 accepts input of user selection information regarding content to be reproduced from the content list.

(Steps S205 and S206)

Next, in steps S205 and S206, the control section 401 of the information processing apparatus 400 acquires a playlist file, a clip information file, a usage control information file, or an additional header and acquires parental information from the acquired data.

(Step S207)

Next, in step S207, the control section 401 of the information processing apparatus 400 determines the following in relation to content to be reproduced:

(1) whether the content has a prescribed lowest allowable age of reproduction; and (2) in the case where the content has a prescribed lowest allowable age of reproduction, what is the lowest allowable age of reproduction?

Further, in the case where the content to be reproduced has a prescribed lowest allowable age of reproduction, viewer's age information stored in advance in a memory of the information processing apparatus and the setting of the "parental information" acquired are compared.

(Step S208)

In step S208, the control section 401 of the information processing apparatus 400 compares the user's age included in the registered user information and the lowest allowable age of reproduction acquired from the setting of the "parental information."

If the user's age is equal to or higher than the lowest allowable age of reproduction acquired from the setting of the "parental information," the process proceeds to step S209.

If the user's age is not equal to or higher than the lowest allowable age of reproduction acquired from the setting of the "parental information," the process proceeds to step S210.

(Step S209)

In the case where it is decided in the decision process in step S208 that the user's age is equal to or higher than the lowest allowable age of reproduction acquired from the setting of the "parental information," the process proceeds to step S209 where a selected content reproduction process is performed.

(Step S210)

On the other hand, in the case where it is decided in the decision process in step S208 that the user's age is not equal to or higher than the lowest allowable age of reproduction acquired from the setting of the "parental information," the process proceeds to step S210 where the selected content reproduction process is not performed, and instead, a notice indicating that reproduction is not permitted such as a message is displayed.

As described above, the reproduction apparatus compares viewer's age information stored in advance in a memory of the reproduction apparatus and the setting of this "parental information," thus allowing the apparatus to reproduce the content or cancel the reproduction. That is, reproduction can be controlled in accordance with viewer's age.

13. Configuration Example of the Information Processing Apparatus

Figure 47:
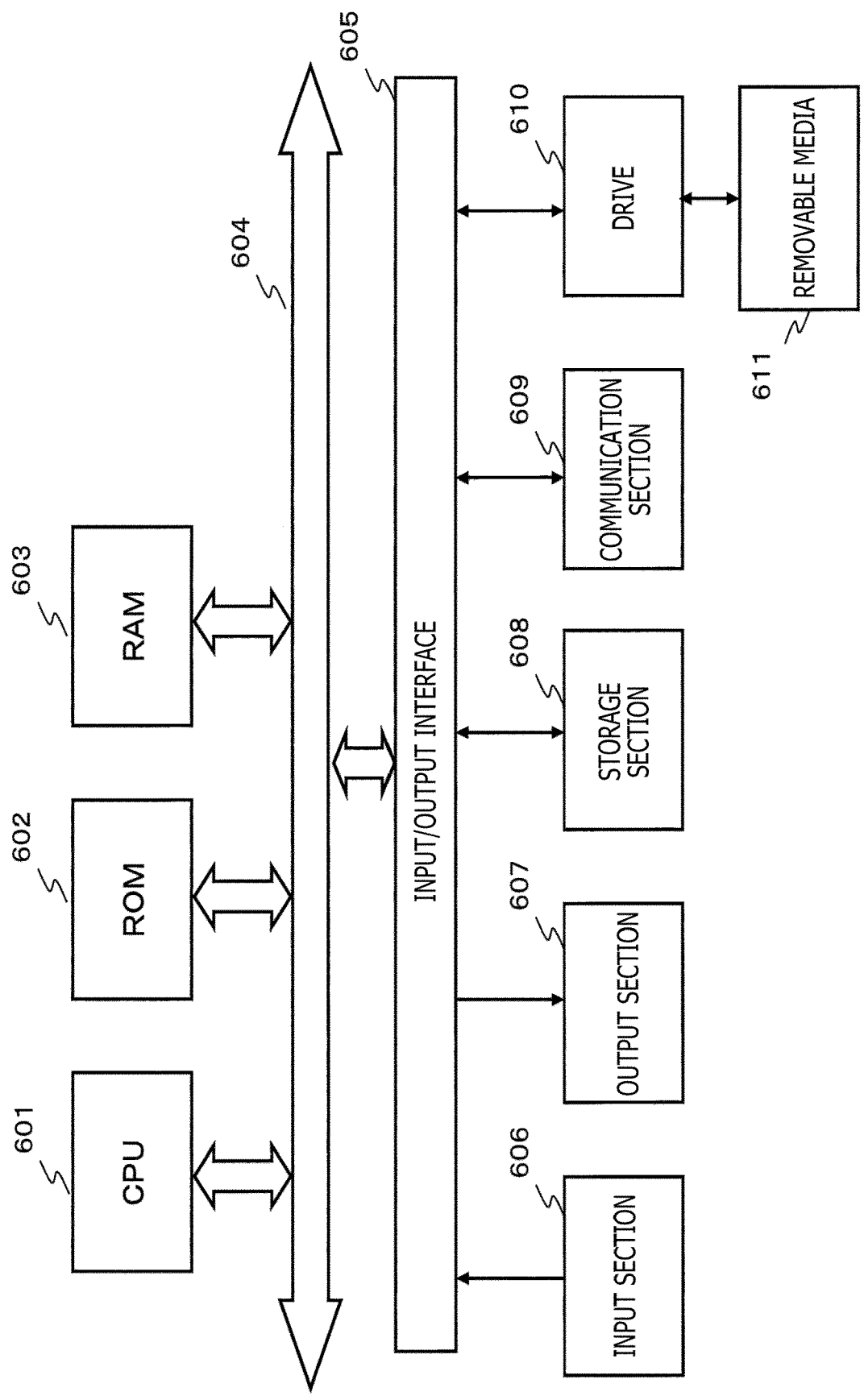
FIG. 47 is a diagram describing a hardware configuration example of the information processing apparatus used for the processes of the present disclosure.

A description will be given next of a hardware configuration example of an information processing apparatus that can be as an information processing apparatus for recording data in and reproducing data from an information recording medium with reference to FIG. 47.

A CPU (Central Processing Unit) 601 functions as a data processing section that performs various processes in accordance with programs stored in a ROM (Read Only Memory) 602 or a storage section 608. For example, the CPU 601 performs the processes as per the sequences described in the above working examples. The programs executed by the CPU 601 and data are stored in a RAM (Random Access Memory) 603. These CPU 601, ROM 602, and RAM 603 are connected to each other by a bus 604.

The CPU 601 is connected to an input/output interface 605 via the bus 604. An input section 606 that includes various switches, a keyboard, a mouse, a microphone, and other devices and an output section 607 that includes a display, a speaker, and other devices are connected to the input/output interface 605. The CPU 601 performs various processes in response to an instruction input from the input section 606 and outputs processing results, for example, to the output section 607.

The storage section 608 connected to the input/output interface 605 includes, for example, a hard disk or other device and stores programs executed by the CPU 601 and various pieces of data. A communication section 609 functions as a transmission/reception section for data communication via networks such as the Internet and local area networks and further as a transmission/reception section for broadcasting waves and communicates with external equipment.

A drive 610 connected to the input/output interface 605 drives removable media such as magnetic disk, optical disc, magneto-optical disk, or semiconductor memory such as memory card and records data in or reads data from the removable media 611.

14. Conclusion of the Configuration of the Present Disclosure

Thus, the working examples of the present disclosure have been described above with reference to specific working examples. However, it is apparent that a person skilled in the art can modify or substitute the working examples without departing from the gist of the present disclosure. That is, the present invention has been disclosed by way of illustration and should not be interpreted restrictively. The scope of claims should be taken into consideration to judge the gist of the present disclosure.

It should be noted that the technology disclosed in the present specification can have the following configurations:

(1)
An information processing apparatus including:
a data processing section adapted to accept input of input data including MPEG-2 TS format data or MMT format data and generate recorded data compliant with BDAV format or SPAV format, a data recording format for an information recording medium, in which
the data processing section records, in the information recording medium, a clip AV stream file storing content and information regarding age permitted for reproduction corresponding to the content acquired from the input data.

(2)
The information processing apparatus of feature (1), in which
the data processing section records the information regarding age permitted for reproduction in at least a playlist file or a clip information file.

(3)
The information processing apparatus of feature (1) or (2), in which
the data processing section records the information regarding age permitted for reproduction at least in a usage control information file or a header of a packet stored in the clip AV stream file.

(4)
The information processing apparatus of any one of features (1) to (3), in which
the data processing section selects the information regarding age permitted for reproduction corresponding to content with the highest age permitted for reproduction from among pieces of content whose reproduction is controlled with a playlist file.

(5)
The information processing apparatus of any one of features (1) to (4), in which
the data processing section records, in the information recording medium, a flag that permits enabling or disabling of the information regarding age permitted for reproduction.

(6)
The information processing apparatus of any one of features (1) to (5), in which
the data processing section records, in a playlist file, the flag that permits enabling or disabling of the information regarding age permitted for reproduction.

(7)
The information processing apparatus of any one of features (1) to (6), in which
the data processing section records, in the information recording medium, the flag that permits enabling or disabling of the information regarding age permitted for reproduction, and
the data processing section records, in the information recording medium, a registration passcode used to decide whether or not to permit a change to be made to the flag setting.

(8)
The information processing apparatus of feature (7), in which
the data processing section records the registration passcode in a management information file prescribed in the BDAV format or the SPAV format.

(9)
An information processing apparatus including:
a data processing section adapted to perform a reproduction process of reproducing data recorded in an information recording medium, in which
the information recording medium stores MPEG-2 TS format data or MMT format data that has been recorded in accordance with BDAV format or SPAV format, and
the data processing section acquires information regarding age permitted for reproduction corresponding to content from the information recording medium and performs content reproduction control on the basis of acquired information.

(10)
The information processing apparatus of feature (9), in which
the data processing section determines whether or not to permit reproduction of content by comparing the information regarding age permitted for reproduction acquired from the information recording medium and user's age information stored in advance in a memory of the information processing apparatus.

(11)
The information processing apparatus of feature (9) or (10), in which
the data processing section acquires the information regarding age permitted for reproduction at least from a playlist file or a clip information file.

(12)
The information processing apparatus of any one of features (9) to (11), in which
the data processing section acquires the information regarding age permitted for reproduction from a playlist file and outputs a content list including the acquired information regarding age permitted for reproduction to a display section.

(13)
The information processing apparatus of any one of features (9) to (12), in which
the data processing section acquires the information regarding age permitted for reproduction at least from a usage control information file or a header of a packet stored in the clip AV stream file.

(14)

The information processing apparatus of feature (13), in which the data processing section generates an encryption key used to decode encrypted content to be reproduced by using at least the usage control information file or the packet header.

(15)

The information processing apparatus of any one of features (9) to (14), in which the information recording medium has, as recorded data, a flag that permits enabling or disabling of the information regarding age permitted for reproduction, and the data processing section compares a passcode entered by a user against a registered passcode and permits a change to be made to the flag setting on condition that the comparison is successful.

(16)

An information recording medium having recorded data compliant with BDAV format or SPAV format, the information recording medium including as recorded data:

a clip AV stream file storing content; and information regarding age permitted for reproduction of the content, in which a reproduction apparatus is capable of acquiring information regarding age permitted for reproduction corresponding to content to be reproduced from the information recording medium and of performing control reproduction of content on the basis of the acquired information.

(17)

An information processing method performed by an information processing apparatus, the information processing apparatus including:

a data processing section adapted to accept input of input data including MPEG-2 TS format data or MMT format data and generate recorded data compliant with BDAV format or SPAV format, a data recording format for an information recording medium, in which the data processing section records, in the information recording medium, a clip AV stream file storing content and information regarding age permitted for reproduction corresponding to the content acquired from the input data.

(18)

An information processing method performed by an information processing apparatus, the information processing apparatus including:

a data processing section adapted to perform a reproduction process of reproducing data recorded in an information recording medium, in which the information recording medium stores MPEG-2 TS format data or MMT format data that has been recorded in accordance with BDAV format or SPAV format, and the data processing section acquires information regarding age permitted for reproduction corresponding to content from the information recording medium and performs content reproduction control on the basis of acquired information.

(19)

A program executed by an information processing apparatus to perform information processing, the information processing apparatus including:

a data processing section adapted to accept input of input data including MPEG-2 TS format data or MMT format data and generate recorded data compliant with BDAV format or SPAV format, a data recording format for an information recording medium, in which the data processing section records, in the information recording medium, a clip AV stream file storing content and information regarding age permitted for reproduction corresponding to the content acquired from the input data.

(20)

A program executed by an information processing apparatus to perform information processing, the information processing apparatus including:

a data processing section adapted to perform a reproduction process of reproducing data recorded in an information recording medium, in which the information recording medium stores MPEG-2 TS format data or MMT format data that has been recorded in accordance with BDAV format or SPAV format, and the data processing section acquires information regarding age permitted for reproduction corresponding to content from the information recording medium and performs content reproduction control on the basis of acquired information.

Also, a series of processes described above can be performed by hardware, software, or a combination thereof. In the case where the series of processes are performed by software, a program having a processing sequence recorded therein can be installed to a memory of a computer incorporated in dedicated hardware for execution or to a general-purpose computer capable of executing various processes for execution. For example, the program can be recorded in an information recording medium in advance. The program can be not only recorded in a computer but also be received via networks such as LAN (Local Area Network) and the Internet and installed to a built-in recording medium such as hard disk.

It should be noted that various processes described in the specification may be performed not only chronologically in accordance with the description but also in parallel or individually according to processing capabilities of the apparatuses that perform the processes or as necessary. Also, in the present specification, a system refers to a logical set of a plurality of apparatuses, and the apparatuses need not necessarily be accommodated in the same enclosure.

INDUSTRIAL APPLICABILITY

As described above, a configuration of a working example of the present disclosure realizes a configuration that allows reproduction control on the basis of age at the time of reproduction by recording information regarding age permitted for reproduction corresponding to media recorded content.

Specifically, for example, a clip AV stream file storing content to be reproduced acquired from input data including MPEG-2 TS format data or MMT format data and information regarding age permitted for reproduction corresponding to content acquired from the input data are placed into a playlist file, a clip information file, a usage control information file, or other file and recorded in media. A reproduction apparatus reads the information regarding age permitted for reproduction corresponding to the content from the playlist file or other file and compares the information regarding age permitted for reproduction with user's age information, thus allowing for content reproduction to be controlled.

The present configuration realizes a configuration that allows reproduction control based on age at the time of reproduction by recording information regarding age permitted for reproduction corresponding to media recorded content.

REFERENCE SIGNS LIST

20 Transmission apparatus
21 Broadcasting server
22 Data delivery server
30 Information processing apparatus
31 Recording/reproduction apparatus
32 TV
33 PC
34 Mobile terminal
40 Information recording medium (media)
41 BD
42 HDD
43 Flash memory
300 Information processing apparatus
301 Data input section
302 User input section
303 Control section
304 Storage section
305 Demultiplexer
306 Recorded data generation section
307 Recording section
308 Drive
311 Subtitle data generation section
312 Video data generation section
313 Audio data generation section
314 Auxiliary information generation section
315 Multiplexer
316 Auxiliary information recorded data generation section
320 Information recording medium
400 Information processing apparatus
401 Control section
402 User input section
403 Drive
404 Recording/reproduction section
405 Storage section
406 Reproduction process section
407 Input/output I/F
411 Demultiplexer
412 Subtitle data generation section
413 Video data generation section
414 Audio data generation section
415 Auxiliary information generation section
416 Output data generation section
510 Information recording medium
520 Output apparatus (display section and speaker)
601 CPU
602 ROM
603 RAM
604 Bus
605 Input/output interface
606 Input section
607 Output section
608 Storage section
609 Communication section
610 Drive
611 Removable media

The invention claimed is:

1. An information processing apparatus comprising:
a data processing section adapted to
  accept input of input data including MPEG-2 TS format data or MMT format data, and
  generate recorded data compliant with BDAV format or SPAV format, a data recording format for an information recording medium,
wherein the data processing section records, in the information recording medium, a clip AV stream file storing content and information regarding age permitted for reproduction corresponding to the content acquired from the input data,
wherein the data processing section records, in the information recording medium, a registration passcode used to decide whether or not to permit a change to be made to a flag setting related to the content,
wherein the data processing section records, in the information recording medium, the flag setting that permits enabling or disabling of the information regarding age permitted for reproduction, and
wherein the data processing section is implemented via at least one processor.

2. The information processing apparatus of claim 1, wherein
the data processing section records the information regarding age permitted for reproduction in at least a playlist file or a clip information file.

3. The information processing apparatus of claim 1, wherein
the data processing section records the information regarding age permitted for reproduction at least in a usage control information file or a header of a packet stored in the clip AV stream file.

4. The information processing apparatus of claim 1, wherein
the data processing section selects the information regarding age permitted for reproduction corresponding to content with the highest age permitted for reproduction from among pieces of content whose reproduction is controlled with a playlist file.

5. The information processing apparatus of claim 1, wherein
the data processing section records, in the information recording medium, a flag that permits enabling or disabling of the information regarding age permitted for reproduction.

6. The information processing apparatus of claim 1, wherein
the data processing section records, in a playlist file, the flag that permits enabling or disabling of the information regarding age permitted for reproduction.

7. The information processing apparatus of claim 1, wherein
the data processing section records the registration passcode in a management information file prescribed in the BDAV format or the SPAV format.

8. An information processing apparatus comprising:
a data processing section adapted to perform a reproduction process of reproducing data recorded in an information recording medium,
wherein the information recording medium stores MPEG-2 TS format data or MMT format data that has been recorded in accordance with BDAV format or SPAV format,
wherein the data processing section acquires information regarding age permitted for reproduction corresponding to content from the information recording medium and performs content reproduction control on a basis of acquired information,
wherein the data processing section compares a passcode entered by a user against a registered passcode and permits a change to be made to a flag setting related to the content on condition that the comparison is successful, and wherein the information recording medium has, as recorded data, the flag setting that permits enabling or disabling of the information regarding age permitted for reproduction.

9. The information processing apparatus of claim 8, wherein the data processing section determines whether or not to permit reproduction of content by comparing the information regarding age permitted for reproduction acquired from the information recording medium and user's age information stored in advance in a memory of the information processing apparatus.

10. The information processing apparatus of claim 8, wherein the data processing section acquires the information regarding age permitted for reproduction at least from a playlist file or a clip information file.

11. The information processing apparatus of claim 8, wherein the data processing section acquires the information regarding age permitted for reproduction from a playlist file and outputs a content list including the acquired information regarding age permitted for reproduction to a display section.

12. The information processing apparatus of claim 8, wherein the data processing section acquires the information regarding age permitted for reproduction at least from a usage control information file or a header of a packet stored in the clip AV stream file.

13. The information processing apparatus of claim 12, wherein the data processing section generates an encryption key used to decode encrypted content to be reproduced by using at least the usage control information file or the packet header.

14. A non-transitory computer-readable information recording medium having recorded data compliant with BDAV format or SPAV format, the information recording medium comprising as recorded data:

a clip AV stream file storing content;

information regarding age permitted for reproduction of the content; and a registration passcode used to decide whether or not to permit a change to be made to a flag setting related to the content, wherein a reproduction apparatus is configured to
  acquire information regarding age permitted for reproduction corresponding to content to be reproduced from the information recording medium, and
  perform control reproduction of content on a basis of the acquired information, and wherein the recorded data further includes the flag setting that permits enabling or disabling of the acquired information regarding age permitted for reproduction.

15. An information processing method performed by an information processing apparatus, the information processing apparatus comprising:

a data processing section adapted to accept input of input data including MPEG-2 TS format data or MMT format data and generate recorded data compliant with BDAV format or SPAV format, a data recording format for an information recording medium, wherein the data processing section records, in the information recording medium, a clip AV stream file storing content and information regarding age permitted for reproduction corresponding to the content acquired from the input data, wherein the data processing section further records, in the information recording medium, a registration passcode used to decide whether or not to permit a change to be made to a flag setting related to the content, wherein the data processing section records, in the information recording medium, the flag setting that permits enabling or disabling of the information regarding age permitted for reproduction, and wherein the data processing section is implemented via at least one processor.

16. An information processing method performed by an information processing apparatus, the information processing apparatus comprising:

a data processing section adapted to perform a reproduction process of reproducing data recorded in an information recording medium, wherein the information recording medium stores MPEG-2 TS format data or MMT format data that has been recorded in accordance with BDAV format or SPAV format, wherein the data processing section acquires information regarding age permitted for reproduction corresponding to content from the information recording medium and performs content reproduction control on a basis of acquired information, wherein the data processing section acquires, from the information recording medium, a registration passcode used to decide whether or not to permit a change to be made to a flag setting related to the content, wherein the flag setting permits enabling or disabling of the acquired information regarding age permitted for reproduction, and wherein the data processing section is implemented via at least one processor.

17. A non-transitory computer-readable storage medium having embodied thereon a program, which when executed by a computer of an information processing apparatus causes the information processing apparatus to perform an information processing method, the information processing method comprising:

accepting input of input data including MPEG-2 TS format data or MMT format data; and generating recorded data compliant with BDAV format or SPAV format, a data recording format for an information recording medium, wherein a clip AV stream file is recorded in the information recording medium, the clip AV stream file storing content and information regarding age permitted for reproduction corresponding to the content acquired from the input data, wherein the clip AV stream filed recorded in the information recording medium further stores a registration passcode used to decide whether or not to permit a change to be made to a flag setting related to the content, and wherein the flag setting permits enabling or disabling of the recorded information regarding age permitted for reproduction.

18. A non-transitory computer-readable storage medium having embodied thereon a program, which when executed by a computer of an information processing apparatus causes the information processing apparatus to perform an information processing method, the information processing method comprising:

performing a reproduction process of reproducing data recorded in an information recording medium, wherein the information recording medium stores MPEG-2 TS format data or MMT format data that has been recorded in accordance with BDAV format or SPAV format, wherein information regarding age permitted for reproduction corresponding to content is acquired from the information recording medium and content reproduction control is performed on a basis of acquired information, wherein a registration passcode used to decide whether or not to permit a change to be made to a flag setting related to the content is acquired from the information recording medium, and wherein the flag setting permits enabling or disabling of the acquired information regarding age permitted for reproduction.

\* \* \* \* \*